US008156436B2

(12) United States Patent  
Matsutani

(10) Patent No.: US 8,156,436 B2
(45) Date of Patent: Apr. 10, 2012

(54) INFORMATION PROCESSING DEVICE, INFORMATION PROCESSING METHOD AND INFORMATION PROCESSING PROGRAM

(75) Inventor: Atsushi Matsutani, Tokyo (JP)

(73) Assignee: Sony Corporation, Tokyo (JP)

( * ) Notice: Subject to any disclaimer, the term of this patent is extended or adjusted under 35 U.S.C. 154(b) by 273 days.

(21) Appl. No.: 11/569,081

(22) PCT Filed: May 19, 2005

(86) PCT No.: PCT/JP2005/009603

§ 371 (c)(1),
(2), (4) Date: Nov. 14, 2006

(87) PCT Pub. No.: WO2005/111866

PCT Pub. Date: Nov. 24, 2005

(65) Prior Publication Data

US 2008/0195947 A1 Aug. 14, 2008

(30) Foreign Application Priority Data

May 19, 2004 (JP) .................. 2004-149494
May 19, 2004 (JP) .................. 2004-149495
May 19, 2004 (JP) .................. 2004-149502

(51) Int. Cl.
*G06F 3/16* (2006.01)

(52) U.S. Cl. ..................................... 715/727

(58) Field of Classification Search .......... 715/727, 715/739, 744, 747
See application file for complete search history.

(56) References Cited

U.S. PATENT DOCUMENTS

| 2002/0180803 A1* | 12/2002 | Kaplan et al. ............... 345/810 |
| 2005/0114374 A1* | 5/2005 | Juszkiewicz et al. ......... 707/101 |
| 2005/0216855 A1* | 9/2005 | Kopra et al. ................ 715/767 |
| 2006/0080103 A1* | 4/2006 | Van Breemen ............... 704/270 |
| 2007/0226384 A1* | 9/2007 | Robbin et al. ............... 710/61 |
| 2008/0016464 A1* | 1/2008 | Gao et al. ................... 715/825 |

FOREIGN PATENT DOCUMENTS

| JP | 7-236099 | 9/1995 |
| JP | 10-283247 | 10/1998 |
| JP | 10 283247 | 10/1998 |
| JP | 2000 306332 | 11/2000 |
| JP | 2001-75995 | 3/2001 |
| JP | 2001-324335 | 11/2001 |
| JP | 2002-117309 | 4/2002 |
| JP | 2002 215923 | 8/2002 |
| JP | 2003-84783 | 3/2003 |
| JP | 2003-323181 | 11/2003 |
| JP | 2004-21996 | 1/2004 |
| JP | 2004 62814 | 2/2004 |
| JP | 2004 77556 | 3/2004 |
| JP | 2004-77556 | 3/2004 |

* cited by examiner

*Primary Examiner* — Thanh Vu
(74) *Attorney, Agent, or Firm* — Oblon, Spivak, McClelland, Maier & Neustadt, L.L.P.

(57) ABSTRACT

An information processing apparatus includes a broadcast reception unit that receives broadcast content. A communication unit transmits request information to an external device and receives, in response to the request information, content related information related to the broadcast content. The information processing apparatus also includes a storage medium that stores a plurality of contents and identification information related to the plurality of contents. A display unit displays a notification of whether the broadcast content has been recorded on the storage medium. A judging unit judges whether the broadcast content has been stored in the storage medium by comparing the content related information and the identification information. A control unit controls the display unit to display the notification of whether the broadcast content has been recorded on the storage medium, in response to a judgment, based on the content related information and the identification information, by the judging unit.

31 Claims, 45 Drawing Sheets

| file No. | | 1 | 2 | ... |
|---|---|---|---|---|
| TRACK INFORMATION | CONTENT ID | 00000001 | 00000002 | ... |
| | TITLE | BEAUTIFUL WORLD | BARE FEET LETTER | ... |
| | ARTIST | D'z | D'z | ... |
| | ... | ... | ... | ... |
| ALBUM INFORMATION | ALBUM ID | SMCE100001 | SMCE100001 | ... |
| | TITLE | CLEAN | CLEAN | ... |
| | ARTIST | D'z | D'z | ... |
| | TRACK NUMBER | 1 | 2 | ... |
| | ... | ... | ... | ... |
| FILE INFORMATION | CODEC | atrac3 | atrac3 | ... |
| | BIT RATE | 132kbps | 132kbps | ... |
| | CHANNEL | 2 | 2 | ... |
| | ... | ... | ... | ... |
| | STORAGE ADDRESS | CD RECORDING FOLDER ¥CLEAN¥BEAUTIFUL WORLD | CD RECORDING FOLDER ¥CLEAN ¥BARE FEET LETTER | ... |

| TITLE | ARTIST | LABEL | RELEASED YEAR | CREDIT INFORMATION | FIRST GENRE | SECOND GENRE |
|---|---|---|---|---|---|---|
| BEAUTIFUL WORLD | D'z | SMM | 2002 | SONGWRITER: D'Z | ROCK | HARD ROCK |
| BARE FEET LETTER | D'z | SMM | 2002 | SONGWRITER: D'Z | ROCK | HARD ROCK |
| ... | ... | ... | ... | ... | ... | ... |

| ALBUM TITLE | ALBUM ID | TRACK NUMBER | INTERNATIONAL STANDARD CODE | NOTE | ... |
|---|---|---|---|---|---|
| CLEAN | SMCE100001 | 1 | JPSK00000100 | RECORDED AT NY | ... |
| CLEAN | SMCE100001 | 2 | JPSK00000101 | RECORDED AT NY | ... |
| ... | ... | ... | ... | ... | ... |

| TITLE | ARTIST | LABEL | RELEASED YEAR | GENRE | CREDIT INFORMATION | LANGUAGE |
|---|---|---|---|---|---|---|
| CLEAN | D'z | SMM | 2002 | ROCK | SONGWRITER: D'z | JPN |
| White Dream | HAKUMU | BMI | 1997 | ROCK | SONGWRITER: HAKUMU | JPN |
| ... | ... | ... | ... | ... | ... | ... |

TB2

| RELEASED AREA | AUTHORIZER | ALBUM ID | INTERNATIONAL STANDARD CODE | NOTE |
|---|---|---|---|---|
| JPN | SMM | SMCE100001 | JPSK00000001 | RECORDED AT NY |
| JPN | BMI | SMCE105032 | JPSK00000002 | RECORDED AT NY |
| ... | ... | ... | ... | ... |

```
<?xml version="1.0"encoding="SHift_JIS"?>
<Message>
 <Message-Header>
  <fromsystem>ZONY store</fromsystem>
  <tosystem></tosystem>
  <requestcode>audio-buy</requestcode>
  <responsecode>album</responsecode>
  <rwsponsedetail>00000001</responsedetail>
 </Message-Header>
 <Message-Body>
```

WP1:
```
<title>BEST</title>
<artist>KYOTO SUGAWARA ORCHESTRA</artist>
<price>YEN 3,000</price>
<albumID>KACE000004</albumID>
      .
      .
      .
```

WP2:
```
<title>mode by Angel</title>
<artist>TWEEN</artist>
<price>YEN 3,500</price>
<albumID>SMCE100153</albumID>
      .
      .
      .
```

WP6:
```
<title>GRADUATION TRIP</title>
<artist>MATSUDOUYA AMI</artist>
<price>YEN 200</price>
<albumID>-----</albumID>
      .
      .
      .
```

```
 </Messege-Body>
</Message>
```

FIG. 23

| | CD | CDS | DVD | VHS | MD | SACD | DOWNLOAD |
|---|---|---|---|---|---|---|---|

ARTIST RETRIEVAL : Aroesmoth

RETRIEVAL RESULT : 132   REORDERING▼   LENGTH OF LIST▼

CD

| TITLE | RELEASED YEAR | RELEASED COUNTRY | PRICE |
|---|---|---|---|
| NOT YET DETERMINED | 2004 | JAPAN | ¥2,400 |
| Little Ones -Special Edition Best Of | 2004 | JAPAN | ¥2,427 |
| Pandora's Books | 2002 | UK | ¥5,999 |
| Ultimate Aroesmoth Hits | 2002 | Australia | ¥5,599 |
| Pandora's Books | 2002 | USA | ¥7,099 |
| Ultimate Aroesmoth Hits | 2002 | UK | ¥3,149 |
| Ultimate Aroesmoth Hits | 2002 | JAPAN | ¥3,240 |
| Ultimate Aroesmoth Hits (US DISC) | 2002 | USA | ¥3,699 |
| Ultimate Aroesmoth Hits (EU DISC) | 2002 | Europe | ¥3,329 |
| Little Ones | 2002 | JAPAN | ¥2,136 |
| Aroesmoth / Joys In The Attack | 2002 | Europe | ¥1,649 |
| Dump -Remaster | 2001 | Europe | ¥1,529 |
| Get A Globe -Remaster | 2001 | Europe | ¥1,529 |
| Short Vacation -Remaster | 2001 | Europe | ¥1529 |
| Best Off | 2001 | JAPAN | ¥1,700 |
| Old Last -The Aroesmoth Anthology | 2001 | Europe | ¥2,789 |
| Get A Globe | 2001 | JAPAN | ¥1,748 |
| Short Vacation | 2001 | JAPAN | ¥1,486 |

FIG. 30

TB10 CURRENTLY AIRED PROGRAM TABLE

| STATION NAME | BROADCAST TIME | PROGRAM TITLE | PERFORMER (DJ) | MUSIC START TIME | MUSIC TITLE | ARTIST | GENRE |
|---|---|---|---|---|---|---|---|
| FM NAKAHARA | 12/1 20:45~21:30 | MY MY RADIO | TOTAL MASUMOTO | 12/1 20:59 | BEYOND THE STARLIT SKY | SUMASHIGAO | POPS |

TB11 ALREADY AIRED MUSIC TABLE

| STATION NAME | BROADCAST TIME | MUSIC TITLE | ARTIST | GENRE |
|---|---|---|---|---|
| ... | ... | ... | ... | ... |
| FM NAKAHARA | 12/1 20:05 | DORA DORA DORA | NAX | ROCK |
| FM NAKAHARA | 12/1 20:09 | BLUE TRIANGLE | DJC | ROCK |
| FM NAKAHARA | 12/1 20:25 | AT THE HILL WITH BLOOMING ROSES | Tiger Ash | ROCK |
| FM NAKAHARA | 12/1 20:33 | NO.2 | AKIHARA KAZUYUKI | POPS |
| FM NAKAHARA | 12/1 20:37 | TO ME | HAMAZAKI AMI | POPS |
| FM NAKAHARA | 12/1 20:41 | Led Wine'89 | CLNetwork | POPS |
| FM NAKAHARA | 12/1 20:50 | MAKURA-CHORUS | KOMIYAMA NAOTARO | POPS |
| FM NAKAHARA | 12/1 20:55 | WINTER DEPRESSION | ARUKU EN CELL | ROCK |

TB12 ALREADY AIRED PROGRAM TABLE

| STATION NAME | BROADCAST TIME | PROGRAM TITLE | PERFORMER (DJ) |
|---|---|---|---|
| ... | ... | ... | ... |
| FM NAKAHARA | 12/1 19:00~20:00 | WORLD BEAT | SOBATTO NIINPALUS |
| FM NAKAHARA | 12/1 20:00~20:30 | Rock On | CHRIS PEPPER |
| FM NAKAHARA | 12/1 20:30~20:45 | SLOW NIGHT | JOHN GABARA |

| STATION NAMES | BROADCAST TIMES | MUSIC TITLES | ARTISTS | GENRES |
|---|---|---|---|---|
| ⋮ | ⋮ | ⋮ | ⋮ | ⋮ |
| FM NAKAHARA | 12/1 20:05 | DORA DORA DORA | NAX | ROCK |
| FM NAKAHARA | 12/1 20:09 | BLUE TRIANGLES | DJC | ROCK |
| FM NAKAHARA | 12/1 20:25 | AT THE HILL WITH BLOSSOMING ROSES | Tiger Ash | ROCK |
| FM NAKAHARA | 12/1 20:33 | NO. 2 | AKIHARA KAZUYUKI | POP |
| FM NAKAHARA | 12/1 20:37 | TO ME | HAMAZAKI AMI | POP |
| FM NAKAHARA | 12/1 20:41 | Led Wine'89 | CLNetwork | POP |
| FM NAKAHARA | 12/1 20:50 | MAKURA IN CHORUS | KOMIYAMA AOTARO | POP |
| FM NAKAHARA | 12/1 20:55 | WINTER'S PSYCHOSIS | WALK EN CELL | ROCK |
| FM NAKAHARA | 12/1 20:59 | BEYOND THE STARLIT SKY | SUMASHIGAO | POP |

ADD ON-AIR-LIST INFORMATION A CERTAIN TIME AFTER THE BROADCAST OF THE SONG ENDS

| STATION NAMES | BROADCAST PERIODS | PROGRAM TITLES | PRESENTERS |
|---|---|---|---|
| ⋮ | ⋮ | ⋮ | ⋮ |
| FM NAKAHARA | 12/1 19:00〜20:00 | WORLD BEAT | SOBATTO NINPARUSU |
| FM NAKAHARA | 12/1 20:00〜20:30 | Rock On | CHRIS PEPPER |
| FM NAKAHARA | 12/1 20:30〜20:45 | SLOW NIGHT | JOHN CAVARA |
| FM NAKAHARA | 12/1 20:45〜21:30 | MY MY RADIO | TOTAL MASUMOTO |

ADD ON-AIR-LIST INFORMATION A CERTAIN TIME AFTER THE BROADCAST OF THE RADIO PROGRAM ENDS

FIG. 34

| STATION NAMES | BROADCAST PERIODS | PROGRAM TITLES | PRESENTERS | BROADCAST TIMES | MUSIC TITLES | ARTISTS | GENRES |
|---|---|---|---|---|---|---|---|
| ... | ... | ... | ... | ... | ... | ... | ... |
| FM NAKAHARA | 12/1 20:00~20:30 | Rock On | CHRIS PEPPER | 12/1 20:05 | DORA DORA DORA | NAX | ROCK |
| FM NAKAHARA | 12/1 20:00~20:30 | Rock On | CHRIS PEPPER | 12/1 20:09 | BLUE TRIANGLES | DJC | ROCK |
| FM NAKAHARA | 12/1 20:00~20:30 | Rock On | CHRIS PEPPER | 12/1 20:25 | AT THE HILL WITH BLOSSOMING ROSES | Tiger Ash | ROCK |
| FM NAKAHARA | 12/1 20:30~20:45 | SLOW NIGHT | JOHN CAVARA | 12/1 20:33 | NO. 2 | AKIHARA KAZUYUKI | POP |
| FM NAKAHARA | 12/1 20:30~20:45 | SLOW NIGHT | JOHN CAVARA | 12/1 20:37 | TO ME | HAMAZAKI AMI | POP |
| FM NAKAHARA | 12/1 20:30~20:45 | SLOW NIGHT | JOHN CAVARA | 12/1 20:41 | Led Wine'89 | CLNetwork | POP |
| ... | ... | ... | ... | ... | ... | ... | ... |

FIG. 35

```
<?xml version="1.0"encoding="SHift_JIS"?>
<Message>
 <Message-Header>
  <fromsystem>ZONY store</fromsystem>
  <tosystem></tosystem>
  <requestcode>audio-buy</requestcode>
  <responsecode>album</responsecode>
  <rwsponsedetail>00000001</responsedetail>
 </Message-Header>
 <Message-Body>
```

WP11
```
<title>BEST</title>
<artist>KYOTO SUGAWARA ORCHESTRA</artist>
<price>YEN 3,000</price>
<genre>ORCHESTRA</genre>
       ·
       ·
       ·
```

WP12
```
<title>mode by Angel</title>
<artist>TWEEN</artist>
<price>200</price>
<gerne>ROCK</gerne>
       ·
       ·
       ·
```

·
·
·

WP16
```
<title>GRADUATION TRIP</title>
<artist>MATSUDOUYA AMI</artist>
<price>300</price>
<gerne>LOVE SONG</gerne>
       ·
       ·
       ·
```

```
 </Messege-Body>
</Message>
```

FIG. 46

INFORMATION PROCESSING DEVICE, INFORMATION PROCESSING METHOD AND INFORMATION PROCESSING PROGRAM

TECHNICAL FIELD

The present invention relates to an information processing apparatus, information processing method and information processing program, and is preferably applied to an information processing device that records or plays back content data on a hard disk, for example.

BACKGROUND ART

In recent years, a recording and playback device is here to stay: the recording and playback device is an information processing device that records and plays back content data, such as music data, on a hard disk which is storage media.

Some of the recording and playback devices rip music data from a music CD (Compact disk) and records the music data on its hard disk. Others download music data from an external music data delivery server through a network and records the music data on its hard disk (see Patent Document 1, for example).

Patent Document 1: Japanese Patent Publication No. 2000-306332.

By the way, the above recording and playback device uses the hard disk for storage media. That allows the recording and playback device to store hundreds or thousands of pieces of music data in line with its capacity.

In this manner, the recording and playback device uses the hard disk. Therefore, a user does not have to replace storage media many times while he/she has to do so with the music CDs. That improves the usability.

However, on the other hand, the recording and playback device is capable of storing hundreds or thousands of pieces of music data on the hard disk. Therefore, a user has difficulty in remembering all the music data stored in the hard disk.

Accordingly, for example, a user may not be able to remember which music data he/she has already got (or recorded on the hard disk) when he/she tries to download music data through a music data delivery page on the Internet.

DISCLOSURE OF THE INVENTION

The present invention has been made in view of the above points and is intended to provide an information processing apparatus capable of easily notifying a user of which content data have already been recorded.

To solve the above problem, an information processing apparatus according to the present invention includes: communication means for receiving, from an external device, information including content related information related to content; and retrieval means for retrieving, from an recording medium that records content data and the content related information such that the content data and the content related information are associated with one another, the content data corresponding to the content related information included in the information received by the communication means.

In addition, an information processing method according to the present invention includes: a communication step of receiving, from an external device, information including content related information related to content; and a retrieval step of retrieving, from an recording medium that records content data and the content related information such that the content data and the content related information are associated with one another, the content data corresponding to the content related information included in the information received by the communication step.

Furthermore, an information processing program according to the present invention causes an information processing apparatus to execute: a communication step of receiving, from an external device, information including content related information related to content; and a retrieval step of retrieving, from an recording medium that records content data and the content related information such that the content data and the content related information are associated with one another, the content data corresponding to the content related information included in the information received by the communication step.

In this manner, based on the content related information included in the information received from the external device, the content data corresponding to the content related information is retrieved from the recording medium. Accordingly, this allows showing a user whether the content data that matches the content related information included in the received information have been already recorded on the recording medium.

In the present invention, based on the content related information included in the information received from the external device, the content data corresponding to the content related information is retrieved from the recording medium. Accordingly, this allows showing a user whether the content data that matches the content related information included in the received information have been already recorded on the recording medium. Thus, with the information processing apparatus, the information processing method and the information processing program, the user can be easily notified of which content data have been already recorded.

BRIEF DESCRIPTION OF THE DRAWINGS

FIG. 20 is a schematic diagram showing the configuration of an attribute information management table in accordance with a first embodiment of the present invention.

FIG. 21 is a schematic diagram showing the configuration of a track identification table of a CD identification information database in accordance with a first embodiment of the present invention.

FIG. 22 is a schematic diagram showing the configuration of an album identification table of the CD identification information database in accordance with a first embodiment of the present invention.

FIG. 23 is a schematic diagram showing the contents of page information in accordance with a first embodiment of the present invention.

FIG. 30 is a schematic diagram showing a list information screen.

FIG. 31 is a schematic diagram showing the configuration of a radio broadcast information database in accordance with a third embodiment of the present invention.

FIG. 33 is a schematic diagram showing update of on-air list information on an already aired music table in accordance with a third embodiment of the present invention.

FIG. 34 is a schematic diagram showing update of on-air list information on an already aired program table in accordance with a third embodiment of the present invention.

FIG. 35 is a schematic diagram showing relationship between the already aired music table and the already aired program table in accordance with a third embodiment of the present invention.

FIG. 46 is a schematic diagram showing the contents of page information in accordance with a fourth embodiment of the present invention.

BEST MODE FOR CARRYING OUT THE INVENTION

An embodiment of the present invention will be described in detail with reference to the accompanying drawings.

Figure 1:
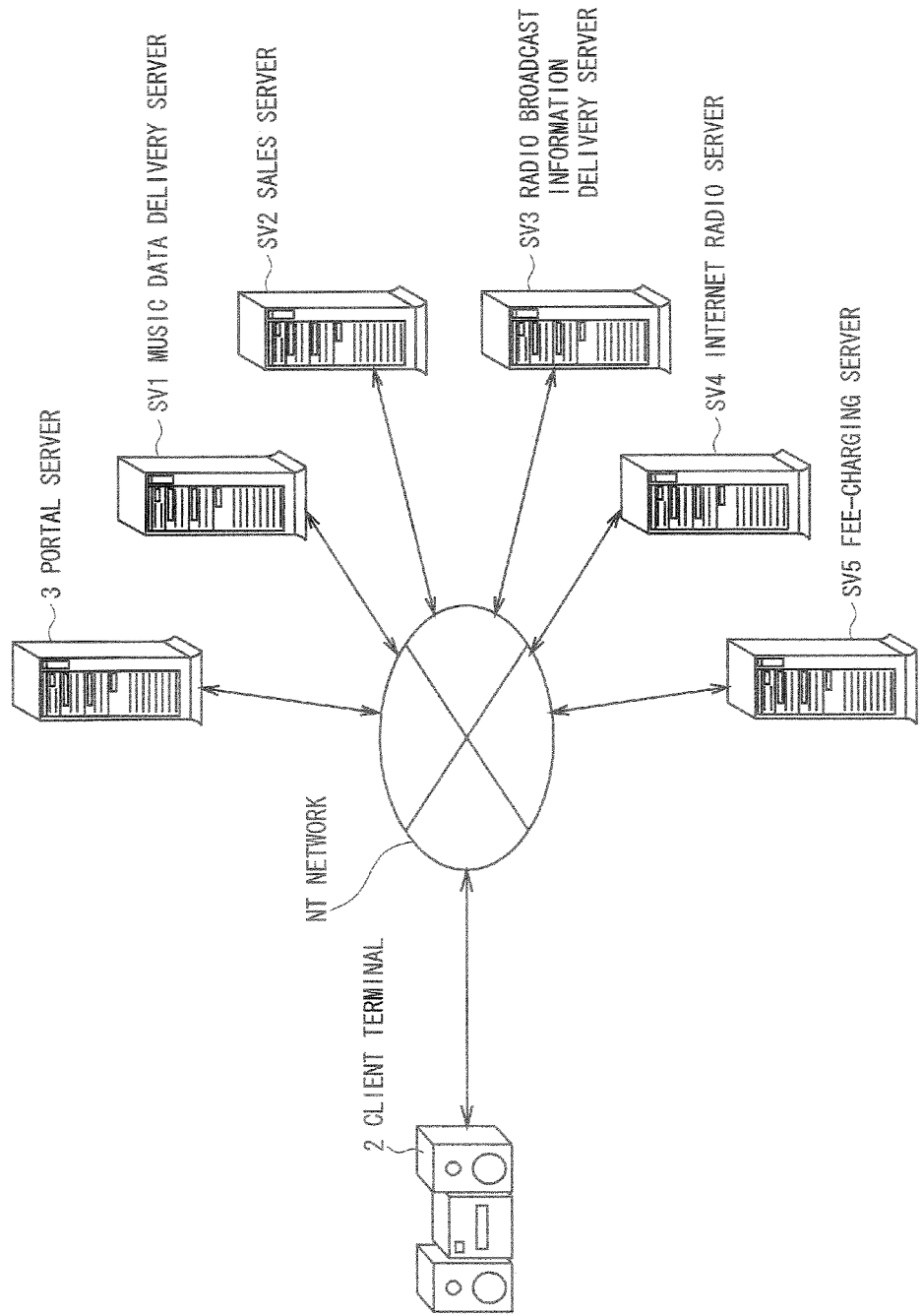
FIG. 1 is a schematic diagram showing the overall configuration of a music related service provision system in accordance with a first embodiment of the present invention.

(1) First Embodiment (1-1) System Configuration of Music Related Service Provision System Referring to FIG. 1, the reference numeral 1 represents a music related service provision system as a whole. The music related service provision system 1 includes a client terminal 2 whose user has contracted with a company operating the music related service provision system 1; a portal server 3, which controls the client terminal 2; and a plurality of servers SV1 through SV5, which provides the client terminal 2 with various services related to music.

In this embodiment, the music data delivery server SV1 provides a music data distribution service of distributing music data to the client terminal 2. The music data has been converted into a format such as ATRAC3 (Adaptive Transform Acoustic Coding 3), AAC (Advanced Audio Coding), WMA (Windows (Registered Trademark) Media Audio), Real-AUDIO G2 Music Codec, MP3 (MPEG Audio Layer-3), and the like.

A product sales server SV2 provides a sales service of selling CDs (Compact Discs), DVDs (Digital Versatile Discs), and the like to users through the client terminal 2.

A radio broadcast information delivery server SV3 provides a radio broadcast information distribution service of distributing to the client terminal 2 radio broadcast information related to music and radio programs broadcast by radio stations.

An Internet radio server SV4 provides an Internet radio broadcast service. In the Internet radio broadcast services, the Internet radio server SV4 supplies radio broadcast data in streaming format to the client terminal 2 via a network NT. In this case, the network NT is equivalent to the Internet.

A fee-charging server SV5 performs a fee-charging process to charge users various fees in response to requests from the portal server 3 and the like.

(1-2) Configuration of Client Terminal 2

(1-2-1) Functional Circuit Block Configuration of Client Terminal 2

Figure 2:
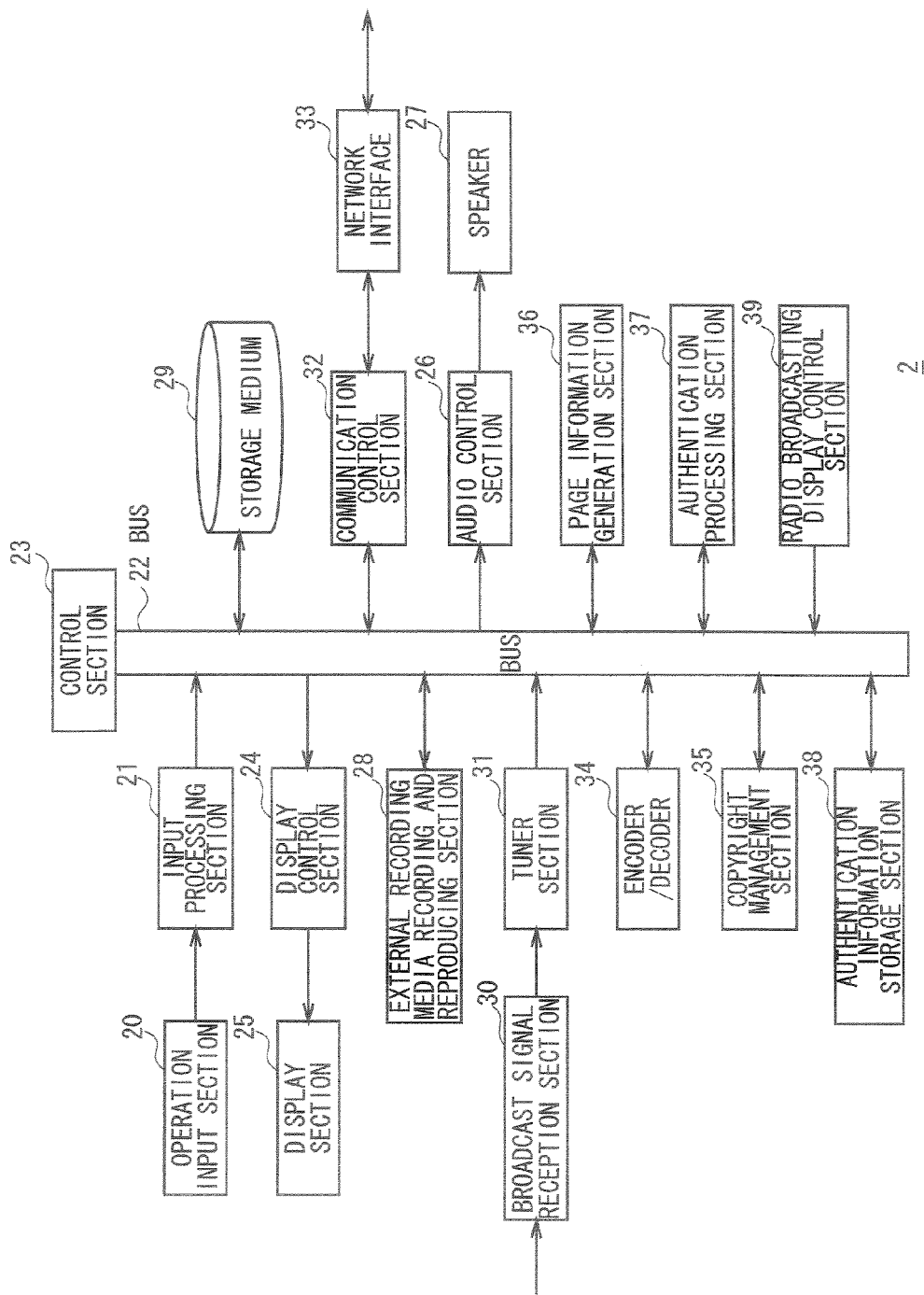
FIG. 2 is a block diagram showing the configuration of a client terminal using functional circuit blocks in accordance with a first embodiment of the present invention.

The following describes the hardware configuration of the client terminal 2 using functional circuit blocks. As shown in FIG. 2, the client terminal 2 has an operation input section 20 including various kinds of buttons. The operation input section 20 is disposed on a housing of the client terminal 2 or remote control (not shown). If a user operates the operation input section 20, the operation input section 20 detects the operation, and then supplies an operation input signal corresponding to the operation to an input processing section 21.

The input processing section 21 transforms the operation input signal from the operation input section 20 into a specific operation command, and then transmits the operation command to a control section 23 through a bus 22.

The control section 23 has been connected to each circuit via the bus 22. The control section 23 controls operation of each circuit based on the operation command and a control signal supplied from the circuits.

A display control section 24 receives video data through the bus 22, and then performs digital-to-analog conversion to the video data to generate an analog video signal. The display control section 24 subsequently supplies the analog video signal to a display section 25.

The display section 25, which is for example a display device such as a liquid crystal display, may be disposed on the housing directly or externally.

The display section 25 receives the analog video signal from the display control section 24, and then displays an image based on the analog video signal. The analog video signal includes a result of processing by the control section 23 or various video data.

An audio control section 26 receives audio data via the bus 22, and then performs digital-to-analog conversion to the audio data to generate an analog audio signal. The audio control section 26 then transmits the analog audio signal to a speaker 27 which then outputs audio based on the analog audio signal supplied from the audio control section 26.

External storage media such as CDs and "MEMORY STICK (Registered Trademark of Sony Corporation)" for example store content data. The "MEMORY STICK (Registered Trademark of Sony Corporation)" includes a flash memory covered with an exterior case. An external recording media recording and reproducing section 28 reads content data from external storage media, and then plays back them. Alternatively, the external recording media recording and reproducing section 28 records content data, which is to be recorded, on external storage media.

When the external recording media recording and reproducing section 28 acquires content data such as video data from an external storage medium, the external recording media recording and reproducing section 28 then transmits the video data to the display control section 24 through the bus 22.

The display control section 24 transforms the video data, which are read out from the external storage medium as content data by the external recording media recording and reproducing section 28, into an analog video signal, and then transmits the analog video signal to the display section 25.

When the external recording media recording and reproducing section 28 acquires content data such as audio data from an external storage medium, the external recording media recording and reproducing section 28 then transmits the audio data to the audio control section 26 via the bus 22.

The audio control section 26 transforms the audio data, which are read from the external storage medium as content data by the external recording media recording and reproducing section 28, into an analog audio signal, and then transmits the analog audio signal to the speaker 27.

The control section 23 supplies the content data read from external storage media by the external recording media recording and reproducing section 28 through the bus 22 to a storage medium 29 in the client terminal 2 to store the content data in the storage medium 29 (storing content data in the storage medium 29 as described above is referred to as ripping).

When the control section 23 acquires content data such as video data from the storage medium 29, the control section 23 then supplies the video data to the display control section 24 through the bus 22. The video data are for example equivalent to image data.

When the control section 23 acquires content data such as audio data from the storage medium 29, the control section 23 then supplies the audio data to the audio control section 26 via the bus 22.

The control section 23 also reads music data from the storage medium 29, and then supplies the music data to the external recording media recording and reproducing section 28 to records the music data on the external storage media.

A broadcast signal reception section 30 receives radio waves from each broadcast station, and then transmits the radio waves to a tuner section 31.

In a case in which a user operates the operation input section 20 to specify a certain radio station, the tuner section 31 under the control of the control section 23 extracts a radio broadcast signal of frequency corresponding to the station specified from the radio waves received by the broadcast signal reception section 30. The tuner section 31 then performs a prescribed reception process to generate audio data, and then supplies the audio data to the audio control section 26 via the bus 22.

The audio control section 26 receives the audio data from the tuner section 31 and then transforms the audio data into an analog audio signal. The audio control section 26 subsequently transmits the analog audio signal to the speaker 27 which then outputs audio of a radio program broadcast from a radio station. Thus, a user can listen to audio of a radio program.

The control section 23 supplies the audio data from the tuner section 31 to the storage medium 29 which then stores the audio data. In this manner, the control section 23 can record audio of a radio program.

The control section 23 also connects to the network NT through a communication control section 32 and a network interface 33. The control section 23 therefore can access the portal server 3 and other servers SV1 through SV5 on the network NT. The control section 23 interchanges various information and data with the portal server 3 and other servers SV1 through SV5.

An encoder/decoder section 34 decodes compressed-coded content data, and then transmits the compressed-coded content data to the display control section 24 or the audio control section 26. The compressed-coded content data is for example obtained from the network NT through the network interface 33 and the communication control section 32. Alternatively, the compressed-coded content data is for example obtained from the storage medium 29 or external storage media.

The encoder/decoder section 34 performs a compression encoding process to generate compressed-coded content data, and then supplies the compressed-coded content data to the storage medium 29. In this case, the content data from external storage media, which is neither compressed nor encoded, the audio data from the tuner section 31, and the like are compressed and encoded by the encoder/decoder section 34.

Accordingly, the content data compressed and encoded by the encoder/decoder section 34 is stored in the storage medium 29 under the control of the control section 23.

The copyright management section 35 generates copyright management information about the content data downloaded from the network NT through the network interface 33 and the communication control section 32. The copyright management section 35 also generates copyright management information about the content data read from external storage media by the external recording media recording and reproducing section 28.

The copyright management information generated by the copyright management section 35 is associated with corresponding content data, and then stored in the storage medium 29 under the control of the control section 23.

The copyright management section 35 properly updates copyright management information associated with content data, when a check-out process of content data between the storage medium 29 and a specific external storage medium is performed, or when a check-in process of content data between the storage medium 29 and a specific external storage medium is performed. In this manner, the copyright management section 35 protects copyright of the content data.

A page information generation section 36 interprets page information, which includes XML (eXtensible Markup Language) files or HTML (Hyper Text Markup Language) files obtained from the network NT via the network interface 33 and the communication control section 32, to generate the video data to be displayed on the display section 25. The page information generation section 36 then supplies the video data to the display control section 24.

An authentication processing section 37 connects to the portal server 3 and other servers SV1 through SV4 on the network NT through the network interface 33. The authentication processing section 37 performs an authentication process such as transmitting authentication information to the portal server 3 and other servers SV1 through SV4 through the communication control section 32 and the network interface 33.

An authentication information storage section 38 stores the authentication information the authentication processing section 37 uses to access the portal server 3 and other servers SV1 through SV4.

A radio broadcasting display control section 39 currently receiving a radio program which a user listens to transmits a request signal, which requests radio broadcast information about the radio program, to the radio broadcast information delivery server SV3, which corresponds to a radio station currently broadcasting the radio program, through the communication control section 32 and the network interface 33.

As a result, the radio broadcasting display control section 39 receives the radio broadcast information from the radio information delivery server SV3 on the network NT via the network interface 33 and the communication control section 32, and then supplies the radio broadcast information to the display control section 24. The display control section 24 displays on the display section 25 the radio broadcast information including a title of the radio program being received, a title of the music being received, an artist name of the music, and the like.

(1-2-2) Directory Management

Figure 3:
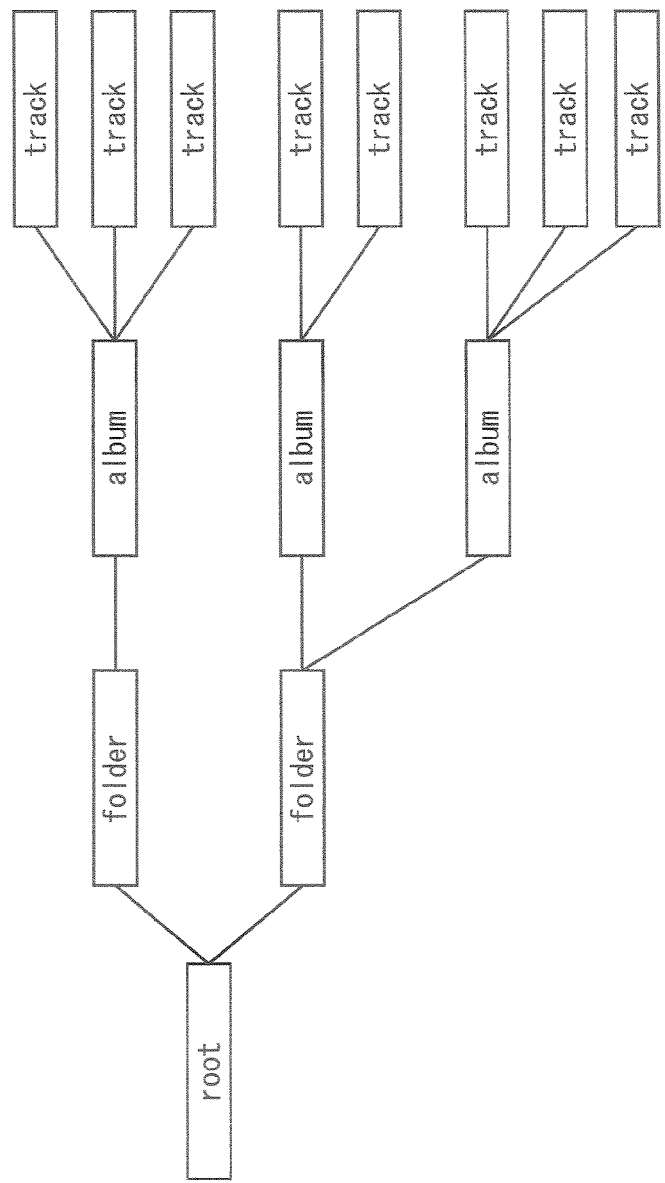
FIG. 3 is a schematic diagram showing a directory structure in accordance with a first embodiment of the present invention.

The control section 23 of the client terminal 2 manages content data stored in the storage medium 29 using a directory structure as shown in FIG. 3. One or more "folder" directories are created under a "root" directory. Specifically, the number of the "folder" directories created under the "root" directory is limited. The created "folder" directories for example correspond to genres of content data, or users who own the client terminal 2.

One or more "album" directories are created under a "folder" directory. Specifically, the number of the "album" directories created under a "folder" directory is limited. Each "album" directory for example corresponds to an album title. One or more "track" files are disposed under an "album" directory, so as to belong to the "album". Each "track" file corresponds to a piece of music, i.e., a content data.

The directory management of content data is performed based on data base files stored in the storage medium 29.

Actually, the directory structure on the storage medium 29 is in a format of database. Therefore, it is easy to move and retrieve files (i.e. content data). The files are associated with their attribute information and stored in the storage medium 29.

By the way, if the files are music data, the attribute information includes the music data's titles, artist names, names of albums on which the music data are recorded, and storage addresses on the storage medium 29.

(1-3) Functional Circuit Block Configuration of Portal Server 3

Figure 4:
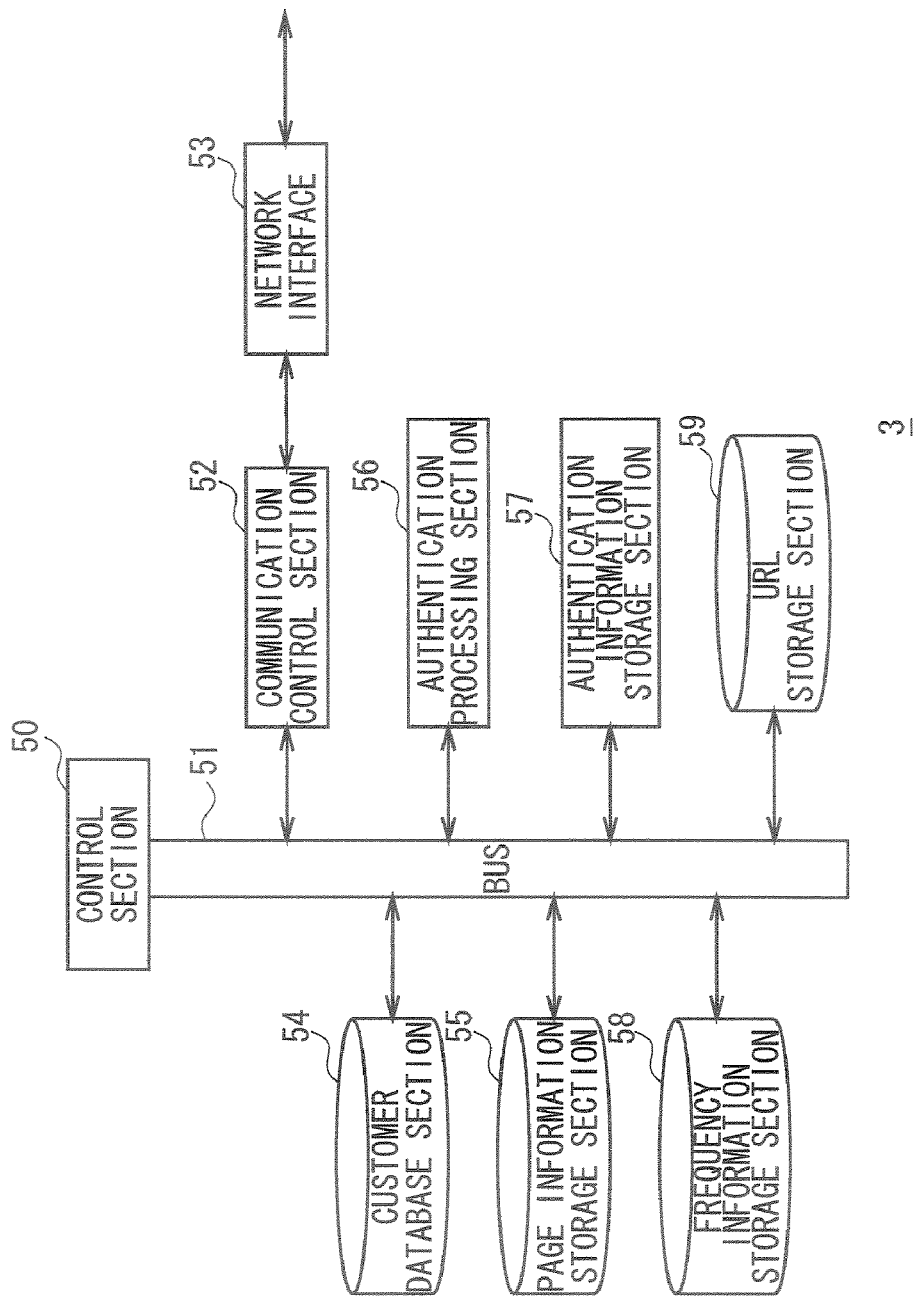
FIG. 4 is a block diagram showing the configuration of a portal server using functional circuit blocks in accordance with a first embodiment of the present invention.

With reference to FIG. 4, the hardware configuration of the portal server 3 will be described using functional circuit blocks. The control section 50 of the portal server 3 controls operation of each circuit connected via a bus 51.

A communication control section 52 under the control of the control section 50 interchanges various kinds of information with the client terminal 2 and other servers SV1 through SV6 via a network interface 53.

A customer database section 54 stores a user ID (Identification) of a user who has contracted with a company operating the music related service provision system 1, along with its password information as customer information.

A page information storage section 55 stores page information and the like. The page information is being managed by the company operating the music related service provision system 1.

By the way, the page information is described in XML language or the like. The page information includes URL (Uniform Resource Locator) information to be used to access the music data delivery server SV1 the product sales server SV2 the radio broadcast information delivery server SV3, the Internet radio server SV4 and the like.

An authentication processing section 56 receives the user ID information and password information from the client terminal 2 through the network interface 53 and the communication control section 52, and then performs a user authentication process. In the processes of user authentication, the authentication processing section 56 checks whether or not the received user ID information and password information have been registered in the customer database section 54 as customer information.

After completing the user authentication processes, the authentication processing section 56 issues "portal authentication result information (equivalent to "authentication session ID information" described below)" showing a result of the user authentication process. The authentication processing section 56 then temporarily stores the portal authentication result information in an authentication information storage section 57.

If the result of the user authentication processes by the authentication processing section 56 indicates a fact that the user is legitimate the control section 50 transmits contractor's page information and portal authentication result information to the client terminal 2 via the communication control section 52 and the network interface 53. The contractor's page information has been stored in a page information storage section 55.

If the result of the user authentication processes by the authentication processing section 56 indicates a fact that the user is not legitimate, the control section 50 may transmit authentication error information and authentication failure notification page information to the client terminal 2 via the communication control section 52 and the network interface 53. In this case the authentication failure notification page information showing a failure of authentication has been stored in the page information storage section 55.

The client terminal 2 may obtain "portal authentication result information (equivalent to "authentication ticket" described below)" from the music data delivery server SV1, the product sales server SV2 or the radio broadcast information delivery server SV3, after the music data delivery server SV1, the product sales server SV2 or the radio broadcast information delivery server SV3 performs an authentication process of a user. In this case, the authentication processing section 56 receives the portal authentication result information from the user's client terminal 2 via the network interface 53 and the communication control section 52, and then compares the portal authentication result information with the one which corresponds to the user and is temporarily stored in the authentication information storage section 57.

The authentication processing section 56 performs an authentication process to the portal authentication result information that the client terminal 2 received from the music data delivery server SV1 the product sales server SV2 or the radio broadcast information delivery server SV3. In the authentication processes the authentication processing section 56 performs a check process to check whether or not the received portal authentication result information is legitimate, and then transmits check result information showing a result of the check through the communication control section 52 and the network interface 53 to the music data delivery server SV1, the product sales server SV2 or the radio broadcast information delivery server SV3.

A frequency information storage section 58 associates the following items together to memorize: a regional code identifying a region, such as a postal code; frequency information showing a radio broadcast frequency receivable in the region; a name of a radio station (which is also referred to as "radio station name") which broadcasts radio programs; and a call sign, which is identification information unique to each radio station.

A URL storage section 59 associates call signs of radio stations with corresponding URL information to stores them. The call sign is unique to each radio station which broadcasts radio programs. The URL information is utilized to acquire radio broadcast information. The radio broadcast information includes information about a radio program currently broadcast from a radio station which corresponds to the call sign associated. The radio broadcast information, which is also referred to as "now-on-air information", for example includes a title of a radio program, and a title of music currently played in the radio program.

(1-4) Functional Circuit Block Configuration of Music Data Delivery Server SV1

Figure 5:
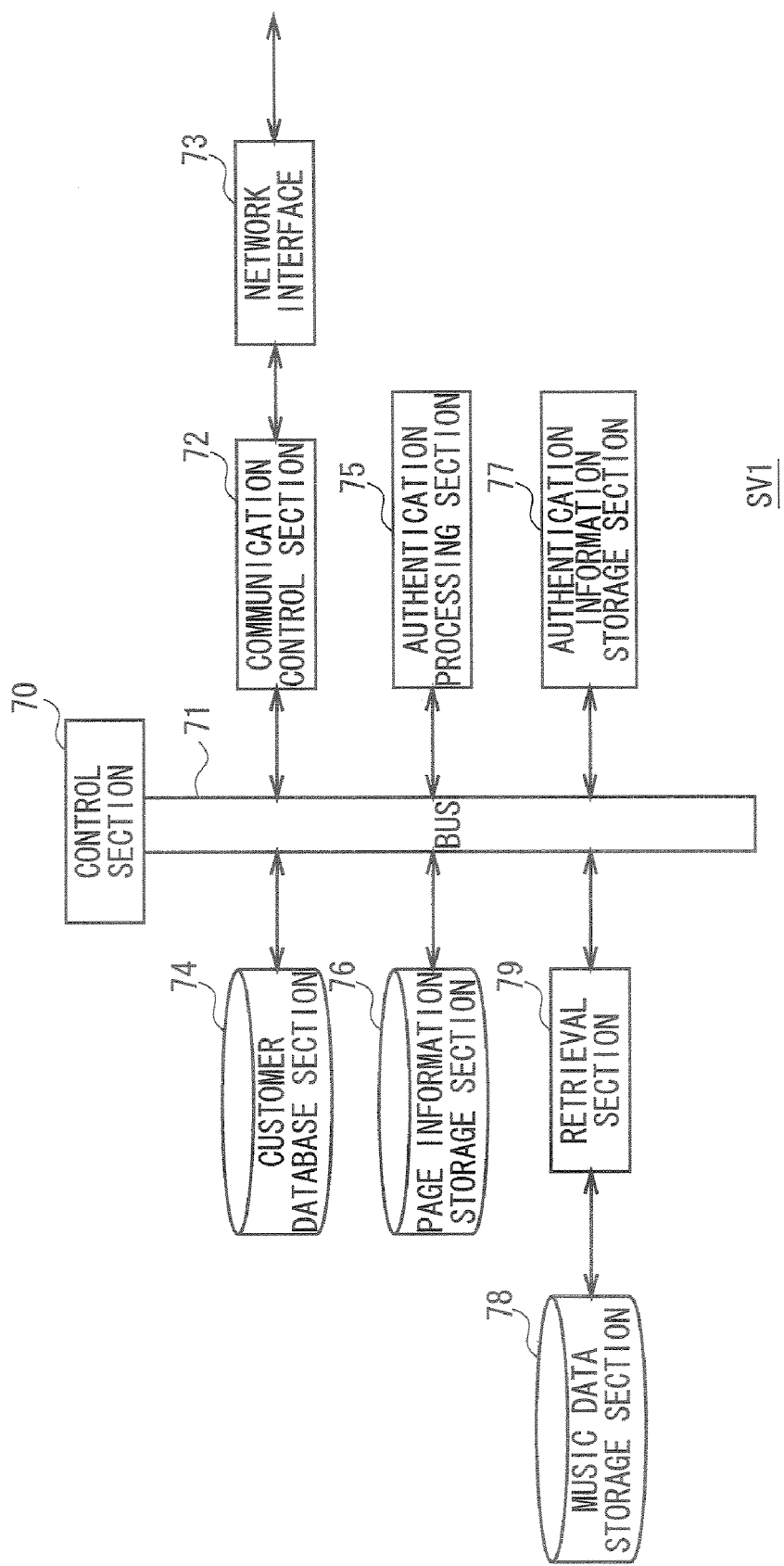
FIG. 5 is a block diagram showing the configuration of a music data delivery server using functional circuit blocks in accordance with a first embodiment of the present invention.

With reference to FIG. 5, the configuration of the music data delivery server SV1 will be described using functional circuit blocks. The control section 70 of the music data delivery server SV1 controls operation of each circuit connected via a bus 71.

A communication control section 72 under the control of the control section 70 interchanges various kinds of information and various kinds of data such as content data with the client terminal 2, the portal server 3, and the like via a network interface 73.

A customer database section 74 stores user ID information of a user who has contracted with a company operating the music data delivery server SV1, along with its password information as customer information. By the way, an authentication processing section 75 may have capabilities to authenticate a user based on portal authentication result information (this portal authentication result information is issued by the portal server 3 to the client terminal 2 and transmitted from the client terminal 2 to the music data delivery server SV1). In this case, the customer database section 74 can be omitted.

A page information storage section 76 stores page information, which is utilized for distribution of music data and presenting downloadable music data (this page information is also referred to as "music-data-distribution page information"), and the like. The page information is managed by the music data delivery server SV1.

The music-data-distribution page information, described in the XML language or the like, has a structure through which a user of the client terminal 2 can select the music data he/she wants to download.

When the client terminal 2 transmits a page information acquisition request signal, which requests the music-data-distribution page information, the control section 70 receives the page information acquisition request signal via the network interface 73 and the communication control section 72. The control section 70 then transmits, in response to the page information acquisition request signal, the music-data-distribution page information stored in the page information storage section 76 to the client terminal 2 via the communication control section 72 and the network interface 73.

When the client terminal 2 transmits the user's user ID information and the password information, the authentication processing section 75 receives the user ID information and the password information via the network interface 73 and the communication control section 72. The authentication processing section 75 then performs a user authentication process. In the user authentication process, the authentication processing section 75 checks whether or not the user ID information and password information received has been registered in the customer database section 74 as customer information.

The authentication processing section 75 may perform another user authentication process, which is different from the one which uses the user ID information and the password information. In this case, the client terminal 2 supplies portal authentication result information (equivalent to an "authentication ticket" described below) issued by the portal server 3. The authentication processing section 75 receives the portal authentication result information via the network interface 73 and the communication control section 72, and then supplies the portal authentication result information to the portal server 3 via the communication control section 72 and the network interface 73.

In this manner, the portal authentication result information is supplied from the authentication processing section 75 to the portal server 3. The portal server 3 then performs an authentication process to the portal authentication result information (i.e. the check process described above), and then supplies the check results information. The authentication processing section 75 receives the check results information via the network interface 73 and the communication control section 72, and then checks whether or not the user is legitimate based on the check results information. In this case, a legitimate user is the one who has contracted with a company operating the music related service provision system 1.

After completing the user authentication process, the authentication processing section 75 issues server authentication result information (equivalent to a "service session ID information" described below). The server authentication result information shows a result of the user authentication process.

If the result of the user authentication process by the authentication processing section 75 indicates a fact that the user is legitimate, the control section 70 transmits the music-data-distribution page information and the server authentication result information to the client terminal 2 via the communication control section 72 and the network interface 73. The music-data-distribution page information for contractors has been stored in the page information storage section 76.

By contrast, when the result of the user authentication process by the authentication processing section 75 shows a fact that the user is not legitimate, the control section 70 transmits authentication error information and authentication failure notification page information to the client terminal 2 via the communication control section 72 and the network interface 73. In this case, the authentication failure notification page information showing a failure of authentication has been stored in the page information storage section 76.

By the way, an authentication information storage section 77 temporarily stores the server authentication result information issued by the authentication processing section 75. The authentication information storage section 77 also stores other authentication information which is necessary for the authentication processing section 75 to authenticate a user of the client terminal 2

A music data storage section 78 has stored compressed-coded music data associated with corresponding retrieval keys. The music data has been compressed and encoded in ATRAC3 format, M-P3 format, or the like. The retrieval key is equivalent to content ID information and the like.

By the way, after the music-data-distribution page information is transmitted to the client terminal 2, the client terminal 2 may transmit a download request signal. The download request signal requests download of music data which a user wants to download, and includes a retrieval key for searching the music data. A retrieval section 79 receives the download request signal via the network interface 73 and the communication control section 72, and then obtains the retrieval key from the download request signal.

The retrieval section 79 then searches a plurality of music data stored in the music data storage section 78 for the music data which meets a retrieval condition indicated by the retrieval key. That is to say, the retrieval section 79 searches for the music data which a user wants to download.

As a result, the control section 70 transmits the searched music data (which a user wants to download) to the client terminal 2 via the communication control section 72 and the network interface 73.

At this times the control section 70 transmits fee-charging information to the fee-charging server SV5 via the communication control section 72 and the network interface 73. The fee-charging information is used to charge users a fee for the music data downloaded to the client terminal 2. The fee-charging server SV5 performs a fee-charging process to charge the user a fee for the downloaded music data.

(1-5) Functional Circuit Block Configuration of Product Sales Server SV2

Figure 6:
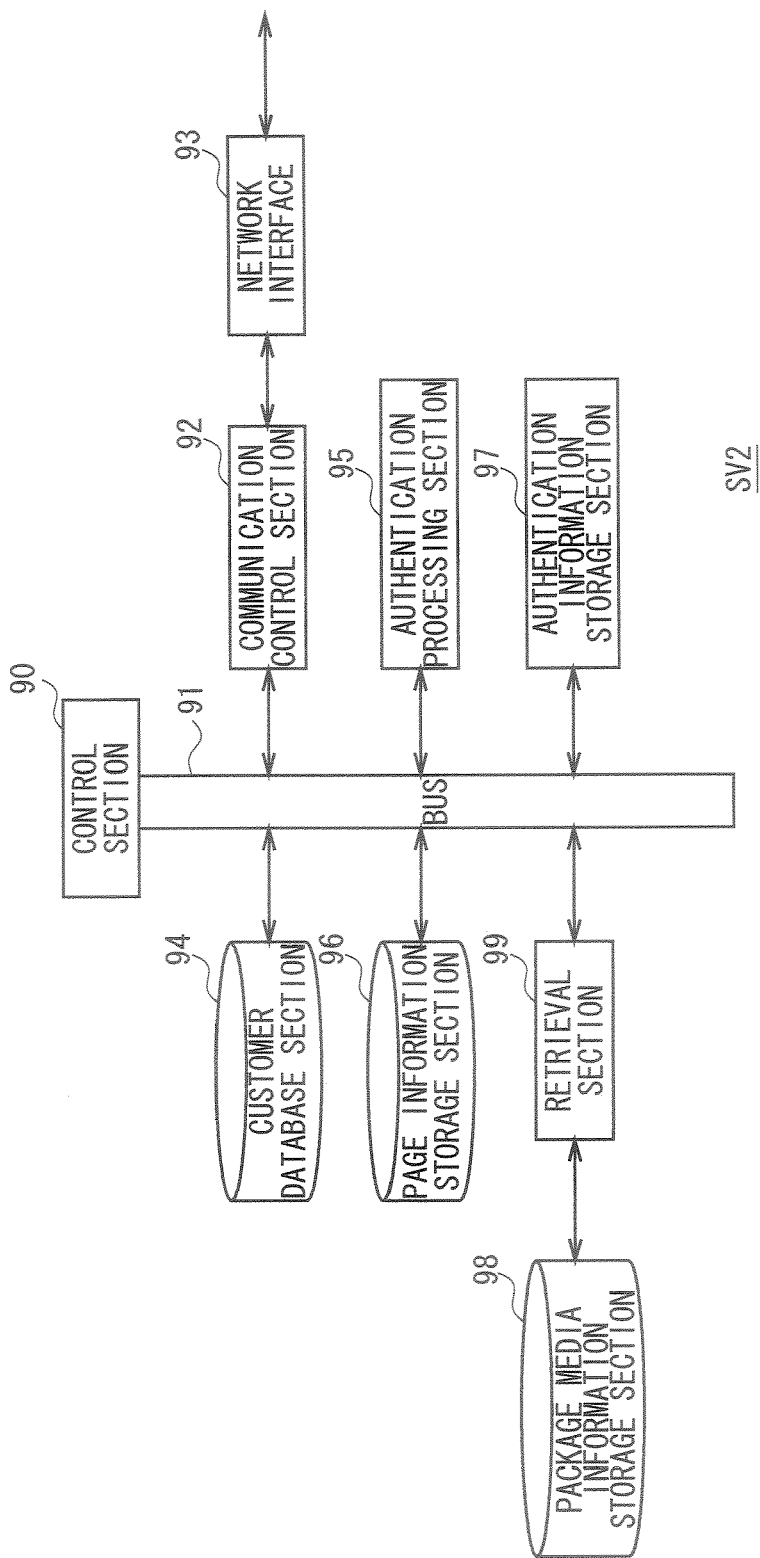
FIG. 6 is a block diagram showing the configuration of a product sales server using functional circuit blocks in accordance with a first embodiment of the present invention.

With reference to FIG. 6, the hardware configuration of the product sales server SV2 will be described using functional circuit blocks. A control section 90 of the product sales server SV2 controls operation of each circuit connected via a bus 91.

A communication control section 92 under the control of the control section 90 interchanges various kinds of information with the client terminal 2, the portal server 3, and the like via a network interface 93.

A customer database section 94 stores user ID information of a user who has contracted with a company operating the product sales server SV2, along with its password information, as customer information. By the way, an authentication processing section 95 may have capabilities to authenticate a user based on portal authentication result information (this portal authentication result information is issued by the portal server 3 to the client terminal 2 and transmitted from the client terminal 2 to the product sales server SV2). In this case, the customer database section 94 can be omitted.

A page information storage section 96 stores page information, which is utilized for sales of package media and presenting package media such as CDs and DVDs for sale (this page information is also referred to as "package-mediasales page information"), and the like. The page information is managed by the product sales server SV2.

The package-media-sales page information, described in the XML language or the like, has a structure through which a user of the client terminal 2 can select package media such as CDs and DVDs which the user wants to buy.

When the client terminal 2 transmits a page information acquisition request signal, which requests the package-media-sales page information, the control section 90 receives the page information acquisition request signal via the network interface 93 and the communication control section 92. The control section 90 then transmits, in response to the page information acquisition request signal, the package-media-sales page information stored in the page information storage section 96 to the client terminal 2 via the communication control section 92 and the network interface 93.

When the client terminal 2 transmits the user's user ID information and the password information, the authentication processing section 95 receives the user ID information and the password information via the network interface 93 and the communication control section 92. The authentication processing section 95 then performs a user authentication process. In the user authentication process, the authentication processing section 95 checks whether or not the user ID information and password information received has been registered in the customer database section 94 as customer information.

The authentication processing section 95 may perform another user authentication process, which is different from the one that uses the user ID information and the password information. In this case, the client terminal 2 transmits portal authentication result information (equivalent to an "authentication ticket" described below) issued by the portal server 3. The authentication processing section 95 receives the portal authentication result information via the network interface 93 and the communication control section 92, and then transmits the portal authentication result information to the portal server 3 via the communication control section 92 and the network interface 93.

In this manner, the portal authentication result information is transmitted from the authentication processing section 95 to the portal server 3. The portal server 3 then performs an authentication process to the portal authentication result information (i.e. the check process described above), and then transmits check results information. The authentication processing section 95 receives the check results information via the network interface 93 and the communication control section 92, and then checks whether or not the user is legitimate based on the check results information. In this case, a legitimate user is the one who has contracted with a company operating the music related service provision system 1.

After completing the user authentication process, the authentication processing section 95. issues server authentication result information (equivalent to a "service session ID information" described below). The server authentication result information shows a result of the user authentication process.

When the result of the user authentication process by the authentication processing section 95 indicates a fact that the user is legitimate, the control section 90 transmits the package-media-sales page information and the server authentication result information to the client terminal 2 via the communication control section 92 and the network interface 93. The package-media-sales page information for contractors has been stored in the page information storage section 96.

Whereas when the result of the user authentication process by the authentication processing section 95 shows a fact that the user is not legitimates the control section 90 transmits authentication error information and authentication failure notification information to the client terminal 2 via the communication control section 92 and the network interface 93. In this case, the authentication failure notification information showing a failure of authentication has been stored in the page information storage section 96.

An authentication information storage section 97 temporarily stores the server authentication result information issued by the authentication processing section 95. The authentication information storage section 97 also stores other authentication information which is necessary for the authentication processing section 95 to authenticate a user of the client terminal 2.

A package media information storage section 98 has stored a plurality of pieces of package media information associated with corresponding retrieval keys. Each piece of package media information relates to a package medium such as CD and DVD for sale. The retrieval key is equivalent to package medium ID information and the like.

By the way, after the package-media-sales page information is transmitted to the client terminal 2 the client terminal 2 may transmits a media information request signal. The media information request signal requests package media information about package media such as CDs and DVDs. A retrieval section 99 receives the media information request signal via the network interface 93 and the communication control section 92 and then obtains a retrieval key from the media information request signal. The retrieval key is used to retrieve a specific package medium.

The retrieval section 99 then searches a plurality of piece of package media information stored in the package media information storage section 98 for a piece of package media information which meets a retrieval condition indicated by the retrieval key.

As a result, the control section 90 transmits the searched package media information to the client terminal 2 via the communication control section 92 and the network interface 93 and therefore shows a user the package media information about the specific package medium.

When the client terminal 2 transmits a purchase request signal which requests a purchase of the package medium the control section 90 receives the purchase request signal via the network interface 93 and the communication control section 92 and then performs a sale process. In the sale processes the control section 90 for example performs a shipping procedure to ship the package medium to the user of the client terminal 2.

At this time, the control section 90 transmits fee-charging information to the fee-charging server SV5 via the communication control section 92 and the network interface 93. The fee-charging information is used to charge a user a fee for the purchased package medium. The fee-charging server SV5 performs fee-charging processes to charge the user a fee for the purchased package medium.

After the fee-charging server SV5 completes the fee-charging processes for the user, the control section 90 subsequently transmits sale completion page information to the client terminal 2 via the communication control section 92 and the network interface 93. The sale completion page information shows a fact that the sale process of the package medium has been completed.

(1-6) Functional Circuit Block Configuration of Radio Broadcast Information Delivery Server SV3

With reference to FIG. 1, the hardware configuration of the radio broadcast information delivery server SV3 will be described using functional circuit blocks. A control section 110 of the radio broadcast information delivery server SV3 controls operation of each circuit connected via a bus 111.

A communication control section 112 under the control of the control section 110 interchanges various kinds of information with the client terminal 2, the portal server 3, and the like via a network interface 113.

A customer database section 114 stores user ID information of a user who has contracted with a company operating the radio broadcast information delivery server SV3, along with its password information as customer information. By the way, an authentication processing section 115 may have capabilities to authenticate a user based on portal authentication result information (this portal authentication result information is issued by the portal server 3 to the client terminal 2 and transmitted from the client terminal 2 to the radio broadcast information delivery server SV3). In this case, the customer database section 114 can be omitted.

A page information storage section 116 stores page information which is used for acquisition of radio broadcast information, and the like. In this case, the radio broadcast information relates to radio programs which have already been broadcast from a radio station corresponding to the radio broadcast information delivery server SV3. The radio broadcast information is also referred to as "on-air-list information", and the page information used for acquisition of on-air-list information is also referred to as "on-air-list-information-distribution page information." The page information is managed by the radio broadcast information delivery server SV3.

The on-air-list-information-distribution page information, described in the XML language or the like, provides an input box and the like through which a user of the client terminal 2 can input retrieval keys of the on-air-list information which he/she wants to obtain A radio program title, a date and time of broadcast of a radio program, and the like could be the retrieval key.

An on-air-list information storage section 117 stores on-air-list information. The on-air-list information is generated by listing the following information: a title of a radio program which has already been broadcast from a radio station corresponding to the radio broadcast information delivery server SV3; a start and end time of broadcast of the program; an artist name and title of music played in the program; the start time of broadcast of the music, and the like.

When the client terminal 2 transmits a page information acquisition request signal which requests on-air-list-information-distribution page information, the control section 110 receives the page information acquisition request signal via the network interface 113 and the communication control section 112. The control section 110 then transmits, in response to the page information acquisition request signal, the on-air-list-information-distribution page information which has been stored in the page information storage section 116 to the client terminal 2 via the communication control section 112 and the network interface 113.

When a user inputs a retrieval key of on-air-list information the user wants to obtain through the on-air-list-information-distribution page information, the client terminal 2 transmits an on-air-list information request signal including the retrieval key. The on-air-list information request signal requests download of the on-air-list information. A retrieval section 118 receives the on-air-list information request signal via the network interface 113 and the communication control section 112, and then obtains the retrieval key from the on-air-list information request signal.

The retrieval section 113 then searches based on the retrieval key, the whole on-air-list information stored in the on-air-list information storage section 117 to extract part of the on-air-list information which meets a retrieval condition indicated by the retrieval key. In this manner, part of on-air-list information the user wants to acquire is obtained.

The control section 110 subsequently transmits the obtained on-air-list information to the client terminal 2 via the communication control section 112 and the network interface 113.

A now-on-air information storage section 119 stores now-on-air information. The now-on-air information is made up of the following items: a title of a radio program currently being broadcast from a radio station corresponding to the radio broadcast information delivery server SV3; a start and end time of broadcast of the program; an artist name and title of music currently being played in the program; a start time of broadcast of the music, and the like.

When the client terminal 2 transmits the users user ID information and the password information with a now-on-air information request signal which requests now-on-air information, the authentication processing section 115 receives the user ID information and the password information via the network interface 113 and the communication control section 112. The authentication processing section 115 then performs a user authentication process. In the user authentication process, the authentication processing section 115 checks whether or not the user ID information and password information received has been registered in the customer database section 114 as customer information.

The authentication processing section 115 may perform another user authentication process. This user authentication process is different from the one which uses the user ID information and the password information. In this case, the client terminal 2 transmits portal authentication result information (equivalent to an "authentication ticket" described below) issued by the portal server 3. The authentication processing section 115 receives the portal authentication result information via the network interface 113 and the communication control section 112, and then transmits the portal authentication result information to the portal server 3 via the communication control section 112 and the network interface 113.

In this manner, the portal authentication result information is transmitted from the authentication processing section 115 to the portal server 3. The portal server 3 then performs an authentication process to the portal authentication result information (i.e. the check process described above), and then transmits check results information. The authentication processing section 115 receives the check results information via the network interface 113 and the communication control section 112, and then checks whether or not the user is legitimate based on the check results information. In this case, a legitimate user is the one who has contracted with a company operating the music related service provision system 1.

When completing the user authentication process, the authentication processing section 115 issues server authentication result information (equivalent to a "service session ID information" described below). The server authentication result information shows a result of the user authentication process.

When the result of the user authentication process by the authentication processing section 115 shows a fact that the user is legitimate, the control section 110 transmits the server authentication result information and the now-on-air information stored in the now-on-air information storage section 119 to the client terminal 2 via the communication control section 112 and the network interface 113.

Whereas when the result of the user authentication process by the authentication processing section 115 shows a fact that the user is not legitimate, the control section 110 transmits authentication error information and authentication failure notification page information to the client terminal 2 via the communication control section 112 and the network interface 113. In this case, the authentication failure notification page information showing a failure of authentication has been stored in the page information storage section 116.

As described above, when the control section 110 receives a request for now-on-air information from a user, the control section 110 supplies the now-on-air information, if the authentication result shows a fact that the user is legitimate. Whereas if the authentication result shows a fact that the user is not legitimate, the control section 110 does not provide a radio broadcast information delivery service. That is to say, the control section 110 does not supply the now-on-air information. The radio broadcast information delivery service is a service provided by the radio broadcast information delivery server SV3.

An authentication information storage section 120 temporarily stores the server authentication result information issued by the authentication processing section 115. The authentication information storage section 120 also stores other authentication information which is necessary for the authentication processing section 115 to authenticate a user of the client terminal 2.

(1-7) Brief Overview of Processes of Each Server

With reference to sequence charts shown in FIGS. 8 through 13, brief overview of processes between the client terminal 2 and the portal server 3 will be described. Also, brief overview of processes between the client terminal 2 and other servers such as the music data delivery server SV1, the product sales server SV2, and the radio broadcast information delivery server SV3 will be described.

(1-7-1) User Authentication Process between Client Terminal 2 and Portal server 3

Figure 8:
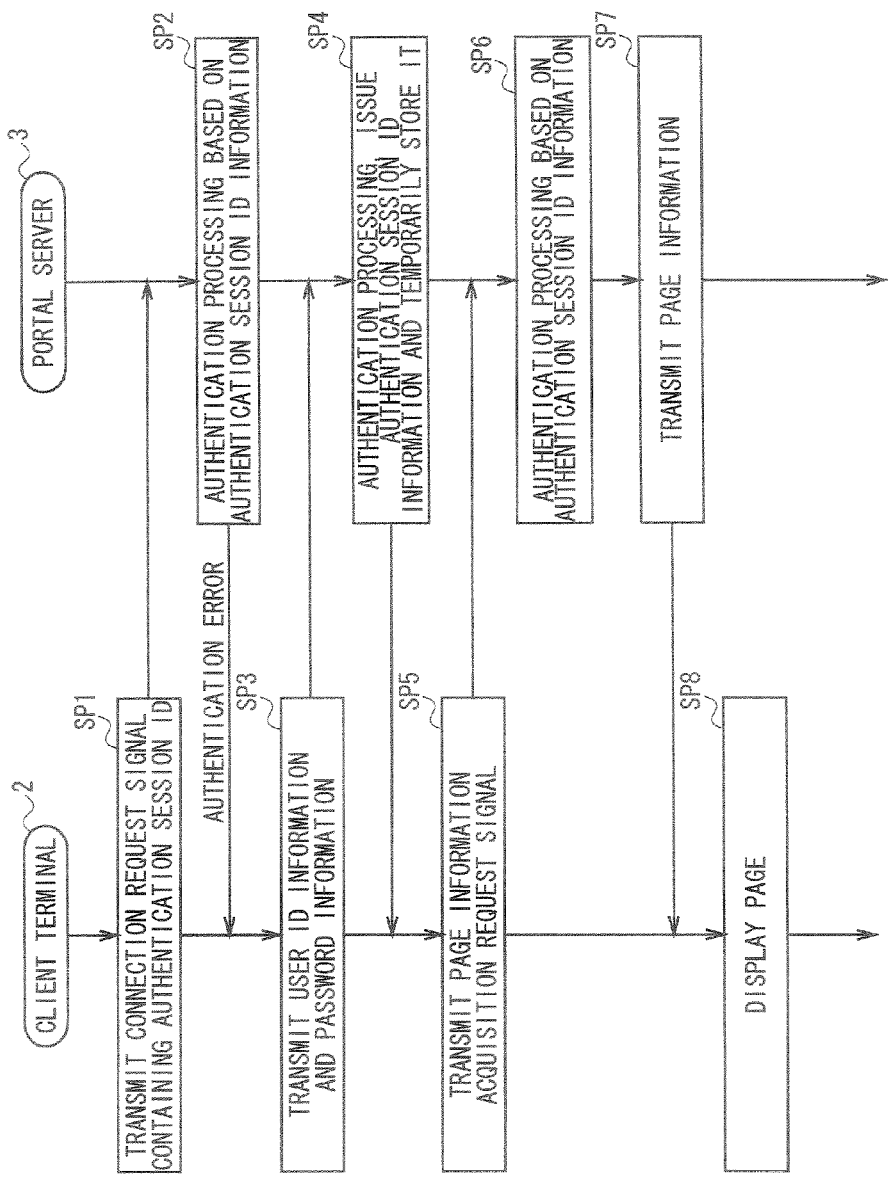
FIG. 8 is a sequence chart showing a user authentication process between the client terminal and the portal server in accordance with a first embodiment of the present invention.

Referring to FIG. 8, a user authentication process between the client terminal 2 and the portal server 3 will be described.

When a user who has contracted with a company operating the music related service provision system 1 operates the client terminal 2 to turn the client terminal 2 on, the operation input section 20 of the client terminal 2 detects an operation input signal. Alternatively, when a user pushes a particular operation button of the operation input section 20, the operation input section 20 detects an operation input signal. The input processing section 21 transforms the operation input signal into an operation command, and supplies the operation command to the control section 23. The control section 23 therefore starts an authentication request process.

At step SP1, after the control section 23 of the client terminal 2 starts an authentication request process, the control section 23 of the client terminal 2 generates a connection request signal, and then transmits the connection request signal to the portal server 3 via the communication control section 32 and the network interface 33. The connection request signal includes authentication session ID information, which has been temporarily stored in the authentication information storage section 38, and the like.

The authentication session ID information is issued by the portal server 3 each time when a communication connection between the client terminal 2 and the portal server 3 is established to perform various processes such as a user authentication process. The authentication session ID information identifies each communication connection state (i.e., session).

The authentication session ID information has a certain period of validity for a user authentication process and the like. The period of validity starts when the portal server 3 issues it. The period of validity for example is one minute.

In a case in which the client terminal 2 that has already obtained the authentication session ID information from the portal server 3 can not submit the authentication session ID information to the portal server 3 within the period of validity, the portal server 3 determines that the communication connection identified by the authentication session ID information has been broken.

In this manner, the portal server 3 prevents the issued authentication session ID information from being used improperly by someone who has not contracted with a company operating the music related service provision system 1 for the purpose of a user authentication process or the like.

In this case, the authentication information storage section 38 temporarily stores the authentication session ID information which was issued by the portal server 3 when the communication connection between the client terminal 2 and the portal server 3 was established for the purpose of user authentication process or the like at a time in the past.

When the client terminal 2 transmits a connection request signal, the control section 50 of the portal server 3 at step SP2 receives the connection request signal via the network interface 53 and the communication control section 52. The control section 50 then transmits the authentication session ID information and the like in the connection request signal to the authentication processing section 56.

The authentication processing section 56 under the control of the control section 50 performs based on the authentication session ID information and the like, an authentication process. This authentication session ID information was received as the connection request signal from the client terminal 2

As a result, when the authentication processing section 56 determines that a user of the client terminal 2 is not legitimate, the control section 50 transmits authentication error information showing authentication error to the client terminal 2 via the communication control section 52 and the network interface 53. In this case, the authentication processing section 56 determines that the user is not legitimate, when the authentication session ID information and the like received from the client terminal 2 have expired, or when there are other reasons.

At step SP3, the control section 23 of the client terminal 2 receives the authentication error information from the portal server 3 via the network interface 33 and the communication control section 32. The control section 23 subsequently obtains user ID information, password information, and the like from the authentication information storage section 38, and then transmits the user ID information, the password information, and the like to the portal server 3 via the communication control section 32 and the network interface 33.

At step SP4, the control section 50 of the portal server 3 receives the user ID information, the password information, and the like from the client terminal 2 via the network interface 53 and the communication control section 52, and then supplies the user ID information, the password information, and the like to the authentication processing section 56.

The authentication processing section 56 under the control of the control section 50 performs a user authentication process. In the user authentication process, the authentication processing section 56 checks whether or not the user ID information, the password information, and the like from the client terminal 2 exist in the customer information registered in the customer database section 54.

As a result, when the authentication processing section 56 determines that a user of the client terminal 2 is legitimate, the authentication processing section 56 under the control of the control section 50 issues portal authentication result information for the client terminal 2. In this case, the portal authentication result information is equivalent to authentication session ID information which identifies the communication connection being maintained between the client terminal 2 and the portal server 3, and the like. The authentication processing section 56 then temporarily stores the authentication session ID information issued and the like in the authentication information storage section 57.

The control section 50 subsequently transmits the authentication session ID information and the like to the client terminal 2 via the communication control section 52 and the network interface 53. The authentication session ID information and the like were issued by the authentication processing section 56 to the client terminal 2.

At step SP5, the control section 23 of the client terminal 2 receives the authentication session ID information and the like from the portal server 3 via the network interface 33 and the communication control section 32 and then supplies the authentication session ID information and the like to the authentication processing section 37.

The authentication processing section 37 under the control of the control section 23 temporarily stores the authentication session ID information and the like received from the portal server 3 in the authentication information storage section 38.

The control section 23 subsequently transmits a page information acquisition request signal along with the authentication session ID information and the like (which were received from the portal server 3 and temporarily stored in the authentication information storage section 38) to the portal server 3 via the communication control section 32 and the network interface 33. The page information acquisition request signal requests the page information from the portal server 3.

At step SP6, the control section 50 of the portal server 3 receives the page information acquisition request signal, the authentication session ID information, and the like from the client terminal 2 via the network interface 53 and the communication control section 52, and then supplies the authentication session ID information, and the like to the authentication processing section 56.

The authentication processing section 56 under the control of the control section 50 then performs a user authentication process. In the user authentication process, the authentication processing section 56 compares the authentication session ID information and the like from the client terminal 2 with the ones temporarily stored in the authentication information storage section 57. The information temporarily stored in the authentication information storage section 57 was issued to the client terminal 2 at step SP4.

At step SP7, when a result of the authentication indicates a fact that a user of the client terminal 2 is legitimate, the authentication processing section 56 determines that the request for page information from the client terminal 2 is legitimate. The authentication processing section 56 then extends the period of validity of the authentication session ID information and the like.

Therefore, the control section 50 reads the page information requested by the user from the page information storage section 55, and transmits the page information, the authentication session ID information, and the like to the client terminal 2 via the communication control section 52 and the network interface 53. The authentication session ID information and the like have their period of validity extended through the authentication processing section 56.

At step SP8, the control section 23 of the client terminal 2 receives the page information, the authentication session ID information and the like from the portal server 3 via the network interface 33 and the communication control section 32. The authentication session ID information and the like have their period of validity extended. The control section 23 of the client terminal 2 then supplies the page information to the page information generation section 36. The control section 23 of the client terminal 2 also supplies the authentication session ID information and the like to the authentication processing section 37.

The page information generation section 36 generates, based on the page information from the control section 23, video data of a page containing links to the music data delivery server SV1, the product sales server SV2, and the radio broadcast information delivery server SV3. The page information generation section 36 subsequently supplies the video data to the display control section 24.

The display control section 24 performs digital-to-analog conversion to the video data from the page information generation section 36 to generate an analog video signal. The display control section 24 subsequently supplies the analog video signal to the display section 25 which then displays, based on the analog video signal, an image of a page of the portal server 3.

The authentication processing section 37 under the control of the control section 23 temporarily stores the authentication session ID information and the like in the authentication information storage section 38. The authentication session ID information and the like which have their period of validity extended were received from the portal server 3. In this case, the authentication session ID information and the like overwrite the ones previously and temporarily stored in the authentication information storage section 38. The information previously and temporarily stored in the authentication information storage section 38 does not have their period of validity extended. In this manner, the authentication session ID information and the like temporarily stored at above step SP5 are updated to the ones having their period of validity extended.

(1-7-2) Procedure of User Authentication Process between Client Terminal 2 and Servers SV1 through SV3

Figure 9:
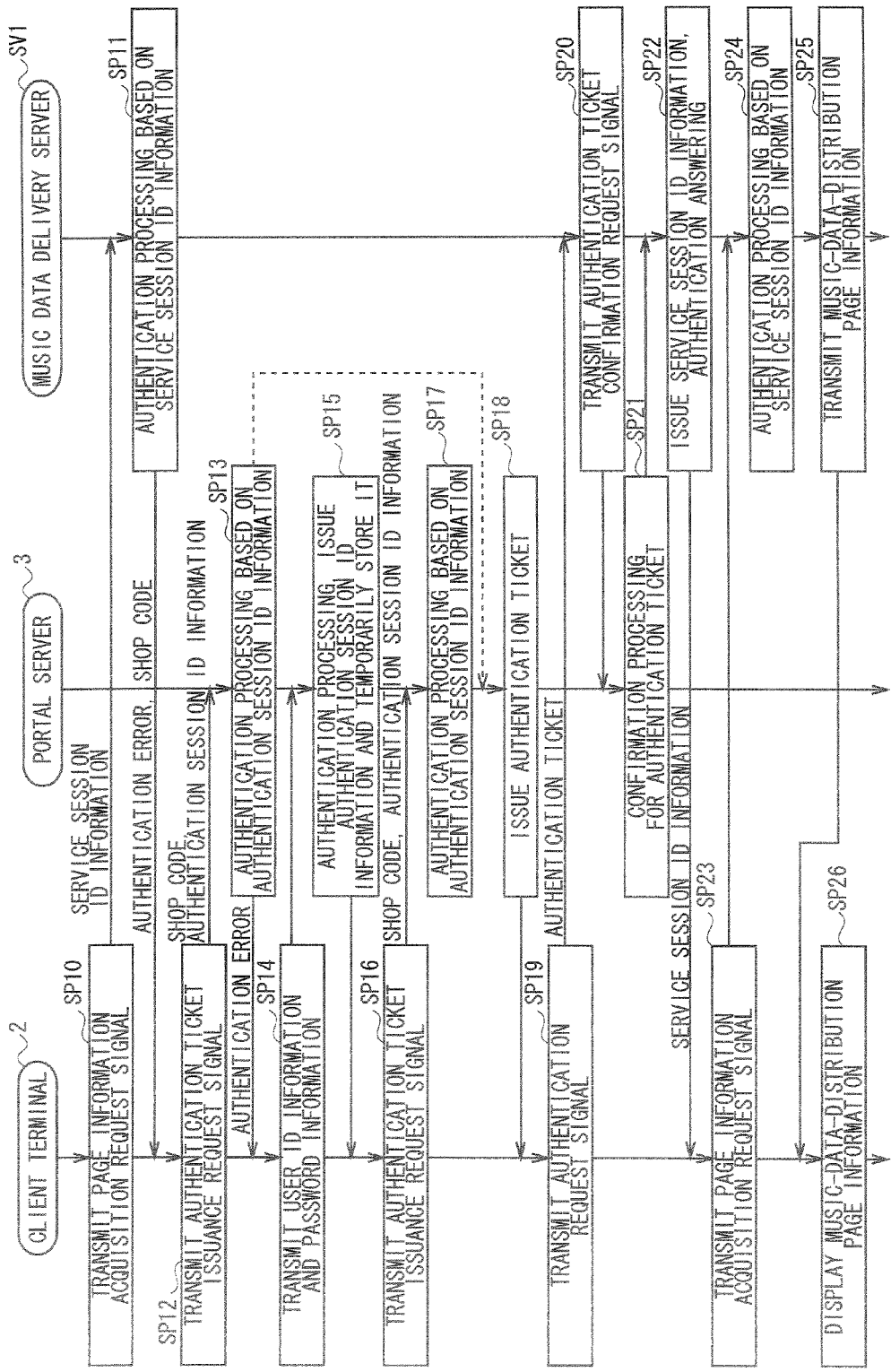
FIG. 9 is a sequence chart showing a user authentication process between the client terminal and the music data delivery server in accordance with a first embodiment of the present invention.

Referring to FIG. 9, a user authentication process will be described. The user authentication process is executed between the client terminal 2 and the music data delivery server SV1, the product sales server SV2 and the radio broadcast information delivery server SV3.

In this case, when the client terminal 2 accesses, after acquiring page information from the portal server 3 as described above (FIG. 8), the music data delivery server SV1, the product sales server SV2 and the radio broadcast information delivery server SV3 based on links embedded in the page information, the user authentication process is executed. This user authentication process is also referred to as an "indirect access authentication process".

In addition, when the client terminal 2 directly accesses the music data delivery server SV1, the product sales server SV2 and the radio broadcast information delivery server SV3 based on the URL information and the like previously bookmarked without obtaining page information from the portal server 3, the user authentication process is executed. This user authentication process is also referred to as a "direct access authentication process".

The indirect access authentication process can be performed in any combination of the following: the client terminal 2 and the music data delivery server SV1; the client terminal 2 and the product sales server SV2; and, the client terminal 2 and the radio broadcast information delivery server SV3.

The direct access authentication process also can be performed in any combination of the following: the client terminal 2 and the music data delivery server SV1; the client terminal 2 and the product sales server SV2; and, the client terminal 2 and the radio broadcast information delivery server SV3.

A difference between the indirect access authentication process and the direct access authentication process is a way of acquiring URL information which the client terminal 2 uses to access the music data delivery server SV1, the product sales server SV2 and the radio broadcast information delivery server SV3. The indirect access authentication process and the direct access authentication process perform the same procedure after obtaining the URL information.

Accordingly, for ease of explanation, the following description uses the music data delivery server SV1 which the client terminal 2 accesses. Both the indirect access authentication process and the direct access authentication process will be collectively described as a user authentication process.

At step SP10, the control section 23 of the client terminal 2 transmits a page information acquisition request signal, the service session ID information read from the authentication information storage section 38, and the like to the music data delivery server SV1 through the communication control section 32 and the network interface 33. At this time, the control section 23 of the client terminal 2 uses the URL information that has been embedded in the page information as links, or has been previously bookmarked. The page information acquisition request signal requests the music-data-distribution page information (if the client terminal 2 accesses the product sales server SV2 or the radio broadcast information delivery server SV3, the page information acquisition request signal requests the package-media-sales page information or the on-air-list-information-distribution page information).

Each time when the communication connection between the client terminal 2 and the music data delivery server SV1, the client terminal 2 and the product sales server SV2, or the client terminal 2 and the radio broadcast information delivery server SV3 is established to perform various processes such as the user authentication process, the service session ID information is issued by the connected server SV1, SV2 or SV3. The service session ID information identifies each communication connection state (i.e. session).

The service session ID information has a certain period of validity of the user authentication processes and the like, in the same way as the above-noted authentication session ID information. The period of validity starts when the music data delivery server SV1, the product sales server SV2 or the radio broadcast information delivery server SV3 issues it. The period of validity for example is one minute.

In a case in which the client terminal 2 that already has the service session ID information issued by the server SV1, SV2 or SV3 can not submit the service session ID information to the issued server SV1, SV2 or SV3 within the period of validity, the issued server SV1, SV2 or SV3 determines that the communication connection identified by the service session ID information has been broken.

In this manner, the music data delivery server SV1, the product sales server SV2 or the radio broadcast information delivery server SV3 prevents the issued authentication session ID information from being used improperly by someone who has not contracted with a company operating the music related service provision system 1 for the purpose of the user authentication process or the like.

In this case, the service session ID information, which is temporarily stored in the authentication information storage section 38, was issued by the music data delivery server SV1 the product sales server SV2 or the radio broadcast information delivery server SV3 when the communication connection between the client terminal 2 and the server SV1, the client terminal 2 and the server SV2 or the client terminal 2 and the server SV3 was established for the purpose of the user authentication process or the like at a time in the past.

At step SP11 the control section 70 of the music data delivery server SV1 receives the page information acquisition request signal, the service session ID information, and the like from the client terminal 2 via the network interface 73 and the communication control section 72. The control section 70 of the music data delivery server SV1 then supplies the service session ID information and the like to the authentication processing section 75.

The authentication processing section 75 under the control of the control section 70 performs the user authentication process. In the user authentication process, the authentication processing section 75 compares the service session ID information and the like from client terminal 2 with those temporarily stored in the authentication information storage section 77.

As a result, if a result of the authentication shows a fact that a user of the client terminal 2 is not legitimate, the authentication processing section 75 determines that the request for music-data-distribution page information from the client terminal 2 is not legitimate. For example, when the service session ID information from the client terminal 2 has expired, the authentication result shows a fact that a user of the client terminal 2 is not legitimate.

The control section 70 subsequently transmits authentication error information showing authentication error, and a shop code identifying the music data delivery server SV1 to the client terminal 2 via the communication control section 72 and the network interface 73 because the authentication processing section 75 determines that a user of the client terminal 2 is not legitimate.

At step SP12, the control section 23 of the client terminal 2 receives the authentication error information and the shop code from the music data delivery server SV1 via the network interface 33 and the communication control section 32. The control section 23 of the client terminal 2 subsequently recognizes that the user is not authenticated as a legitimate user based on the authentication error information and then temporarily stores the shop code from the music data delivery server SV1 in the authentication information storage section 38.

The control section 23 subsequently generates an authentication ticket issuance request signal. The authentication ticket issuance request signal requests an issue of an authentication ticket to be used to access the music data delivery server SV1. The control section 23 then transmits the authentication ticket issuance request signal, the shop code of the music data delivery server SV1, the authentication session ID information, which was temporarily stored in the authentication information storage section 38, and the like to the portal server 3 via the communication control section 32 and the network interface 33.

At step SP13, the control section 50 of the portal server 3 receives the authentication ticket issuance request signal, the shop code, the authentication session ID information, and the like from the client terminal 2 via the network interface 53 and the communication control section 52, and then supplies the information received to the authentication processing section 56.

The authentication processing section 56 under the control of the control section 50 performs a user authentication process. In the user authentication process, the authentication processing section 56 compares the authentication session ID information and the like from the client terminal 2 with those temporarily stored in the authentication information storage section 57.

As a result, if a result of the authentication shows a fact that a user of the client terminal 2 is not legitimate, the authentication processing section 56 determines that the request for authentication ticket from the client terminal 2 is not legitimate. For example, when the authentication session ID information from the client terminal 2 has expired, the result of authentication shows that a user of the client terminal 2 is not legitimate.

The control section 50 subsequently transmits authentication error information showing authentication error to the client terminal 2 via the communication control section 52 and the network interface 53 because the authentication processing section 56 determines that a user of the client terminal 2 is not legitimate.

Whereas if the result of the authentication shows a fact that a user of the client terminal 2 is legitimate, the authentication processing section 56 determines that the request for authentication ticket from the client terminal 2 is legitimate For example, when the authentication session ID information from the client terminal 2 has not expired, the result of the authentication shows a fact that a user of the client terminal 2 is legitimate.

In a case in which the result of the authentication from the authentication processing section 56 shows a fact that a user of the client terminal 2 is legitimate, the control section 50 proceeds to step SP18 as described below.

At step SP14, the control section 23 of the client terminal 2 receives the authentication error information from the portal server 3 via the network interface 33 and the communication control section 32. The control section 23 of the client terminal 2 subsequently reads the user ID information, the password information and the like from the authentication information storage section 38, and then transmits the user ID information, the password information and the like to the portal server 3 via the communication control section 32 and the network interface 33.

At step SP15, the control section 50 of the portal server 3 receives the user ID information, the password information and the like from the client terminal 2 via the network interface 53 and the communication control section 52, and then supplies the user ID information, the password information and the like to the authentication processing section 56.

Therefore, the authentication processing section 56 under the control of the control section 50 performs a user authentication process. In the user authentication process, the authentication processing section 56 checks whether or not the user ID information, the password information and the like from the client terminal 2 exists in the customer information registered in the customer database section 54

As a result, if a result of the authentication shows that a user of the client terminal 2 is legitimate, the authentication processing section 56 under the control of the control section 50 issues authentication session ID information (portal authentication result information) for the communication connection currently maintained between the client terminal 2 and the portal server 3, and the like. The authentication processing section 56 then temporarily stores the authentication session ID information and the like issued to the client terminal 2 in the authentication information storage section 57.

The control section 50 subsequently transmits the authentication session ID information and the like, which were issued to the client terminal 2 by the authentication processing section 56, to the client terminal 2 via the communication control section 52 and the network interface 53.

At step SP16, the control section 23 of the client terminal 2 receives the authentication session ID information and the like from the portal server 3 via the network interface 33 and the communication control section 32 and then temporarily stores the authentication session ID information and the like in the authentication information storage section 38 through the authentication processing section 37.

The control section 23 then regenerates an authentication ticket issuance request signal which requests an issue of an authentication ticket. The control section 23 subsequently transmits the authentication ticket issuance request signal the shop code, which was temporarily stored in the authentication information storage section 38, the authentication session ID information, which was temporarily stored at that time, and the like, to the portal server 3 via the communication control section 32 and the network interface 33.

In this embodiment, the client terminal 2 temporarily stores the shop code in the authentication information storage section 38. However, this invention is not limited to this. The client terminal 2 may interchange again the shop code with the portal server 3 while performing the processes of steps SP12 through SP16. This allows the client terminal 2 to transmit the shop code to the portal server 3 at step SP6 without temporarily storing it in the authentication information storage section 38.

At step SP17, the control section 50 of the portal server 3 receives the authentication ticket issuance request signal, the shop code, the authentication session ID information and the like from the client terminal 2 via the network interface 53 and the communication control section 52, and then supplies the information received to the authentication processing section 56.

The authentication processing section 56 under the control of the control section 50 performs a user authentication process. In the user authentication process, the authentication processing section 56 compares the authentication session ID information and the like from the client terminal 2 with those temporarily stored in the authentication information storage section 57.

If a result of the authentication shows a fact that a user of the client terminal 2 is legitimate, the authentication processing section 56 determines that the request for authentication tickets from the client terminal 2 is legitimate. For example, in a case in which the authentication session ID information and the like from the client terminal 2 have not expired yet, the authentication result shows a fact that a user of the client terminal 2 is legitimate.

Then, the control section 50 proceeds to step SP18, as a user of the client terminal 2 is authenticated as a legitimate user by the authentication processing section 56.

At step SP18 the authentication processing section 56 under the control of the control section 50 issues an authentication ticket (i.e. the portal authentication result information) and the like based on the shop code and the authentication ticket issuance request signal received from the client terminal 2 by the process of step SP17 described above. The authentication ticket allows the client terminal 2 to access the music data delivery server SV1 corresponding to the shop code.

The authentication processing section 56 under the control of the control section 50 temporarily stores the issued authentication ticket and the like in the authentication information storage section 57, and then extends the period of validity of the authentication session ID information and the like issued to the client terminal 2.

The control section 50 then transmits the authentication ticket, the authentication session ID information having its period of validity extended by the authentication processing section 56, and the like to the client terminal 2 via the communication control section 52 and the network interface 53.

At step SP19, the control section 23 of the client terminal 2 receives the authentication ticket, the authentication session ID information having its period of validity extended, and the like from the portal server 3 via the network interface 33 and the communication control section 32, and then supplies the authentication session ID information to the authentication processing section 37.

The control section 23 transmits the authentication ticket which was received from the portal server 3, an authentication request signal, and the like to the music data delivery server SV1 via the communication control section 32 and the network interface 33.

At this time, the authentication processing section 37 under the control of the control section 23 temporarily stores the authentication session ID information and the like in the authentication information storage section 38. The authentication session ID information and the like which have their period of validity extended were received from the portal server 3. In this case, the authentication session ID information and the like overwrite those previously and temporarily stored in the authentication information storage section 38. The information previously and temporarily stored in the authentication information storage section 38 does not have the period of validity extended. In this manner, the authentication session ID information and the like temporarily stored at above-noted step SP16 are updated to those having their period of validity extended.

At step SP20, the control section 70 of the music data delivery server SV1 receives the authentication request signal, the authentication ticket and the like from the client terminal 2 via the network interface 73 and the communication control section 72.

The control section 70 then transmits the authentication ticket which was received from the client terminal 2, an authentication ticket confirmation request signal, which requests a confirmation of the authentication ticket, and the like to the portal server 3 via the communication control section 72 and the network interface 73.

At step SP21, the control section 50 of the portal server 3 receives the authentication ticket confirmation request signal, the authentication ticket, and the like from the music data delivery server SV1 via the network interface 53 and the communication control section 52. The control section 50 of the portal server 3 then supplies the authentication ticket confirmation request signal, the authentication ticket, and the like to the authentication processing section 56.

In response to the authentication ticket confirmation request signal, the authentication processing section 56 under the control of the control section 50 performs a confirmation process to confirm the authentication ticket received from the music data delivery server SV1. In the confirmation process, the authentication processing section 56 compares the authentication ticket and the like from the music data delivery server SV1 with those temporarily stored in the authentication information storage section 57.

If a result of the confirmation by the authentication processing section 56 shows a fact that the authentication ticket and the like from the music data delivery server SV1 are legitimate, the control section 50 transmits confirmation result information to the music data delivery server SV1 via the communication control section 52 and the network interface 53. In this case, the confirmation result information shows that the authentication ticket and the like are legitimate.

At step SP22, the control section 70 of the music data delivery server SV1 receives the confirmation result information from the portal server 3 via the network interface 73 and the communication control section 72, and then supplies the confirmation result information to the authentication processing section 75.

In response to the confirmation result information, the authentication processing section 75 under the control of the control section 70 issues the service session ID information (i.e. the server authentication result information, for the communication connection currently maintained between the client terminal 2 and the music data delivery server SV1, and the like. The authentication processing section 75 then temporarily stores the issued service session ID information and the like in the authentication information storage section 77.

The control section 70 transmits the service session ID information and the like issued to the client terminal 2 by the authentication processing section 75 to the client terminal 2 via the communication control section 72 and the network interface 73.

At step SP23, the control section 23 of the client terminal 2 receives the service session ID information and the like from the music data delivery server SV1 via the network interface 33 and the communication control section 32, and then temporarily stores the service session ID information and the like in the authentication information storage section 38 using the authentication processing section 37.

Therefore the control section 23 transmits a page information acquisition request signal which requests the music-data-distribution page information, the service session ID information and the like to the music data delivery server SV1 via the communication control section 32 and the network interface 33. The service session ID information was received from the music data delivery server SV1 and then temporarily stored in the authentication information storage section 38.

At step SP24, the control section 70 of the music data delivery server SV1 receives the page information acquisition request signal, the service session ID information and the like from the client terminal 2 via the network interface 73 and the communication control section 72, and then supplies the service session ID information and the like to the authentication processing section 75.

The authentication processing section 75 under the control of the control section 70 performs a user authentication process. In the user authentication process, the authentication processing section 75 compares the service session ID information and the like received from the client terminal 2 with those temporarily stored in the authentication information storage section 77. The information temporarily stored in the authentication information storage section 77 was issued to the client terminal 2 by the process of step SP22 described above.

If a result of the authentication shows a fact that a user of the client terminal 2 is legitimate, the authentication processing section 75 determines that the request for music-data-distribution page information from the client terminal 2 is legitimate. For example, when the service session ID information and the like from the client terminal 2 have not expired yet, the result of the authentication shows the fact that a user of the client terminal 2 is legitimate.

Then, the control section 70 proceeds to step SP25, as a user of the client terminal 2 is authenticated as a legitimate user by the authentication processing section 75.

At step SP25, the control section 70 reads out the music-data-distribution page information, which is requested by a user, from the page information storage section 76. The control section 70 also extends the period of validity of the service session ID information and the like issued to the client terminal 2 through the authentication processing section 75.

The control section 70 subsequently transmits the music-data-distribution page information read from the page information storage section 76, the service session ID information having its period of validity extended by the authentication processing section 75, and the like to the client terminal 2 via the communication control section 72 and the network interface 73.

At step SP26, the control section 23 of the client terminal 2 receives the music-data-distribution page information, the service session ID information having its period of validity extended, and the like from the music data delivery server SV1 via the network interface 33 and the communication control section 32. The control section 23 of the client terminal 2 then supplies the music-data-distribution page information to the page information generation section 36. The control section 23 of the client terminal 2 also supplies the service session ID information and the like received from the music data delivery server SV1 to the authentication processing section 37.

The authentication processing section 37 under the control of the control section 23 temporarily stores the service session ID information and the like in the authentication information storage section 38. The service session ID information and the like, which have their periods of validity extended, were received from the music data delivery server SV1. In this case, the service session ID information and the like overwrite those previously and temporarily stored in the authentication information storage section 38. The information previously and temporarily stored in the authentication information storage section 38 does not have the period of validity extended. In this manner, the service session ID information and the like temporarily stored by the process of above-noted step SP23 are updated to those having their period of validity extended.

The page information generation section 36 generates video data based on the music-data-distribution page information, and then supplies the video data to the display control section 24.

The display control section 24 performs digital-to-analog conversion to the video data supplied from the page information generation section 36 to generate an analog video signal. The display control section 24 then supplies the analog video signal to the display section 25. The display section 25 displays an image of the music-data-distribution page based on the analog video signal.

(1-7-3) Music Related Service Provision Processes

After completing the user authentication process (FIG. 9) between the client terminal 2 and the music data delivery server SV1, the client terminal 2 and the product sales server SV2, or the client terminal 2 and the radio broadcast information delivery server SV3, the music related service provision process is executed. With reference to FIG. 10 through FIG. 13, the music related service provision process will be described in the following situation: the client terminal 2 receives a music data distribution service through the music-data-distribution page information obtained during the user authentication process from the music data delivery server SV1; the client terminal 2 receives a sales service through the package-media-sales page information obtained during the user authentication process from the product sales server SV2; and the client terminal 2 receives a radio broadcast information distribution service through the on-air-list-information-distribution page information obtained during the user authentication process from the radio broadcast information delivery server SV3.

(1-7-3-1) Music Data Distribution Service Provision Process

Figure 10:
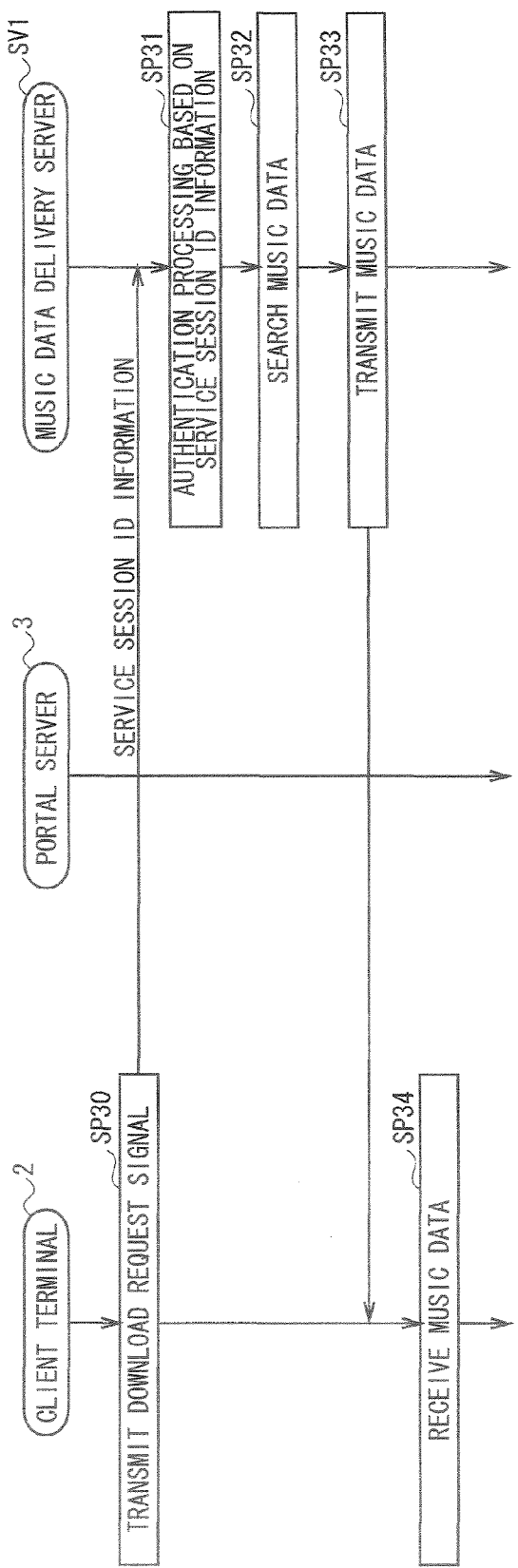
FIG. 10 is a sequence chart showing a music data distribution service provision process in accordance with a first embodiment of the present invention.

Referring to FIG. 10, the music data distribution service provision process will be described. In the music data distribution service provision process, the client terminal 2 receives the music data distribution service from the music data delivery server SV1.

At step SP30, if a control command which selects part of the music-data-distribution page displayed as images on the display section 25 is input through the input processing section 21, the control section 23 of the client terminal 2 generates a download request signal, which requests a download of music data a user wants to download.

The control section 23 then transmits the download request signal, the service session ID information, and the like to the music data delivery server SV1 via the communication control section 32 and the network interface 33. The service session ID information was issued by the music data delivery server SV1 and then temporarily stored in the authentication information storage section 38.

At step SP31, the control section 70 of the music data delivery server SV1 receives the download request signal, the service session ID information and the like from the client terminal 2 via the network interface 73 and the communication control section 72, and then supplies the service session ID information and the like to the authentication processing section 75.

The authentication processing section 75 under the control of the control section 70 performs a user authentication process. In the user authentication process, the authentication processing section 75 compares the service session ID information and the like received from the client terminal 2 with those temporarily stored in the authentication information storage section 77.

If the authentication processing section 75 authenticates a user as a legitimate user, the control section 70 proceeds to step SP32. In this case, the user has requested a download of music data through the client terminal 2.

At step SP32, the retrieval section 79 performs a search process based on a retrieval key in the download request signal. In the search process, the retrieval section 79 searches a plurality of music data stored in the music data storage section 78 for the music data which corresponds to a retrieval condition indicated by the retrieval key and is the one the user wants to download.

When the retrieval section 79 has the music data found, the control section 70 extends the period of validity of the service session ID information and the like issued to the client terminal 2 using the authentication processing section 75, and then proceeds to step SP33.

At step SP33, the control section 70 reads the music data, which the user wants to download and is found by the retrieval section 79, from the music data storage section 78. The control section 70 then transmits the music data, the service session ID information having its period of validity extended by the authentication processing section 75, and the like to the client terminal 2 via the communication control section 72 and the network interface 73.

At step SP34, the control section 23 of the client terminal 2 receives the music data, which the user wants to download, the service session ID information having its period of validity extended, and the like from the music data delivery server SV1 via the network interface 33 and the communication control section 32. The control section 23 of the client terminal 2 then stores the music data in the storage medium 29. The control section 23 of the client terminal 2 also supplies the service session ID information and the like received from the music data delivery server SV1 to the authentication processing section 37.

The authentication processing section 37 under the control of the control section 23 temporarily stores the service session ID information and the like in the authentication information storage section 38. The service session ID information and the like, which have their period of validity extended, were received from the music data delivery server SV1. In this case, the service session ID information and the like overwrite those previously and temporarily stored in the authentication information storage section 38. The information previously and temporarily stored in the authentication information storage section 38 does not have the period of validity extended. In this manner, the service session ID information and the like temporarily stored are updated to those having their period of validity extended.

As described above, the client terminal 2 is capable of downloading the music data, which a user wants to acquire, using the music data distribution service provided by the music data delivery server SV1

(1-7-3-2) Product Sales Service Provision Process

Figure 11:
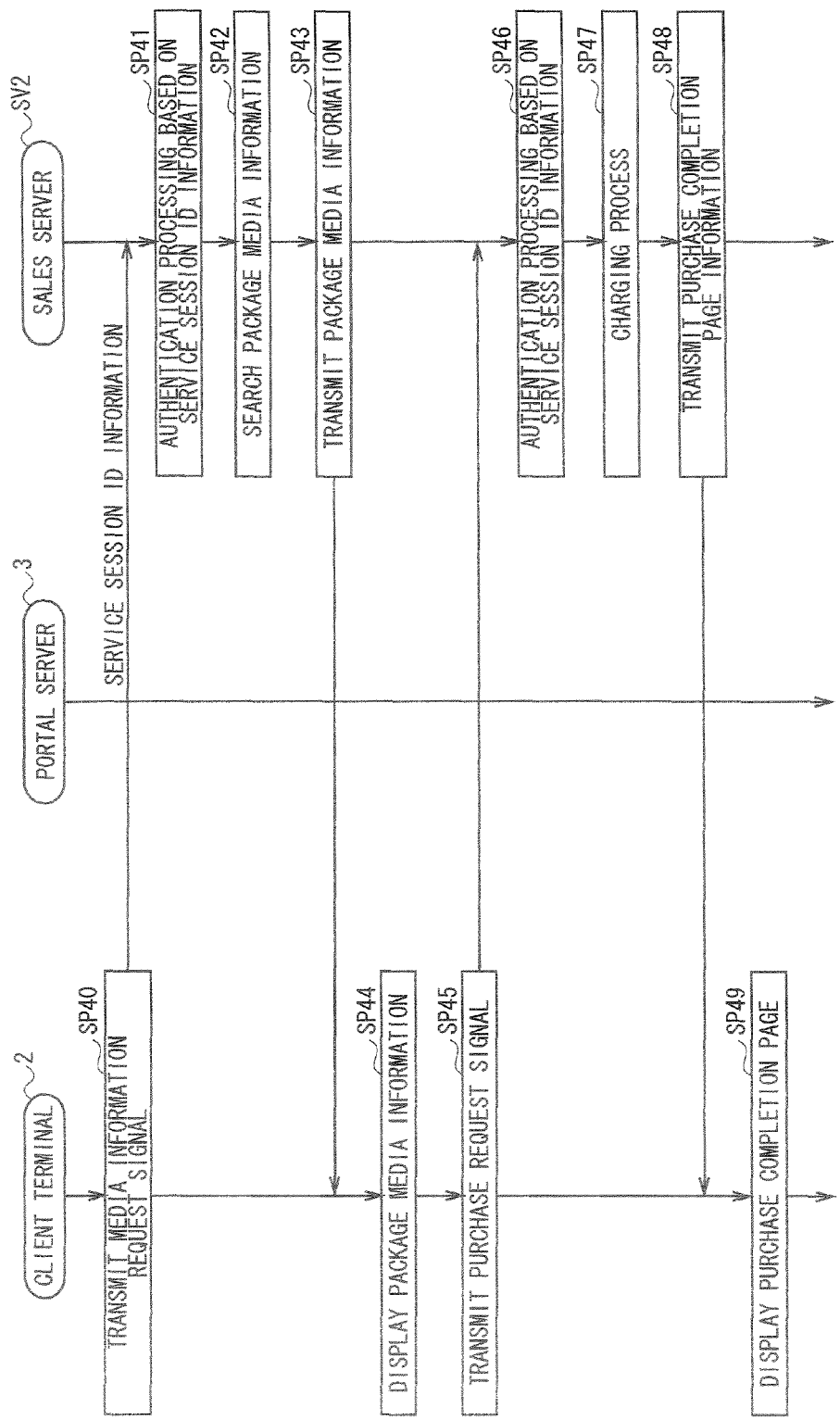
FIG. 11 is a sequence chart showing a product sales service provision process in accordance with a first embodiment of the present invention.

Referring to FIG. 11, the product sales service provision process will be described. In the product sales service provision process, the client terminal 2 receives a product sales service from the product sales server SV2.

At step SP40, if a control command which selects part of the package-media-sales page information displayed as an image on the display section 25 is input through the input processing section 21, the control section 23 of the client terminal 2 generates a media information request signal. The media information request signal requests package media information relating to a specific package media corresponding to the control command.

The control section 23 then transmits the media information request signal, the service session ID information and the like to the product sales server SV2 via the communication control section 32 and the network interface 33. The service session ID information was issued by the product sales server SV2 and then temporarily stored in the authentication information storage section 38.

At step SP41, the control section 90 of the product sales server SV2 receives the media information request signal, the service session ID information and the like from the client terminal 2 via the network interface 93 and the communication control section 92, and then supplies the service session ID information and the like to the authentication processing section 95.

The authentication processing section 95 under the control of the control section 90 performs a user authentication process. In the user authentication process, the authentication processing section 95 compares the service session ID information and the like received from the client terminal 2 with those temporarily stored in the authentication information storage section 97.

If the authentication processing section 95 authenticates a user as a legitimate user, the control section 90 proceeds to step SP42. In this case, the user has requested the package media information relating to the package media using the client terminal 2.

At step SP42, the retrieval section 99 performs, based on a retrieval key in the media information request signal, a search process. In the search process, the retrieval section 99 searches a plurality of pieces of package media information stored in the package media information storage section 98 for a certain piece of package media information corresponding to a retrieval condition indicated by the retrieval key.

When the retrieval section 99 has the piece of package media information found, the control section 90 extends the period of validity of the service session ID information and the like issued to the client terminal 2 through the authentication processing section 95, and then proceeds to step SP43.

At step SP43, the control section 90 reads out the package media information, which was found by the retrieval section 99, from the package media information storage section 98. The control section 90 then transmits the package media information, the service session ID information having its period of validity extended by the authentication processing section 95, and the like to the client terminal 2 via the communication control section 92 and the network interface 93.

At step SP44, the control section 23 of the client terminal 2 receives the package media information, the service session ID information having its period of validity extended, and the like from the product sales server SV2 via the network interface 33 and the communication control section 32, and then supplies the package media information to the page information generation section 36. The control section 23 of the client terminal 2 also supplies the service session ID information and the like received from the product sales server SV2 to the authentication processing section 37.

The authentication processing section 37 under the control of the control section 23 temporarily stores the service session ID information and the like in the authentication information storage section 38. The service session ID information and the like, which have their period of validity extended, were received from the product sales server SV2. In this case, the service session ID information and the like overwrite those previously and temporarily stored in the authentication information storage section 38. The information previously and temporarily stored in the authentication information storage section 38 does not have the period of validity extended. In this manner, the service session ID information and the like temporarily stored are updated to those having their period of validity extended.

The page information generation section 36 generates, based on the package media information supplied from the control section 23, video data. The page information generation section 36 then transforms the video data into an analog video signal through the display control section 24, and then supplies the analog video signal to the display section 25.

After the display section 25 starts to display an image of the package media information based on the analog video signal, the control section 23 proceeds to step SP45.

At step SP45, if a control command that requests a purchase of the package media corresponding to the package media information displayed as an image on the display section 25 is input through the input processing section 21, the control section 23 generates, in response to the control command, a purchase request signal which requests the purchase of the package media.

The control section 23 then transmits the purchase request signal, the service session ID information having its period of validity extended, and the like to the product sales server SV2 via the communication control section 32 and the network interface 33. The service session ID information was received from the product sales server SV2 and then temporarily stored in the authentication information storage section 38.

At step SP46, the control section 90 of the product sales server SV2 receives the purchase request signal, the service session ID information and the like from the client terminal 2 via the network interface 93 and the communication control section 92, and then supplies the service session ID information and the like to the authentication processing section 95.

The authentication processing section 95 under the control of the control section 90 performs a user authentication process. In the user authentication process, the authentication processing section 95 compares the service session ID information and the like received from the client terminal 2 with those temporarily stored in the authentication information storage section 97.

As a result, if the authentication processing section 95 authenticates the user, who requests the purchase of the package media through the client terminal 2, as a legitimate user, the control section 90 proceeds to step SP47.

At step SP47, the control section 90 performs a product sales process. In the product sales process, the control section 90 executes a procedure to deliver the requested package media to the user of the client terminal 2. The control section 90 also transmits fee-charging information to the fee-charging server SV5 via the communication control section 92 and the network interface 93. The fee-charging information is used to charge the user a fee for the purchased package media. Therefore, the fee-charging server SV5 performs a fee-charging process to charge the user a fee for the purchased package media.

The control section 90 also extends the period of validity of service session ID information and the like issued to the client terminal 2 using the authentication processing section 95.

At step SP48, after completing the fee-charging process, the control section 90 transmits purchase completion page information showing a completion of the purchase of package media, the service session ID information having its period of validity extended by the authentication processing section 95, and the like to the client terminal 2 via the communication control section 92 and the network interface 93.

At step SP49, the control section 23 of the client terminal 2 receives the purchase completion page information, the service session ID information having its period of validity extended, and the like from the product sales server SV2 via the network interface 33 and the communication control section 32, and then supplies the purchase completion page information to the page information generation section 36. The control section 23 also supplies the service session ID information and the like received from the product sales server SV2 to the authentication processing section 37.

The authentication processing section 37 under the control of the control section 23 temporarily stores the service session ID information and the like in the authentication information storage section 38. The service session ID information and the like, which have their period of validity extended, were received from the product sales server SV2. In this case, the service session ID information and the like overwrite those previously and temporarily stored in the authentication information storage section 38. The information previously and temporarily stored in the authentication information storage section 38 does not have the period of validity extended. In this manner, the service session ID information and the like temporarily stored are updated to those having their period of validity extended.

The page information generation section 36 generates, based on the purchase completion page information supplied from the control section 23, video data. The page information generation section 36 subsequently transforms the video data into an analog video signal through the display control section 24, and then supplies the analog video signal to the display section 25.

Therefore, the control section 23 can display, based on the analog video signal, an image of the purchase completion page on the display section 25

As described above, the client terminal 2 allows a user to purchase the package media he/she wants using the sales services provided by the product sales server SV2.

(1-7-3-3) On-Air-List Information Distribution Service Provision Process

Figure 12:
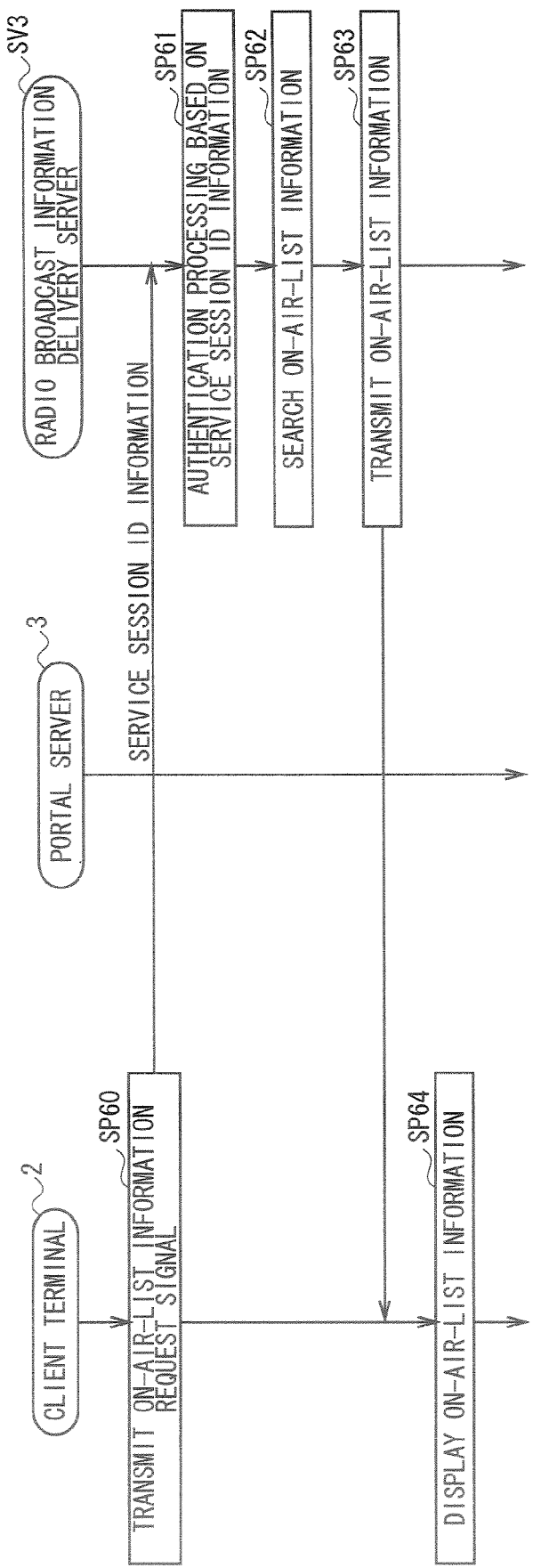
FIG. 12 is a sequence chart showing a radio broadcast information (on-air list information) distribution service provision process in accordance with a first embodiment of the present invention.

With reference to FIG. 12, a radio broadcast information distribution service provision process will be described. In the radio broadcast information distribution service provision process, the client terminal 2 receives especially an on-air-list information distribution service as the radio broadcast information distribution service from the radio broadcast information delivery server SV3.

At step SP60, a user input a retrieval key in an input box disposed on the on-air-list-information-distribution page displayed as an image on the display section 25. The retrieval key, which is used to retrieve the on-air-list information, is a character string corresponding to the on-air-list information the user wants to obtain. At this time, a control command corresponding to the character string is input through the input processing section 21. The control section 23 of the client terminal 2 generates, based on the control command input, an on-air-list information request signal which requests a download of the on-air-list information the user wants to obtain.

The control section 23 then transmits the on-air-list information request signal, the service session ID information temporarily stored in the authentication information storage section 38, and the like to the radio broadcast information delivery server SV3 via the communication control section 32 and the network interface 33. The service session ID information was issued by the radio broadcast information delivery server SV3.

At step SP61, the control section 110 of the radio broadcast information delivery server SV3 receives the on-air-list information request signal, the service session ID information and the like from the client terminal 2 via the network interface 113 and the communication control section 112, and then supplies the service session ID information and the like to the authentication processing section 115.

The authentication processing section 115 under the control of the control section 110 performs a user authentication process. In the user authentication process, the authentication processing section 115 compares the service session ID information and the like received from the client terminal 2 with those temporarily stored in the authentication information storage section 120.

As a result, if the authentication processing section 115 authenticates the user, who requests the on-air-list information using the client terminal 2, as a legitimate user, the control section 110 proceeds to step SP62.

At step SP62, the retrieval section 118 performs, based on the retrieval key in the on-air-list information request signal, a search process in which the retrieval section 118 searches the whole on-air-list information in the on-air-list information storage section 117 for a certain part of the on-air-list information which meets a retrieval condition indicated by the retrieval key to obtain the desired on-air-list information.

When the retrieval section 118 has the on-air-list information found, the control section 110 extends the period of validity of the service session ID information and the like issued to the client terminal 2 through the authentication processing section 115. The control section 110 then proceeds to step SP63.

At step SP63, the control section 110 reads out the on-air-list information, which was found by the retrieval section 118, from the on-air-list information storage section 117. The control section 110 then transmits the on-air-list information, the service session ID information having its period of validity extended by the authentication processing section 115, and the like to the client terminal 2 via the communication control section 112 and the network interface 113.

At step SP64, the control section 23 of the client terminal 2 receives the on-air-list information, the service session ID information having its period of validity extended, and the like from the radio broadcast information delivery server SV3 via the network interface 33 and the communication control section 32, and then supplies the on-air-list information to the page information generation section 36. The control section 23 of the client terminal 2 also supplies the service session ID information and the like received from the radio broadcast information delivery server SV3 to the authentication processing section 37.

The authentication processing section 37 under the control of the control section 23 temporarily stores the service session ID information and the like in the authentication information storage section 38. The service session ID information and the like, which have their period of validity extended, were received from the radio broadcast information delivery server SV3. In this case, the service session ID information and the like overwrite those previously and temporarily stored in the authentication information storage section 38. The information previously and temporarily stored in the authentication information storage section 38 does not have the period of validity extended in this manner, the service session ID information and the like temporarily stored are updated to those having their period of validity extended.

The page information generation section 36 generates, based on the on-air-list information supplied from the control section 23, video data. The page information generation section 36 then transforms the video data into an analog video signal through the display control section 24, and then supplies the analog video signal to the display section 25. The display section 25 therefore displays, based on the analog video signal, an image or the on-air-list information.

As described above, the client terminal 2 allows a user to obtain the desired on-air-list information using the radio broadcast information distribution service provided by the radio broadcast information delivery server SV3.

(1-7-3-4) Now-On-Air Information Distribution Service Provision Process

Figure 13:
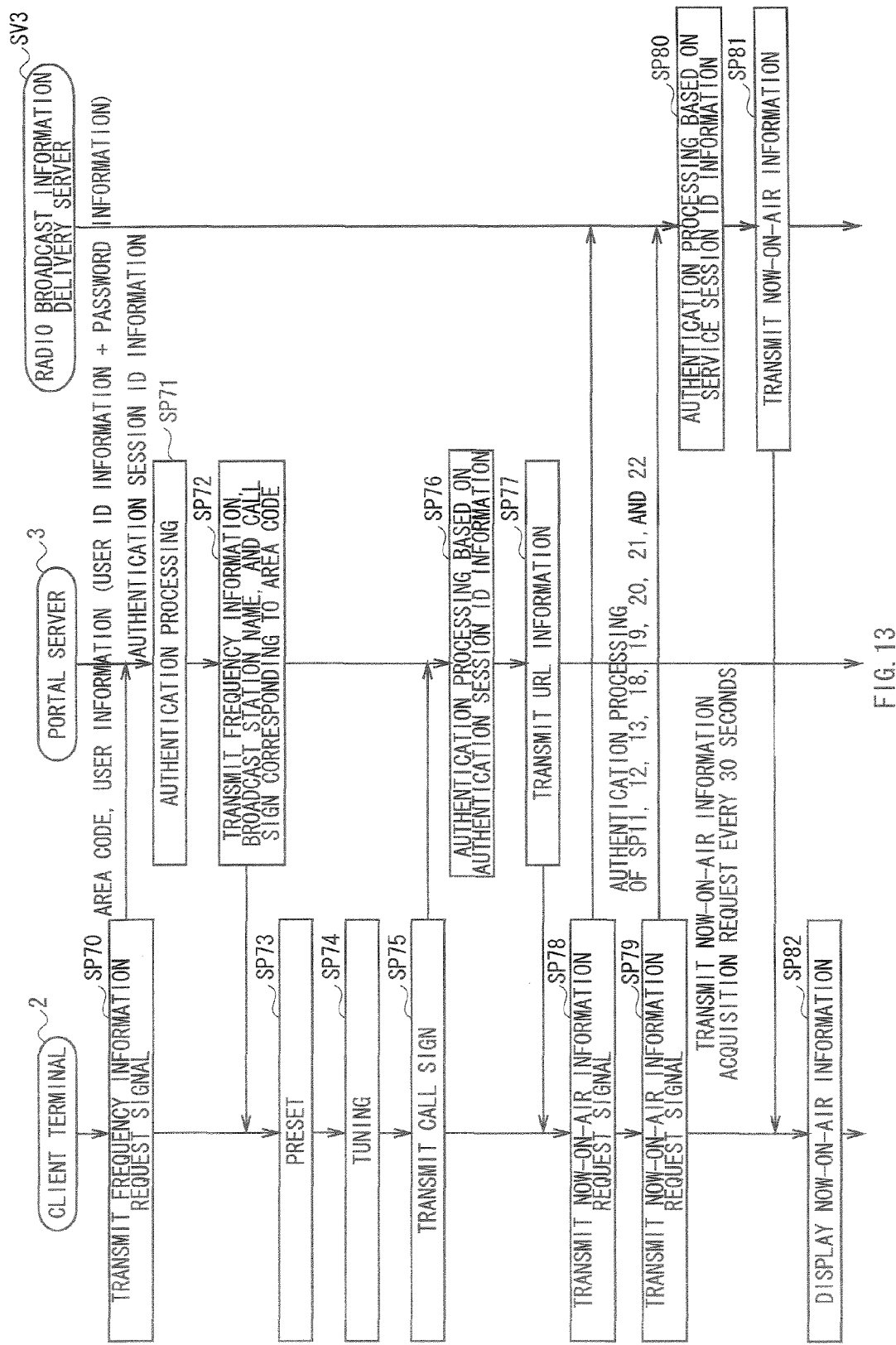
FIG. 13 is a sequence chart showing a radio broadcast information (now-on-air information) distribution service provision process in accordance with a first embodiment of the present invention.

Referring to FIG. 13, the radio broadcast information distribution service provision process will be described. In the radio broadcast information distribution service provision process, the client terminal 2 receives especially the now-on-air information distribution service as the radio broadcast information distribution service from the radio broadcast information delivery server SV3.

There is a plurality of radio broadcast information delivery servers SV3 providing the now-on-air information, each of which corresponds to a different radio station (call sign).

At initial state, the client terminal 2 may not store the URL information of those radio broadcast information delivery servers SV3 corresponding to radio stations.

With the radio broadcast information distribution service provision process described below, the following describes a situation in which the portal server 3 manages the URL information of each radio broadcast information delivery server SV3. Specifically, in this case, the portal server 3 manages a plurality of pieces of URL information, each of which corresponds to a call sign of a radio station.

In addition, with the radio broadcast information distribution service provision process described below, the client terminal 2 does not have the authentication session ID information and the like temporarily stored in the authentication information storage section 38, when requesting frequency information from the portal server 3 to automatically preset broadcast frequencies of radio stations. The frequency information includes the broadcast frequencies. In this case, first of all the client terminal 2 transmits the user ID information, the password information, and the like to the portal server 3.

At step SP70, if an operation command which requests an auto-preset of broadcast frequencies of radio stations is input through the input processing section 21, the control section 23 of the client terminal 2 transmits a frequency information request signal, an area code input by a user, the user ID information and password information stored in the authentication information storage section 38, and the like to the portal server 3 via the communication control section 32 and the network interface 33. The frequency information request signal requests the frequency information about broadcast frequencies of radio stations from which the client terminal 2 can receive their broadcasts.

At step SP71, the control section 50 of the portal server 3 receives the frequency information request signal, the area code, the user ID information, the password information and the like from the client terminal 2 via the network interface 53 and the communication control section 52, and then supplies the user ID information and the password information received from the client terminal 2 to the authentication processing section 56.

The authentication processing section 56 under the control of the control section 50 performs a user authentication process. In the user authentication process, the authentication processing section 56 compares the user ID information, the password information and the like received from the client terminal 2 with the customer information registered in the customer database section 54.

As a result, if the authentication processing section 56 authenticates a user of the client terminal 2 as a legitimate user, the authentication processing section 56 determines that the request for frequency information from the client terminal 2 is legitimate. Therefore, the authentication processing section 56 under the control of the control section 50 issues authentication session ID information and the like. The authentication session ID information identifies the communication connection currently maintained between the client terminal 2 and the portal server 3. The authentication processing section 56 then temporarily stores the authentication session ID information and the like in the authentication information storage section 57.

The control section 50 subsequently proceeds to step SP72, as the authentication processing section 56 authenticates the user as a legitimate user.

At step SP72, the control section 50 retrieves, based on the area code from the client terminal 2, the frequency information, radio station names and call signs corresponding to the area code from a list which is stored in the frequency information storage section 58 and includes a plurality of pieces of frequency information, radio station names and call signs. The control section 50 then reads out the retrieved frequency information, radio station names and call signs in list format.

The control section 50 subsequently transmits the frequency information, radio station names and call signs read from the frequency information storage section 58 in list format, along with the authentication session ID information and the like, to the client terminal 2 via the communication control section 52 and the network interface 53. The authentication session ID information was issued to the client terminal 2 by the authentication processing section 56 at above-noted step SP71.

At step SP73, the control section 23 of the client terminal 2 receives the list, which includes the frequency information, the radio station names and the call signs, from the portal server 3 via the network interface 33 and the communication control section 32. The control section 23 of the client terminal 2 also receives the authentication session ID information and the like from the portal server 3 via the network interface 33 and the communication control section 32. The control section 23 of the client terminal 2 then supplies the authentication session ID information and the like received from the portal server 3 to the authentication processing section 37. The control section 23 of the client terminal 2 also supplies the list, which includes the frequency information, the radio station names and the call signs, to the display control section 24.

The authentication processing section 37 under the control of the control section 23 temporarily stores the authentication session ID information and the like received from the portal server 3 in the authentication information storage section 38.

The display control section 24 supplies the list, which includes the frequency information, the radio station names and the call signs, to the display section 25. The display section 25 therefore displays the list.

At this time, based a selection command input through the input processing section 21, the control section 23 stores the selected frequency information, radio station name and call sign in the storage medium 29 as a preset, and then proceeds to step SP74.

At step SP74, in response to a tuning control command input through the input processing section 21, the control section 23 controls, based on the tuning control command input, the tuner section 31 to extract, from radio waves, a radio broadcast signal of a radio broadcast transmitted in a broadcast frequency corresponding to the tuning control command.

The tuner section 31 therefore extracts the radio broadcast signal in the broadcast frequency from the radio waves received by the broadcast signal reception section 30. The tuner section 31 then performs a prescribed reception process such as decoding to generate audio data, and then supplies the audio data to the audio control section 26.

The audio control section 26 therefore transforms the audio data supplied from the tuner section 31 into an analog audio signal and supplies the analog audio signal to the speaker 27 which then outputs audio of the selected radio program.

At step SP75, the radio broadcasting display control section 39 under the control of the control section 23 reads a call sign from the storage medium 29. In this case, the call sign stored in the storage medium 29 has been associated with the frequency information showing the broadcast frequency corresponding to the above-noted tuning control command. The radio broadcasting display control section 39 then transmits the call sign, the authentication session ID information temporarily stored in the authentication information storage section 38, and the like to the portal server 3 via the communication control section 32 and the network interface 33.

At step SP76, the control section 50 of the portal server 3 receives the call sign, the authentication session ID information and the like from the client terminal 2 via the network interface 53 and the communication control section 52, and supplies the authentication session ID information and the like to the authentication processing section 56.

The authentication processing section 56 under the control of the control section 50 performs a user authentication process. In the user authentication process, the authentication processing section 56 compares the authentication session ID information and the like received from the client terminal 2 with those temporarily stored in the authentication information storage section 57.

As a result, if the authentication processing section 56 authenticates the user, who transmits the call sign using the client terminal 2, as a legitimate user, the control section 50 proceeds to step SP77. In this case, since the authentication session ID information and the like received from the client terminal 2 have not expired yet, the authentication processing section 56 authenticates the user as a legitimate user.

At step SP77, the control section 50 performs, based on the call sign from the client terminal 2, a retrieving process in which the control section 50 retrieves a piece of URL information corresponding to the call sign from among a plurality of pieces of ULR information stored in the URL storage section 59.

The control section 50 also extends the period of validity of the authentication session ID information and the like issued to the client terminal 2 using the authentication processing section 56.

The control section 50 subsequently reads the retrieved URL information from the URL storage section 59, and then transmits the URL information, the authentication session ID information having its period of validity extended by the authentication processing section 56, and the like to the client terminal 2 via the communication processing section 52 and the network interface 53.

At step SP78, the control section 23 of the client terminal 2 receives the URL information, the authentication session ID information having its period of validity extended, and the like from the portal server 3 via the network interface 33 and the communication control section 32, and then supplies the authentication session ID information and the like to the authentication processing section 37. The control section 23 of the client terminal 2 also supplies the URL information to the radio broadcasting display control section 39.

The authentication processing section 37 under the control of the control section 23 temporarily stores the authentication session ID information and the like in the authentication information storage section 38. The authentication session ID information and the like, which have their period of validity extended, were received from the portal server 3. In this case, the authentication session ID information and the like overwrite those previously and temporarily stored in the authentication information storage section 38. The information previously and temporarily stored in the authentication information storage section 38 does not have the period of validity extended. In this manner, the authentication session ID information and the like temporarily stored are updated to those having their period of validity extended.

The radio broadcasting display control section 39 under the control of the control section 23 associates the URL information supplied from the control section 23 with the call sign stored in the storage medium 29, and then temporarily stores them in the storage medium 29 or the like.

Then, the radio broadcasting display control section 39 under the control of the control section 23 transmits a now-on-air information request signal which requests now-on-air information, the service session ID information temporarily stored in the authentication information storage section 38, and the like to the radio broadcast information delivery server SV3 via the communication control section 32 and the network interface 33. In this case, the radio broadcasting display control section 39 transmits, based on the URL information temporarily stored in the storage medium 29 or the like, the now-on-air information request signal. The service session ID information stored in the authentication information storage section 38 was received from the radio broadcast information delivery server SV3.

By the way, in the radio broadcast information distribution service provision process, the process of step SP78 corresponds to the process of step SP10 in FIG. 9. In the process of step SP78, the now-on-air information request signal, the service session ID information and the like are transmitted from the client terminal 2 to the radio broadcast information delivery server SV3.

Accordingly, in the radio broadcast information distribution service provision process, after the process of step SP78, the client terminal 2, the radio broadcast information delivery server SV3 and the portal server 3 performs the same user authentication process as the one made up of step SP11 through SP13 and step SP18 through SP22, and then proceed to step SP79. By the way, the processes of step SP11 through SP13 and step SP18 through SP22 are illustrated in FIG. 9.

At step SP79, the radio broadcasting display control section 39 of the client terminal 2 under the control of the control section 23 re-transmits, based on the URL information temporarily stored in the storage medium 29 or the like, the now-on-air information request signal, the service session ID information temporarily stored in the authentication information storage section 38, and the like to the radio broadcast information delivery server SV3 via the communication control section 32 and the network interface 33. The service session ID information, which was temporarily stored in the authentication information storage section 38 was received from the radio broadcast information delivery server SV3.

At step SP80, the control section 110 of the radio broadcast information delivery server SV3 receives the now-on-air information request signal, the service session ID information and the like from the client terminal 2 via the network interface 113 and the communication control section 112, and then supplies the received authentication session ID information and the like to the authentication processing section 115.

The authentication processing section 115 under the control of the control section 110 performs a user authentication process. In the user authentication process, the authentication processing section 115 compares the service session ID information and the like received from the client terminal 2 with those temporarily stored in the authentication information storage section 120

As a result, if the authentication processing section 115 authenticates the user of the client terminal 2 as a legitimate user, the authentication processing section 115 determines that the request for now-on-air information from the client terminal 2 is legitimate.

After the authentication processing section 115 authenticates the user of the client terminal 2 as a legitimate user, the control section 110 extends the period of validity of the service session ID information and the like issued to the client terminal 2 through the authentication processing section 115, and then proceeds to step SP81.

At step SP81, the control section 110 reads now-on-air information from the now-on-air information storage section 119, and then transmits the now-on-air information, the service session ID information having its period of validity extended by the authentication processing section 115, and the like to the client terminal 2 via the communication control section 112 and the network interface 113.

At step SP82, the control section 23 of the client terminal 2 receives the now-on-air information, the service session ID information having its period of validity extended and the like from the radio broadcast information delivery server SV3 via the network interface 33 and the communication control section 32, and then supplies the service session ID information and the like to the authentication processing section 37. The control section 23 of the client terminal 2 also supplies the now-on-air information to the radio broadcasting display control section 39.

The authentication processing section 37 under the control of the control section 23 temporarily stores the service session ID information and the like in the authentication information storage section 38. The service session ID information and the like, which have their period of validity extended, were received from the radio broadcast information delivery server SV3. In this case, the service session ID information and the like overwrite those previously and temporarily stored in the authentication information storage section 38. The information previously and temporarily stored in the authentication information storage section 38 does not have the period of validity extended. In this manner, the service session ID information and the like temporarily stored are updated to those having their period of validity extended.

The radio broadcasting display control section 39 supplies the now-on-air information supplied from the control section 23 to the display section 25 via the display control section 24. The display section 25 therefore displays the now-on-air information relating to the radio program currently received.

After that, in the radio broadcast information distribution service provision process, the client terminal 2 repeats a request process of now-on-air information (step SP79) at a certain interval of time. When receiving the request from the client terminal 2, the radio broadcast information delivery server SV3 sequentially performs the process of step SP80 and SP81.

In this manner, the client terminal 2 can update the now-on-air information displayed on the display section 25 every second. The now-on-air information includes the following items: a title of a radio program currently received by the client terminal 2; a start time of the radio program; an end time of the radio program; an artist name and title of music currently played in the radio program; and a start time of the broadcast of the music.

(1-8) Hardware Circuit Block Configuration of Client Terminal 2

(1-8-1) Circuit Configuration

The hardware configuration of the client terminal 2 will be described using hardware circuit blocks. In the hardware configuration of the client terminal 2 with the hardware circuit blocks, a part of capabilities of the client terminal 2 is a process performed by software modules as described below.

Figure 14:
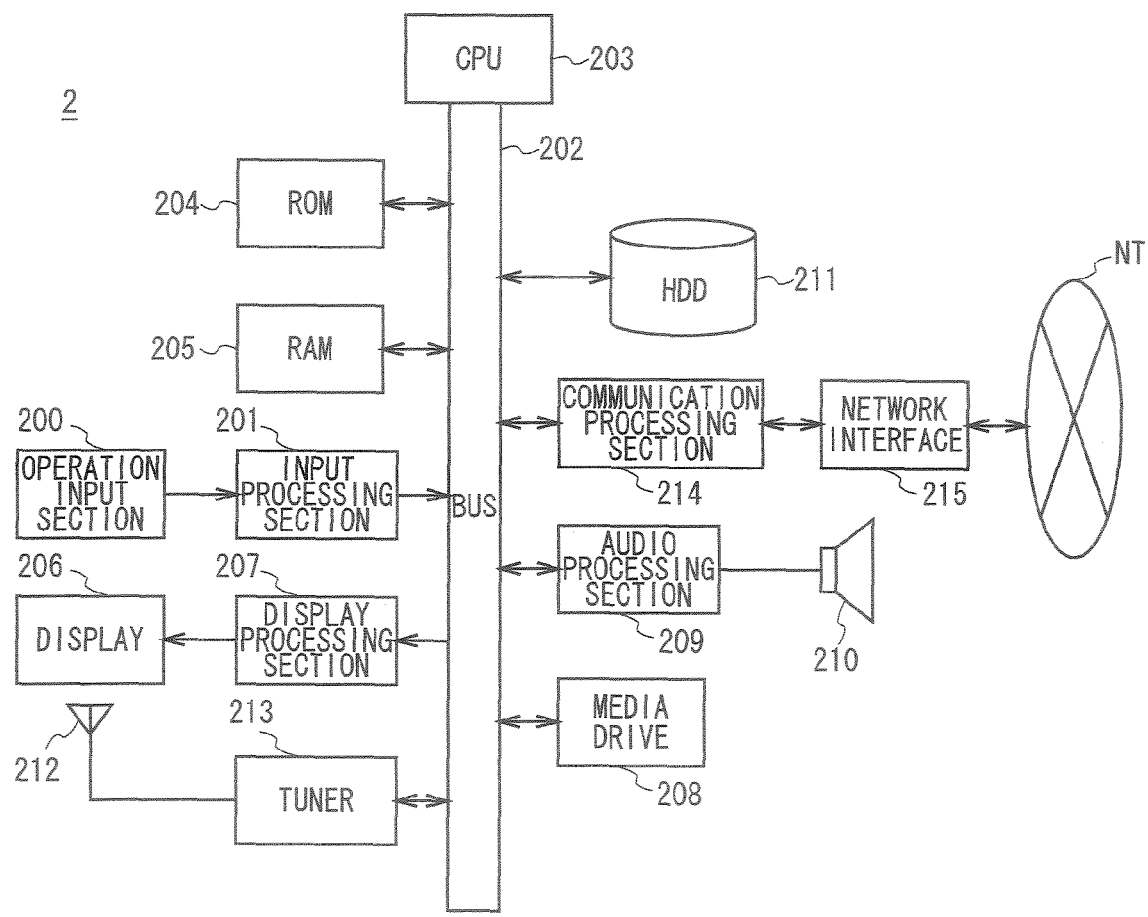
FIG. 14 is a block diagram showing the configuration of a client terminal using hardware circuit blocks in accordance with a first embodiment of the present invention.

Referring to FIG. 14, the client terminal 2 has an operation input section 200 on its housing or a remote control (not shown). The operation input section 200 provides various operation buttons. When a user operates the operation input section 200, the operation input section 200 detects the operation and then supplies an operation input signal corresponding to the operation to an input processing section 201.

The input processing section 201 performs a prescribed process to the supplied operation input signal to transform the operation input signal into an operation command. The input processing section 201 then supplies the operation command via a bus 202 to a CPU (Central Processing Unit) 203

A ROM (Read Only Memory) 204 previously has stored various programs, such as a basic program and an application program. The CPU 203 reads these programs from the ROM 204 via the bus 202, and loads these programs onto a RAM (Random Access Memory) 205. The CPU 203 takes overall control of the client terminal 2 based on the programs, and performs, in response to the operation command supplied from the input processing section 201, a prescribed computation process and various processes.

For example, a display 206 is a display device such as a liquid crystal display. The display 206 may be directly or externally disposed on the housing.

A result of process by the CPU 203 and various video data are supplied to the display 206 via a display processing section 207 as an analog video signal. The display 206 displays an image based on the analog video signal.

For example, CDs and MEMORY STICK (Registered Trademark of Sony Corporation) store content data. The MEMORY STICK includes a flash memory covered with an exterior case A media drive 208, for example, reads the content data from the CD and the "MEMORY STICK (Registered Trademark of Sony Corporation)", and then plays back the content data. Alternatively, the media drive 208 records the content data, which is to be recorded, on the CD or the "MEMORY STICK (Registered Trademark of Sony Corporation)".

When the media drive 208 reads video data (content data) from the CDs or the "MEMORY STICK (Registered Trademark of Sony Corporation)", the media drive 208 supplies the video data to the display processing section 207 via the bus 202.

When the media drive 208 reads audio data (content data) from the CDs or "MEMORY STICK (Registered Trademark of Sony Corporation)", the media drive 208 supplies the audio data to an audio processing section 209.

The display processing section 207 performs digital-to-analog conversion to the video data, which was supplied via the bus 202, to generate an analog video signal. The display processing section 207 then supplies the analog video signal to the display 206. The display 206 displays an image based on the analog video signal.

The audio processing section 209 performs digital-to-analog conversion to the audio data, which was supplied via the bus 202, to generate an analog audio signal. The audio processing section 209 then supplies the analog audio signal to a 2-channel speaker 210 which therefore outputs sound on stereo based on the analog audio signal.

In addition, the CPU 203 is able to supply the content data read by the media drive 208 via the bus 202 to a hard disk drive 211. The hard disk drive 211 stores the content data as content files.

The CPU 203 manages the content data stored in the hard disk drive 211 using the directory configuration illustrated by FIG. 3.

Also, the CPU 203 is capable of reading the content files from the hard disk drive 211 as content data.

When the CPU 203 reads video data (content data) from the hard disk drive 211, the CPU 203 supplies the video data to the display processing section 207 via the bus 202.

When the CPU 203 reads audio data (content data) from the hard disk drive 211, the CPU 203 supplies the audio data to the audio processing section 209.

An antenna 212 receives radio broadcast waves from radio stations. The antenna 212 then supplies the radio broadcast waves to a tuner 213 equivalent to an AM/FM tuner.

For example, a user selects a certain radio station through the operation input section 200. The tuner 213 under the control of the CPU 203 extracts, from the radio broadcast waves received by the antenna 212, a radio broadcast signal of the broadcast frequency corresponding to the selected radio station. The tuner 213 then performs a prescribed reception process to the radio broadcast signal to generate audio data, and then supplies the audio data via the bus 202 to the audio processing section 209.

The audio processing section 209 transforms the audio data supplied from the tuner 213 into an analog audio signal, and then supplies the analog audio signal to the speaker 210 which therefore outputs sound of a radio program broadcast from a radio station. This allows a user to listen to sound of the radio program.

The CPU 203 also may supply the audio data obtained by the tuner 213 to the hard disk drive 211 to record them on the hard disk drive 211. In this manner, the CPU 203 is able to record sound of radio programs.

The CPU 203 connects with a network NT via a communication processing section 214 and a network interface 215. The CPU 203 therefore can access the portal server 3 and other servers SV1 through SV4 on the network NT, and interchange various data with the portal server 3 and other servers SV1 through SV4.

(1-8-2) Configuration of Program Modules

Figure 15:
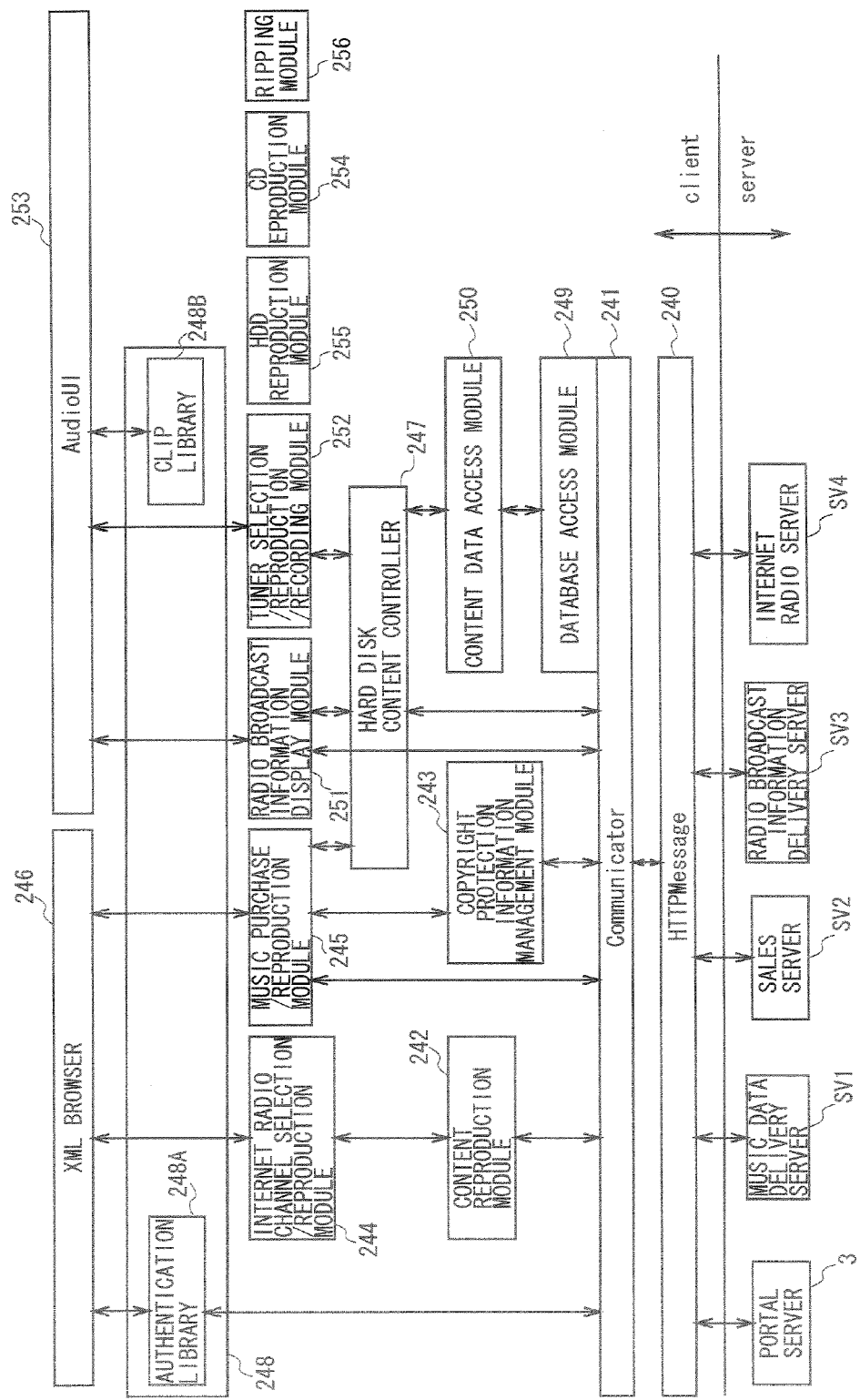
FIG. 15 is a schematic diagram showing program modules of the client terminal in accordance with a first embodiment of the present invention.

Program modules are applied to the client terminal 2 that has the hardware configuration described by the hardware circuit blocks shown in FIG. 14. As shown in FIG. 15, the program modules operate on OS, and interchanges with the portal server 3 and other servers SV1 through SV4.

An HTTP (Hyper Text Transfer Protocol) message program 240 interchanges with the portal server 3 and other servers SV1 through SV4 in HTTP communication. A communicator program 241 interchanges data with the HTTP message program 240.

A content playback module 242 and a copyright protection information management module 243 are disposed above the communicator program 241. The content playback module 242 interprets the codec of contents, and reproduces them. The copyright protection information management module 243 deals with information relating to copyright protection. An Internet radio channel selection/playback module 244 and a music purchase/playback module 245 are disposed on the content playback module 242 and the copyright protection information management module 243 respectively. The Internet radio channel selection/playback module 244 selects channels of Internet radio and plays the selected channels. The music purchase/playback module 245 controls the purchase of music and the playback of demo music.

The Internet radio channel selection/playback module 244 and the music purchase/playback module 245 perform playback process to generate audio data. The audio data is transferred to the audio processing section 209 to output audio from the speaker 210.

A XML browser 246 is disposed above the Internet radio channel selection/playback module 244 and the music purchase/playback module 245. The XML browser 246 interprets XML files received from various servers, and then displays images on the display 206.

For example a user selects a piece of music using the XML browser 246. The music purchase/playback module 245 therefore performs purchasing processes for purchasing the piece of music. The purchased piece of music is supplied via a hard disk content controller 247 to the hard disk drive 211 to stores it on the hard disk drive 211.

The communicator program 241 connects with an authentication library 248. A of a library 248. The authentication library 248A performs various kinds of authentication processes in association with the portal server 3 and the like.

A database access module 249, a content data access module 250, and the hard disk content controller 247 are disposed above the communicator program 241.

The database access module 249 accesses various kinds of databases disposed in the hard disk drive 211. The content data access module 250 accesses content data stored in the hard disk drive 211. The hard disk content controller 247 manages content data stored in the hard disk drive 211.

A radio broadcast information display module 251 and a tuner selection/playback/recording module 252 are disposed above the hard disk content controller 247. The radio broadcast information display module 251 performs processes for displaying a title and artist name of music broadcast from radio stations. The tuner selection/playback/recording module 252 selects radio stations. The tuner selection/playback/recording module 252 also records content data (music) received from a radio station on the hard disk drive 211.

For example, a user selects a radio station using an audio user interface 253 to receive music from the radio station. The received music is supplied via the content data access module 250 to the hard disk drive 211 to stores it in the hard disk drive 211.

The tuner selection/playback/recording module 252 performs playback processes to generate audio data (content data). The audio data is supplied to the audio processing section 209 to output audio from the speaker 210.

The radio broadcast information display module 251 uses the tuner selection/playback/recording module 252 to receive radio broadcast information from the radio broadcast information delivery server SV3 via the HTTP message program 240. For example, the received radio broadcast information is now-on-air information about a title and artist name of music currently broadcast by a radio station. The radio broadcast information display module 251 then transmits the information via the audio user interface (UI) 253 to the display 206 which displays the information.

The radio broadcast information, which was transmitted via the audio user interface 253 and displayed on the display 206, may be temporarily stored in a clip library 248B of the library 248. In response to user's instruction, the radio broadcast information is finally transferred via the database access module 249 to the hard disk drive 211 to be recorded on the hard disk drive 211.

A CD playback module 254 controls the media drive 208 to play back CDs.

Audio data played back from CDs by the CD playback module 254 are transferred to the audio processing section 209 to output audio from the speaker 210.

A HDD playback module 255 connects with the hard disk content controller 247 and the copyright protection information management module 243 (the connection is not shown here).

The HDD playback module 255 under the control of the hard disk content controller 247 reads audio data (content data) from the hard disk drive 211. The HDD playback module 255 then reproduces the audio data based on copyright management information supplied from the copyright protection information management module 243.

Audio data, which was reproduced by the HDD playback module 255 based on the copyright management Information, is supplied to the audio processing section 209 and finally output from the speaker 210 as audio.

A ripping module 256 connects with the hard disk content controller 247 and the copyright protection information management module 243 (the connection is not shown here).

The ripping module 256 controls the CD playback module 254, the copyright protection information management module 243, and the hard disk content controller 247 to store (i.e., rip) audio data played back from CDs by the CD playback module 254 and its copyright management information in the hard disk drive 211. Specifically, the copyright management information is supplied from the copyright protection information management module 243 to control the audio data. The storage process of the audio data and copyright management information is also controlled by the hard disk content controller 247.

As for the program modules described above, the HTTP message program 240 and the communicator program 241 can provide the same function as the communication control section 32 of the client terminal 2 (FIG. 2) does.

The content playback module 242 can provide the same function as the encoder/decoder section 34 of the client terminal 2 (FIG. 2) does.

The copyright protection information management module 243 can provide the same function as the copyright management section 35 of the client terminal 2 (FIG. 2) does.

The Internet radio channel selection/playback module 244 can provide the same function as the control section 23 and audio control section 26 of the client terminal 2 (FIG. 2) do.

The music purchase/playback module 245 can provide the same function as the control section 23 and audio control section 26 of the client terminal 2 (FIG. 2) do.

The XML browser 246 can provide the same function as the input processing section 21 and page information generation section 36 of the client terminal 2 (FIG. 2) do.

The hard disk content controller 247, the database access module 249, and the content data access module 250 can provide the same function as the control section 23 of the client terminal 2 (FIG. 2) does.

The authentication library 248A of the library 248 can provide the same function as the authentication processing section 37 and the authentication information storage section 38 of the client terminal 2 (FIG. 2) do.

The clip library 248B of the library 248 can provide the same function as the control section 23 of the client terminal 2 (FIG. 2) does.

The radio broadcast information display module 251 can provide the same function as the radio broadcasting display control section 39 of the client terminal 2 (FIG. 2) does.

The tuner selection/playback/recording module 252 can provide the same function as the control section 23, audio control section 26 and tuner section 31 of the client terminal 2 (FIG. 2) do.

The audio user interface 253 can provide the same function as the input processing section 21, control section 23 and display control section 24 of the client terminal 2 (FIG. 2) do.

The CD playback module 254 can provide the same function as the audio control section 26 and external recording media recording and reproducing section 28 of the client terminal 2 (FIG. 2) do.

The HDD playback module 255 can provide the same function as the control section 23 and audio control section 26 of the client terminal 2 (FIG. 2) do.

The ripping module 256 can provide the same function as the control section 23, external recording media recording and reproducing section 28 and encoder/decoder section 34 of the client terminal 2 (FIG. 2) do.

Accordingly, the client terminal 2 illustrated by FIG. 14 (which has the hardware configuration of hardware circuit blocks) can perform the same processes as the client terminal 2 illustrated by FIG. 2 (which has the hardware configuration of functional circuit blocks) does, as the CPU 203 performs processes based on the above-noted program modules.

(1-9) Configuration of Portal Sever 3

Figure 16:
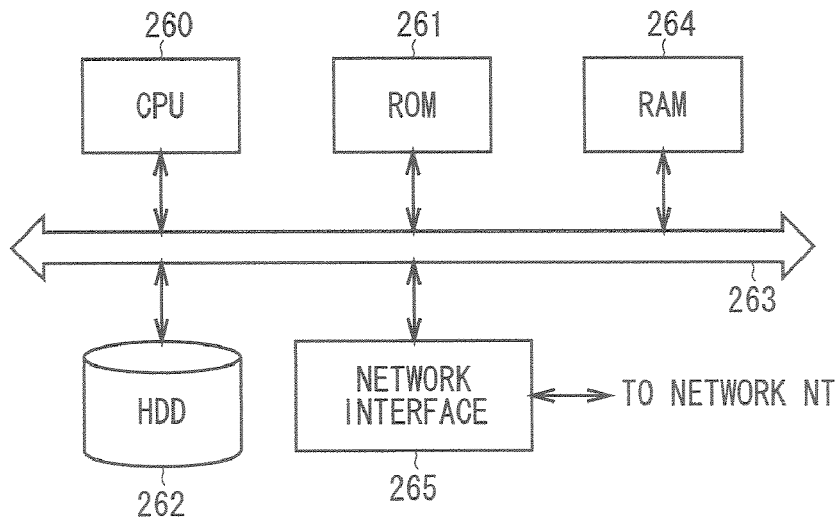
FIG. 16 is a block diagram showing the configuration of the portal server using hardware circuit blocks in accordance with a first embodiment of the present invention.

As shown in FIG. 16, a portal server includes a CPU 260 that takes overall control of the portal server 3. The CPU 260 reads various programs, such as basic programs, from a ROM 261 or a hard disk drive 262 and loads them onto a RAM 264 through a bus 263 to perform various processes such as user authentication process.

For example, when the CPU 260 of the portal server 3 receives user ID information, password and the like from the client terminal 2 through the network NT and a network interface 265, the CPU 260 starts the user authentication process.

In this manner, the CPU 260 of the portal server 3 with that hardware-circuit-block configuration can perform the same functions as the control section 50, communication control section 52, and authentication processing section 56 of the portal server 3 illustrated by FIG. 4, if the programs stored in the ROM 261 or the hard disk drive 262 are selected properly in dependence upon the functions provided by the portal server 3 (FIG. 4). And this server's hard disk drive 262 can work in the same way as the customer database section 54, page information storage section 55, authentication information storage section 57, frequency information storage section 58, and URL storage section 59 of the portal server 3 (FIG. 4). By the way, the portal server 3 illustrated by FIG. 4 includes functional circuit blocks.

(1-10) Configuration of Music Data Delivery Server

Figure 17:
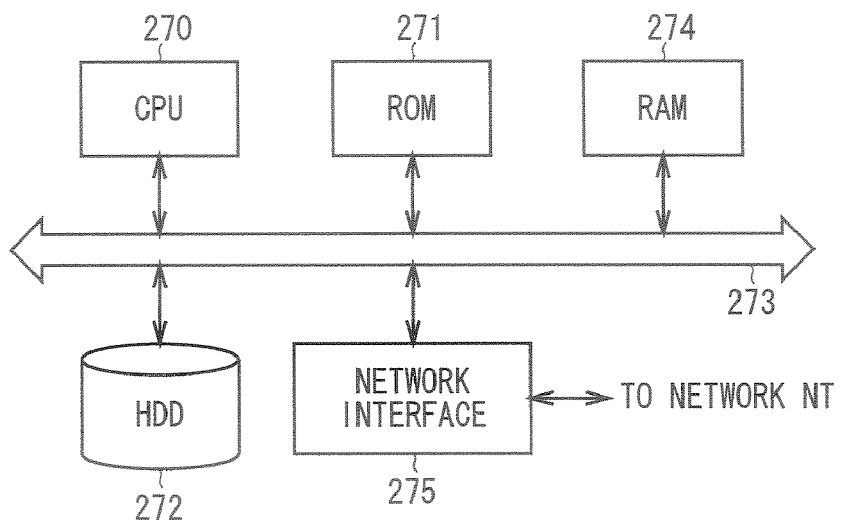
FIG. 17 is a block diagram showing the configuration of the music data delivery server using hardware circuit blocks in accordance with a first embodiment of the present invention.

As shown in FIG. 17, a music data delivery SV1 includes a CPU 270 that takes overall control of the music data delivery SV1 The CPU 270 reads various programs, such as basic programs, from a ROM 271 or a hard disk drive 272 and loads them onto a RAM 274 through a bus 273 to perform various processes to deliver music data to the client terminal 2.

For example, when the CPU 270 of the music data delivery server SV1 is requested by the client terminal 2 to deliver music data through the network NT and a network interface 275, the CPU 270 reads out the music data from the hard disk drive 272, and then transmits the music data to the client terminal 2.

In this manner, the CPU 270 of the music data delivery server SV1 with that hardware-circuit-block configuration can perform the same functions as the control section 70, communication control section 72, authentication processing section 75, and retrieval section 79 of the music data delivery server SV1 illustrated by FIG. 5, if the programs stored in the ROM 271 or the hard disk drive 272 are selected properly in dependence upon the functions provided by the music data delivery server SV1 (FIG. 5). And this server's hard disk drive 272 can work in the same way as the customer database section 74, page information storage section 76, authentication information storage section 77, and music data storage section 78 of the music data delivery server SV1 (FIG. 5). By the way, the music data delivery server SV1 illustrated by FIG. 5 includes functional circuit blocks.

(1-11) Configuration of Product Sales Server SV2

Figure 18:
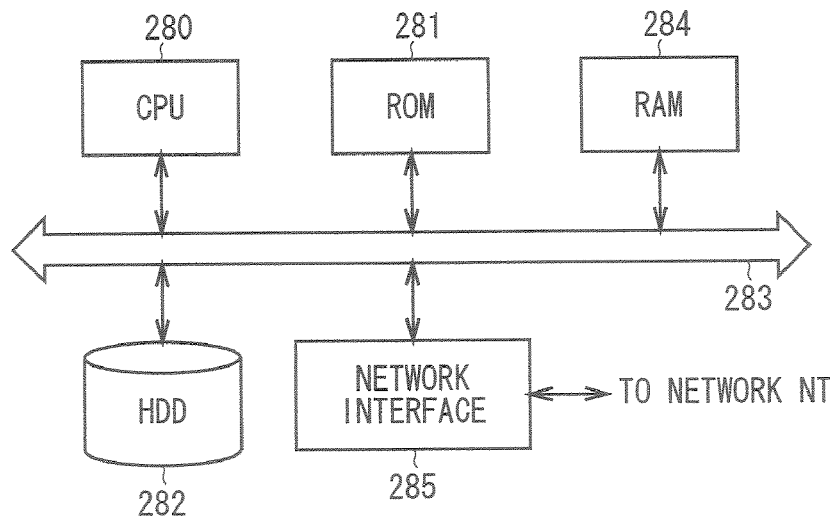
FIG. 18 is a block diagram showing the configuration of the product sales server using hardware circuit blocks in accordance with a first embodiment of the present invention.

As shown in FIG. 18, a product sales server SV2 includes a CPU 280 that takes overall control of the product sales server SV2.

The CPU 280 reads various programs, such as basic programs, from a ROM 281 or a hard disk drive 282 and loads them onto a RAM 284 through a bus 283 to perform various processes to offer product sales service.

For example, when the CPU 280 of the product sales server SV2 is requested by the client terminal 2 to sell a music CD through the network NT and a network interface 285, the CPU 80 starts a process of selling the music CD to the user of the client terminal 2.

In this manner, the CPU 280 of the product sales server SV2 with that hardware-circuit-block configuration can perform the same functions as the control section 90, communication control section 92, authentication processing section 95, and retrieval section 99 of the product sales server SV2 illustrated by FIG. 6, if the programs stored in the ROM 281 or the hard disk drive 282 are selected properly in dependence upon the functions provided by the product sales server SV2 (FIG. 6). And this server's hard disk drive 282 can work as the customer database section 94, page information storage section 96, authentication information storage section 97, and package media information storage section 98 of the product sales server SV2 (FIG. 6). By the way, the product sales server SV2 illustrated by FIG. 6 includes functional circuit blocks.

(1-12) Configuration of Radio Broadcast Information Delivery Server SV3

Figure 19:
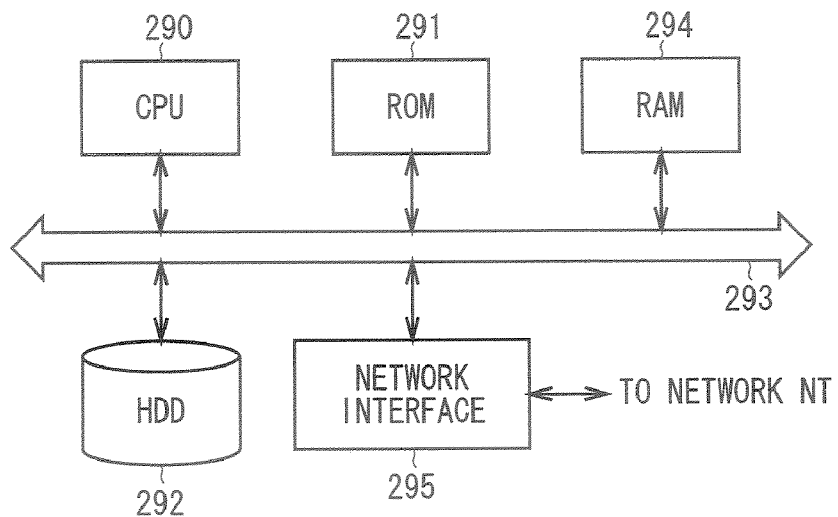
FIG. 19 is a block diagram showing the configuration of the radio broadcast information delivery server using hardware circuit blocks in accordance with a first embodiment of the present invention.

As shown in FIG. 19, a radio broadcast information delivery server SV3 includes a CPU 290 that takes overall control of the radio broadcast information delivery server SV3. The CPU 290 reads various programs, such as basic programs, from a ROM 291 or a hard disk drive 292 and loads them onto a RAM 294 through a bus 293 to perform various processes to offer radio broadcast information delivery service.

For example, the hard disk drive 292 of the radio broadcast information delivery server SV3 includes the on-air list information that shows information about radio programs already broadcast, and the now-on-air information which shows information about the currently-broadcast radio programs.

When the CPU 290 of the radio broadcast information delivery server SV3 receives a request signal, which requests the on-air list information or the now-on-air information, from the client terminal 2 through the network NT and the network interface 295, the CPU 290 reads out, in response to the request signal, the on-air list information or the now-on-air information from the hard disk drive 292, and then supplies it to the client terminal 2 through the network interface 295.

Figure 7:
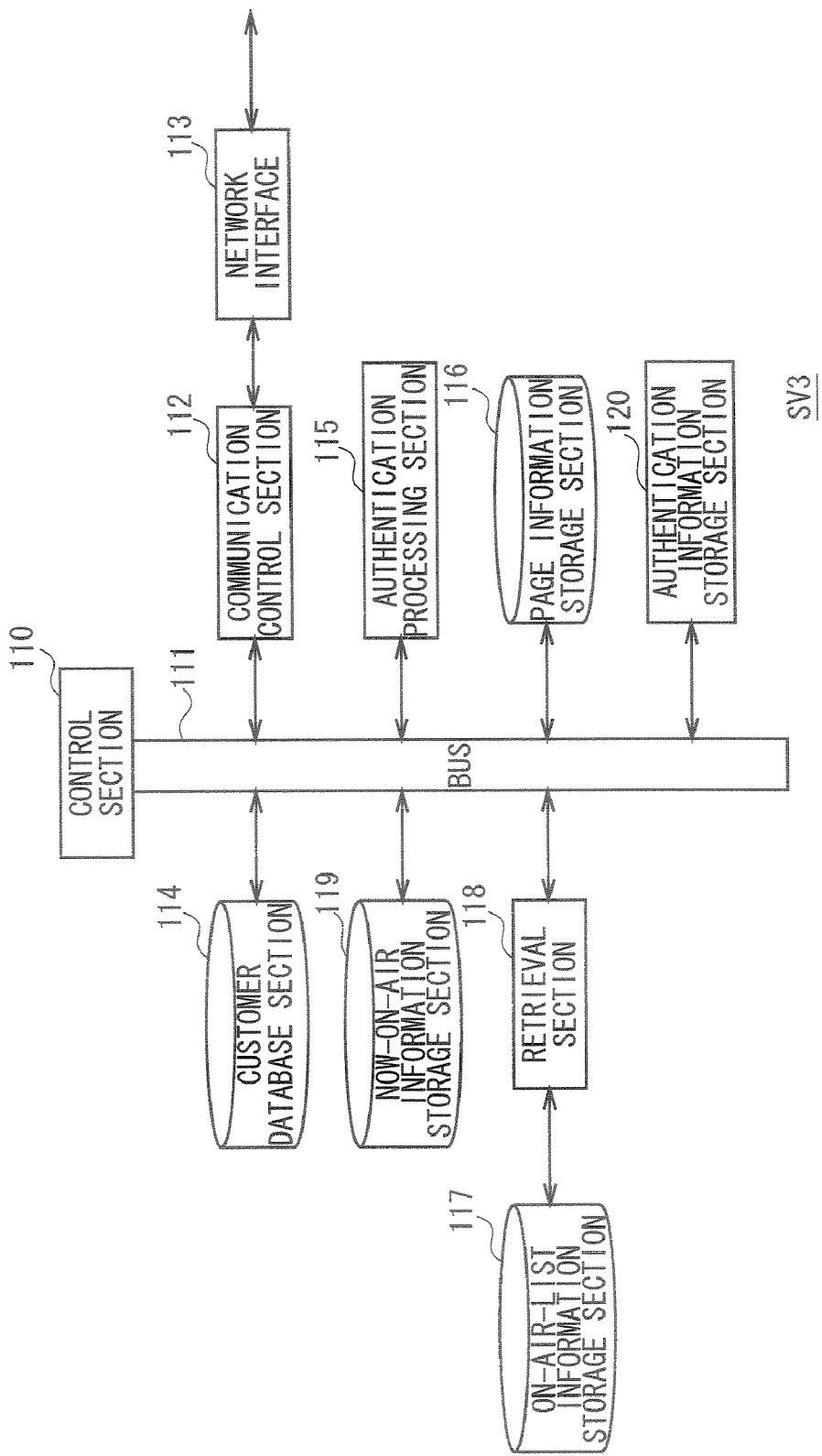
FIG. 7 is a block diagram showing the configuration of a radio broadcast information delivery server using functional circuit blocks in accordance with a first embodiment of the present invention.

In this manner, the CPU 290 of the radio broadcast information delivery server SV3 with that hardware-circuit-block configuration can perform the same functions as the control section 110, communication control section 112, authentication processing section 115, and retrieval section 118 of the radio broadcast information delivery server SV3 illustrated by FIG. 7, if the programs stored in the ROM 291 or the hard disk drive 292 are selected properly in dependence upon the functions provided by the radio broadcast information delivery server SV3 (FIG. 7). And this server's hard disk drive 292 can work in the same way as the customer database section 114, page information storage section 116, on-air-list information storage section 117, now-on-air information storage section 119 and authentication information storage section 120 of the radio broadcast information delivery server SV3 (FIG. 7). By the way, the radio broadcast information delivery server SV3 illustrated by FIG. 7 includes functional circuit blocks.

(1-13) Recording of Music Data

The recording of music data by the client terminal 2 will be described below. The client terminal 2 records the music data on the hard disk drive 211 in the following situations: a situation where the client terminal 2 downloads the music data from the music data delivery server SV1, a situation where the client terminal 2 rips the music data from a music CD, and the like. Both the situation where the client terminal 2 downloads the music data from the music data delivery server SV1, and the situation where the client terminal 2 rips the music data from a music CD will be described. For ease of explanation, in this case, one piece of music data is equivalent to one track of data.

(1-13-1) Recording of Music Data Downloaded from the Music Data Delivery Server SV1

The music data delivery server SV1 according to the present embodiment delivers music data that is associated with attribute information (described in detail later). In response to a request from the client terminal 2, the music data delivery server SV1 delivers the music data.

The client terminal 2 downloads the music data from the music data delivery server SV1, and then stores the attribute information, which is associated with the music data, in an attribute information management table TB1 that has been installed on the hard disk drive 211 (FIG. 20). At the same time, the client terminal 2 records the music data in a certain part of the hard disk drive 211.

Each piece of attribute information (associated with the music data) stored in the attribute information management table TB1 is set for each piece of music data. As shown in FIG. 20, each piece of attribute information includes an information group related to a track (music) corresponding to the music data (this group will also be referred to as a "track information group"); an information group related to an album that the track belongs to (this group will also be referred to as an "album information group"); and an information group related to formats of files of the music data and the like (this group will also be referred to as a "file information group").

The track information group includes information about the tracks: a content ID ("00000001", for example) to be used to identify the track corresponding to the music data; a title of the track ("Beautiful World", for example); and an artist name of the track ("D'z", for example").

The album information group includes information about the album: an album ID ("SMCE100001", for example) to be used to identify the album that the track belongs to; a title of the album ("Clean", for example); and a track number ("1", for example), which indicates where the track is located in the order of playback on the album.

The file information group includes information about files: a compression format of the music data ("atracc 3", for example); bit rates ("132 kbps", for example); and a storage address of the music data on the hard disk drive 211 ("CD Recording Folder\Clean\Beautiful World", for example).

In this manner, when the line terminal 2 downloads the music data from the music data delivery server SV1, the client terminal 2 stores the music data's attribute information, which includes the track title, the artist name and the title of the album where the track is recorded, in the attribute information management table TB1, and also records the music data. Therefore, it is possible to identify the information of each music data, such as titles of tracks, artist names and the like.

(1-13-2) Ripping of Music Data from Music CDs

The ripping of music data from a music CD will be described.

By the way, music data stored in the commercially-available CDs are different from the music data supplied from the music data delivery server SV1: some of the music data in the CDs are not associated with the attribute information. In order to identify the titles of the tracks corresponding to those music data and the like, attribute information like the above one may be required.

The client terminal 2 according to the present embodiment has a CD identification information database in the hard disk drive 211. The CD identification information database includes titles of commercially-available music CDs, titles of tracks corresponding to the music data stored in the music CDs, and identification information to be used to identify artist names and the like.

As shown in FIGS. 21 and 22, the CD identification information database includes a track identification table TB2 that includes identification information (also referred to as "track identification information") to be used to identify tracks; and an album identification table TB3 that includes identification information (also referred to as "album identification information") to be used to identify albums.

The track management table TB2 includes the track identification information: the title of the track "Beautiful World", for example); the artist name ("D'z", for example); a label of a selling agency ("SMM", for example); a released year ("2002", for example); credit information ("songwriter: D's", for example); a first genre indicating general classification ("Rock", for example); a second genre indicating detailed classification ("Hard Rock", for example); the title of the album where the track is recorded ("Clean", for example); an album ID to be used to identify the album ("SMCE100001", for example); the track number that indicates where the track is located in the order of playback on the album ("1", for example); an international standard code which is unique to each track ("JPSK00000100", for example); and a note, or memo ("Recorded in NY", for example).

On the other hand, the album management table TB3 includes the album identification information: the title of the album ("Clean", for example); the name of the artist ("D'z", for example); the label of the selling agency ("SMM", for example); the released year ("2002", for example); the genre ("Rock", for example); the credit information ("Songwriter: D'z"); languages ("JPN", for example); a released area ("JPN", for example); an authorizer who has authorized the album ("SMM", for example); the album ID ("SMCE100001", for example); the international standard code that is unique to each album ("JPSK00000001", for example); and notes or memo ("Recorded in NY", for example).

In addition to the track management table TB2 and the album management table TB3, the CD identification information database includes a TOC information table (not shown) including TOC (Table of Contents) information for each music CD and album information (containing the album IDs) associated with the TOC information.

For example, in a case in which the client terminal 2 rips the music data from the music CD, the client terminal 2 retrieves, based on the TOC information of the music CD from which the client terminal will rip, the corresponding album ID from the TOC information table.

Based on the album ID obtained as the result of retrieval, the client terminal 2 retrieves the corresponding album identification information from the album identification table TB3.

Based on the album ID of the album identification information obtained as the result of retrieval, the client terminal 2 retrieves the track identification information of the track identification table.

In this manner, the client terminal 2 acquires, based on the TOC information of the music CD from which the client terminal 2 will rip, the album identification information and track identification information corresponding to the music CD from the CD identification information database.

In a case in which the client terminal 2 rips the music data from the music CD to the hard disk drive 211, the client terminal 2 stores a part of the track identification information (the track title, the artist name, the title of the album where the track is recorded, the album ID and the like) in the attribute information management table TB1.

In this manner, in a case in which the client terminal 2 rips the music data from the music CD, the client terminal 2 acquires from the CD identification information database the track identification information corresponding to the music data: the track identification information includes the title of the track, the title of the album where the track is recorded, and the artist name. The client terminal 2 then stores the track identification information in the attribute information management table TB1, and also records the music data. Accordingly, the client terminal 2 can identify each track of the music data, such as titles, in the same way as the tracks of the music data downloaded from the music data delivery server SV1.

Various kinds of information stored in the CD identification information database can be updated on a periodic basis by downloading new information from a predetermined server.

In this manner, the client terminal 2 records various kinds of music data on the hard disk drive 211

(1-14) Page Information Automatic Update Function According to First Embodiment

A page information automatic update function of the client terminal 2 according to the first embodiment of the present invention will be described.

An example described below is this: the client terminal 2 receives page information from the music data delivery server SV1 and then automatically updates the page information. In this case, the page information is to be used to generate a screen of a Web page published by the music data delivery server SV1. The page information is text data described in XML or the like, as shown in FIG. 23.

Figure 24:
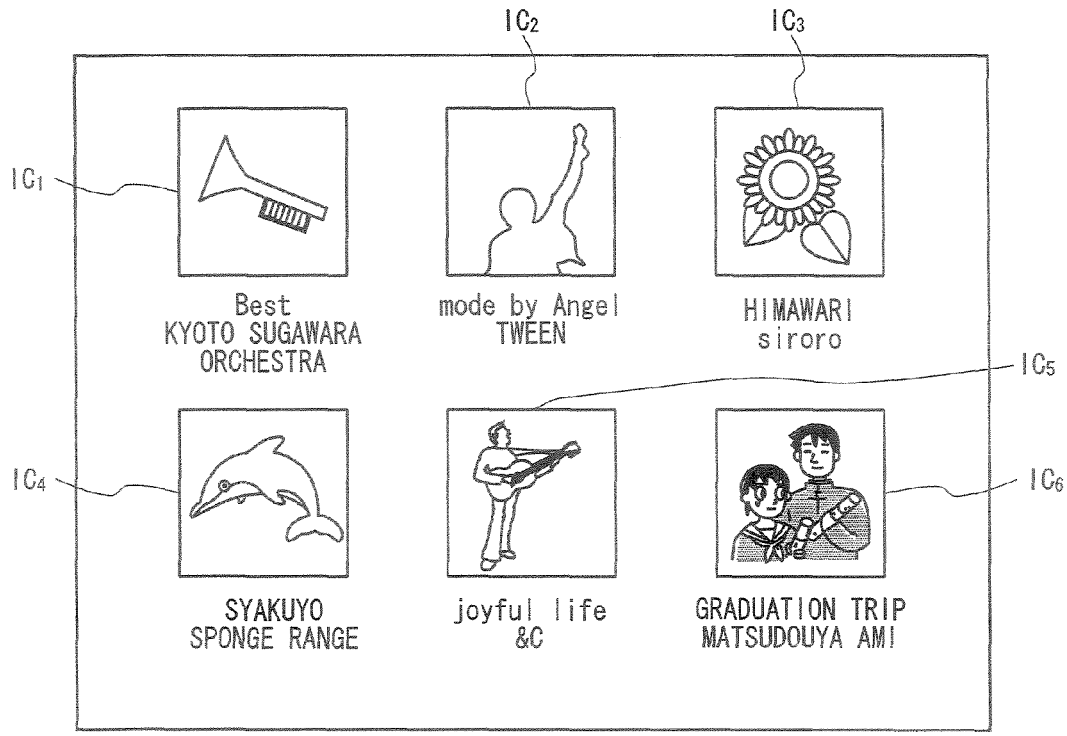
FIG. 24 is a schematic diagram showing a music data delivery page (before update) in accordance with a first embodiment of the present invention.

The music data delivery server SV1 has published, as shown in FIG. 24 for example, a Web page (also referred to as a "music data delivery page") where a plurality of icons IC ($IC_1$ to $IC_6$) are disposed to select desired music data for downloading. In response to a request from the client terminal 2, the music data delivery server SV1 supplies the page information of the music data delivery page to the client terminal 2.

The client terminal 2 then displays the music data delivery page on the display 206 based on the received page information. When the icons IC ($IC_1$ to $IC_6$) are selected by a user, the client terminal 2 downloads the music data corresponding the icons IC ($IC_1$ to $IC_6$) from the music data delivery server SV1.

As mentioned above, the client terminal 2 is capable of recording various kinds of music data on the hard disk drive 211: the music data downloaded from the music data delivery server SV1, and the music data ripped from the music CDs. Accordingly, among pieces of music data that can be downloaded through the music data delivery page, some of them may have been already recorded on the hard disk drive 211.

Therefore, the client terminal 2 automatically updates, by the page information automatic update function, the page information based on whether the received page information includes information related to the music data recorded on the hard disk drive 211.

Figure 25:
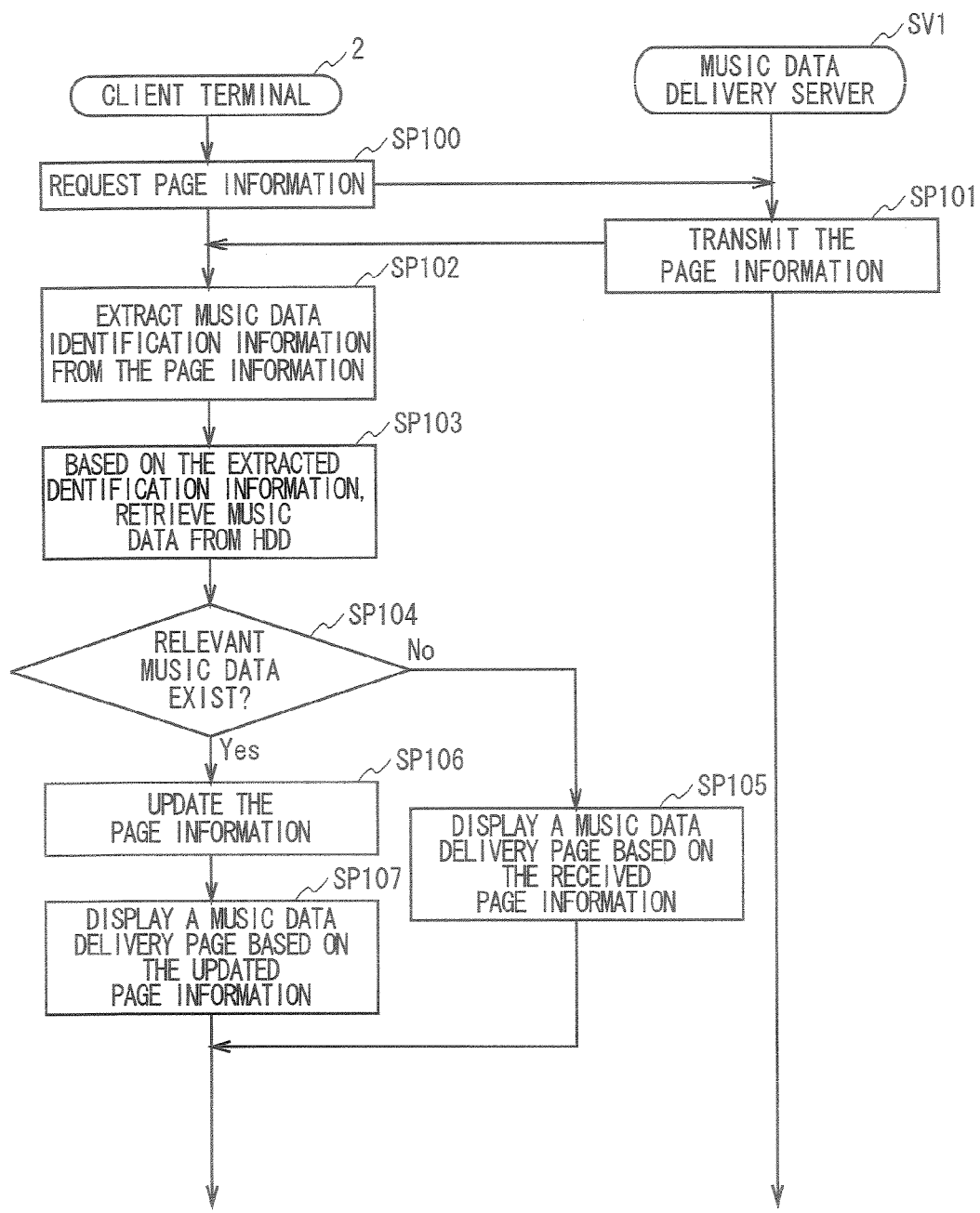
FIG. 25 is a sequence chart showing a procedure of page information automatic update process in accordance with a first embodiment of the present invention.

Referring to a sequence chart in FIG. 25, a page information automatic update process of the page information update function will be described in detail.

By the way, the page information automatic update process is a processing sequence between the client terminal 2 and the music data delivery server SV1, and executed by the CPU 203 of the client terminal 2 and the CPU 270 of the music data delivery server SV1.

In the page information automatic update process, the client terminal 2 acquires the page information from the music data delivery server SV1. The method of this acquisition and authentication has already been described above, and therefore the description will be omitted.

When the client terminal 2 accepts, from a user, a connection request for connecting to the music data delivery server SV1, the client terminal 2 starts the page information automatic update process and proceeds to step SP100.

At step SP100, the client terminal 2 transmits a request signal to the music data delivery server SV1 to request the page information.

When the music data delivery server SV1 receives the request signal from the client terminal 2, the music data delivery server SV1 at step SP101 reads out the page information of the music data delivery page from the hard disk drive 272, and transmits it to the client terminal 2.

When the client terminal 2 receives the page information from the music data delivery server SV1, the client terminal 2 at step SP102 extracts, from the page information, identification information (also referred to as "music data identification information") to be used to identify music data.

In this case, the page information includes, as shown in FIG. 23, description parts WP ($WP_1$ to $WP_6$) corresponding to the plurality of icons IC ($IC_1$ to $IC_6$) that will be displayed on the music data delivery page.

In the description parts WP ($WP_1$ to $WP_6$), information for each album or each track is described. The description for each album includes an album title, an artist name of the album, an album ID and the like. The description for each track includes a track title, an artist name of the track and the like.

That is to say, in the description parts WP ($WP_1$ to $WP_6$), the music data identification of the music data that can be downloaded when the corresponding icons IC ($IC_1$ to $IC_6$) are selected is described. The client terminal 2 extracts, from the description parts WP ($WP_1$ to $WP_6$) of the received page information, the music data identification. In this manner the client terminal 2 acquires the music data identification information associated with each icon IC ($IC_1$ to $IC_6$), and then proceeds to next step SP103.

At step SP103, the client terminal 2 retrieves, using the plurality of pieces of music data identification information obtained at step SP102 as retrieval condition, the music data corresponding to the retrieval condition from the hard disk drive 211, and then proceeds to step SP104.

If the music data identification information is set for each track, the client terminal 2 may retrieve the relevant music data from the track information group of the attribute information management table TB1 stored in the hard disk drive 211. If the music data identification information is set for each album, the client terminal 2 may retrieve it from the album information group.

At step SP104, the client terminal 2 determines, based on the result of retrieval, whether there is the relevant music data on the hard disk drive 211.

If the negative result is obtained at step SP104, this means that the music data (also referred to as a "relevant music data", corresponding to the music identification information included in the page information does not exist in the hard disk drive 211. In this case, the client terminal 2 proceeds to step SP105 to display, without updating the received page information, the music data delivery page (FIG. 24) on the display 206 based on the page information.

By contrast if the affirmative result is obtained at step SP104, this means that the relevant music data has been recorded on the hard disk drive 211. In this case, the client terminal 2 proceeds to step SP106.

At step SP106, the client terminal 2 updates the page information based on which pieces of music data, which correspond to the music data identification information of the icons IC ($IC_1$ to $IC_6$), the hard disk drive 211 has already recorded. After that, the client terminal 2 proceeds to next step SP107 to display the music data delivery page based on the updated page information.

Figure 26:
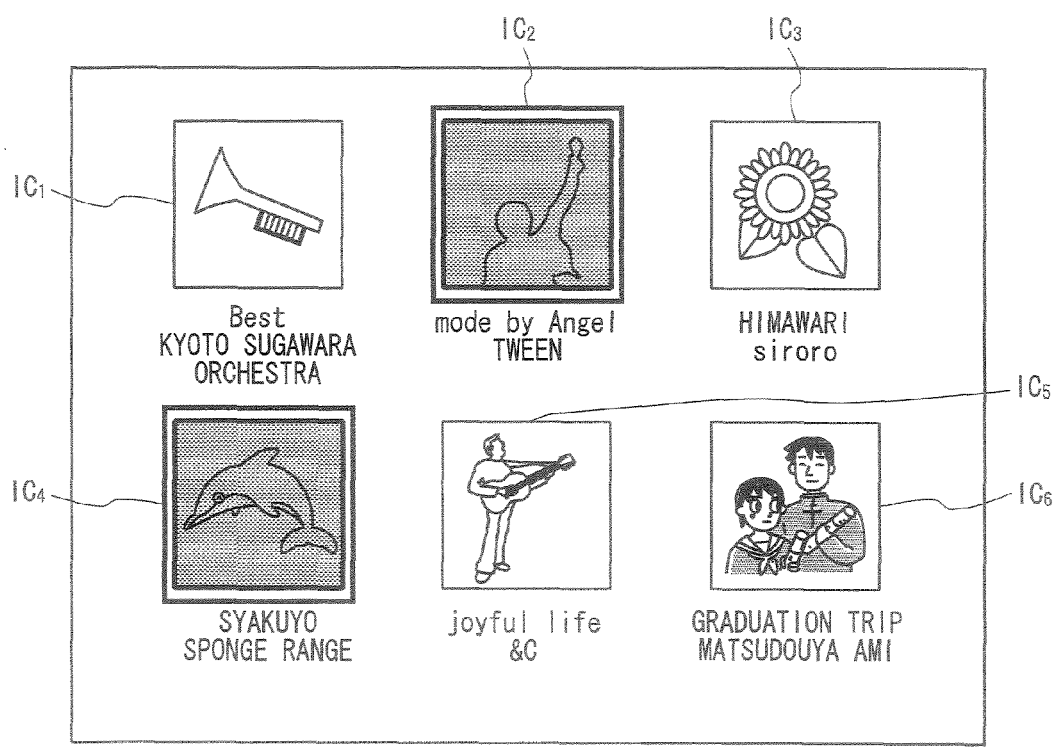
FIG. 26 is a schematic diagram showing the music data delivery page (after update) in accordance with a first embodiment of the present invention.

If the pieces of music data, which correspond to the music data identification information of the icons $IC_2$ and $IC_4$, have been already recorded on the hard disk drive 211, the icons $IC_2$ and $IC_4$ are displayed in a different color from those of the icons $IC_1$, $IC_3$, $IC_5$ and $IC_6$. As shown in FIG. 26, the music data delivery page based on the updated page information displays the icons $IC_1$, $IC_3$, $IC_5$ and $IC_4$ and highlights the icons $IC_2$ and $IC_4$.

In this manner, the client terminal 2 shows the user the fact that the pieces of music data that can be downloaded by the icons $IC_2$ and $IC_4$ have been already recorded on the hard disk drive 211

(1-15) Operation and Effect in the First Embodiment

The client terminal 2 with the above configuration extracts, from the received page information, the music data identification information, and then retrieves the relevant music data, which corresponds to the music data identification information, from the hard disk drive 211.

If the relevant music data exists in the hard disk drive 211, the client terminal 2 updates the page information to highlight for example the icons $IC_2$ and $IC_4$ corresponding to the relevant music data.

In this manner, through the music data delivery page, the client terminal 2 shows the user which pieces of music data, which can be downloaded through the music data delivery page based on the page information, the hard disk drive 211 has already recorded. Therefore, the client terminal 2 prevents the user from making mistakes such as downloading (or purchasing) the already-recorded music data again. In addition, the client terminal 2 can notify the user of which pieces of music data he/she has already had.

The above configuration makes this possible: the client terminal 2 retrieves, based on the music data identification information included in the received page information, the music data corresponding to the music data identification information from the hard disk drive 211, and shows the user which pieces of music data, which correspond to the music data identification information included in the received page information, the hard disk drive 211 has already recorded. Therefore, the client terminal 2 can easily notify the user of which pieces of music data have been already recorded.

In addition, in the first embodiment, the client terminal 2 retrieves the music data, and then updates, based on the retrieval result, the received page information. Displaying the updated page information on the display 206 allows the user to clearly understand which music data that match the music data identification information included in the received page information have been already recorded on the hard disk drive 211.

Furthermore, in the first embodiment, the client terminal 2 shows which music data, out of the plurality of music data that can be downloaded through the music data delivery page, have been recorded on the hard disk drive 211 by changing the color of the icons IC ($IC_1$ to $IC_6$) on the music data delivery page. In this manner, the client terminal 2 can notify the user of which music data have been recorded through the same screen, without displaying other identification screens.

(2) Second Embodiment (2-1) Page Information Automatic Update Function in the Second Embodiment In a second embodiment, the configuration of system, client terminal and servers are the same as those of the first embodiment. Therefore, the corresponding description will be omitted.

In the second embodiment, the client terminal 2 is equipped with a page information automatic update function that shows a user not only which pieces of music data have been already recorded, but, in a case where a bunch of pieces of music data can be downloaded as an album by the icon $IC_2$ for example, how many pieces of music data in the album has been already recorded on the hard disk drive 211.

Figure 27:
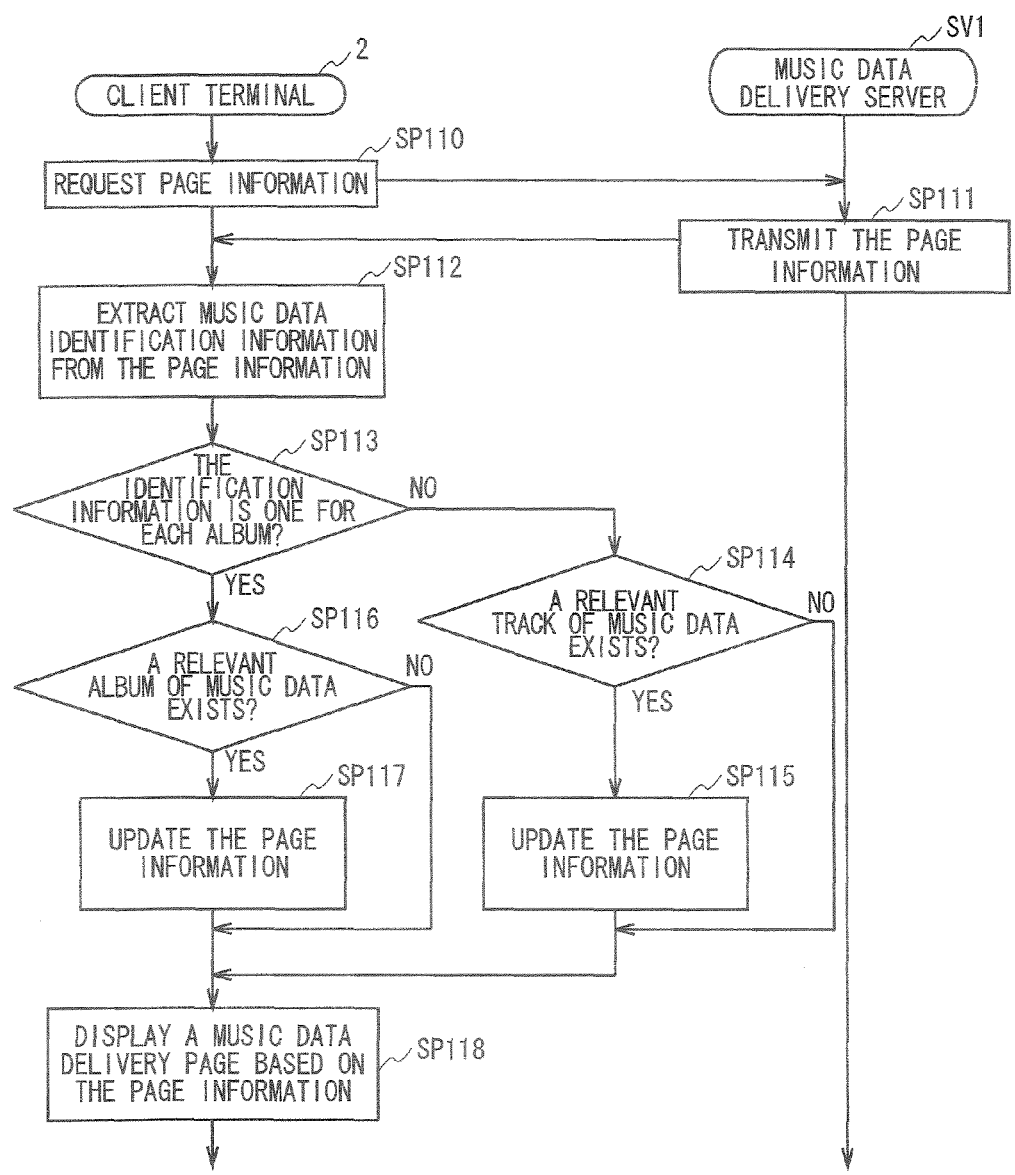
FIG. 27 is a sequence chart showing a procedure of page information automatic update process in accordance with a second embodiment of the present invention.

Referring to a sequence chart in FIG. 27, a page information automatic update process of this page information automatic update function will be described in detail.

By the way, the page information automatic update process according to the second embodiment is a processing sequence between the client terminal 2 and the music data delivery server SV1, and executed by the CPU 203 of the client terminal 2 and the CPU 270 of the music data delivery server SV1.

When the client terminal 2 accepts, from a user, a connection request for connecting to the music data delivery server, the client terminal 2 starts the page information automatic update process and proceeds to step SP110.

At step SP110, the client terminal 2 transmits a request signal to the music data delivery server SV1 to request the page information.

When the music data delivery server SV1 receives the request signal from the client terminal 2, the music data delivery server SV1 at step SP101 reads out the page information of the music data delivery page from the hard disk drive 272, and transmits it to the client terminal 2.

When the client terminal 2 receives the page information from the music data delivery server SV1, the client terminal 2 at step SP112 extracts, from the page information, the music data identification information.

That is to say, in the same way as that of the first embodiment, the client terminal 2 extracts, from the description parts WP ($WP_1$ to $WP_6$) of the received page information, the music data identification. In this manner the client terminal 2 acquires the music data identification information associated with each icon IC ($IC_1$ to $IC_6$), and then proceeds to next step SP113.

At step SP113, the client terminal 2 determines whether the each piece of music data identification information obtained at step SP112 is one set for an album, which is to say whether selecting the icons IC ($IC_1$ to $IC_6$) download a bunch of pieces of album's music data, or one track (one piece) of music data. This is determined, for example, based on whether the album ID is included in the music data identification information.

If the negative result is obtained at step SP113, this means that the music data identification information is one set for each track (i.e. the track identification information), not for each album. In this case, the client terminal 2 proceeds to step SP114.

At step SP114, the client terminal 2 determines, using the music data identification information, one set for each track, as retrieval condition, whether the music data corresponding to the retrieval condition exist in the hard disk drive 211. Only when the client terminal 2 determines that the relevant music data exists, the client terminal 2 at step SP115 performs the update of the page information (which is the same as that of step SP106 (FIG. 25) described above), and then proceeds to step SP118.

By contrast, if the affirmative result is obtained at step SP113, this means that the music data identification information is one set for each album (i.e. the album identification information). In this case, the client terminal 2 proceeds to step SP116.

At step SP116, the client terminal 2 determines, using the music data identification information, one set for each album, as retrieval condition, whether the music data corresponding to the retrieval condition exist in the hard disk drive 211.

If the negative result is obtained at step SP116, the client terminal 2 proceeds to step SP118. By contrast, if the affirmative result is obtained, the client terminal 2 proceeds to step SP117.

At step SP117, the client terminal 2 updates the page information based on how many pieces of music data, which are those stored in albums indicated by pieces of the music data identification information, the hard disk drive 211 has already recorded as relevant music data. In this case, information about the number of pieces of music data stored in each album may be obtained from the TOC information table of the CD identification information database for example.

Figure 28:
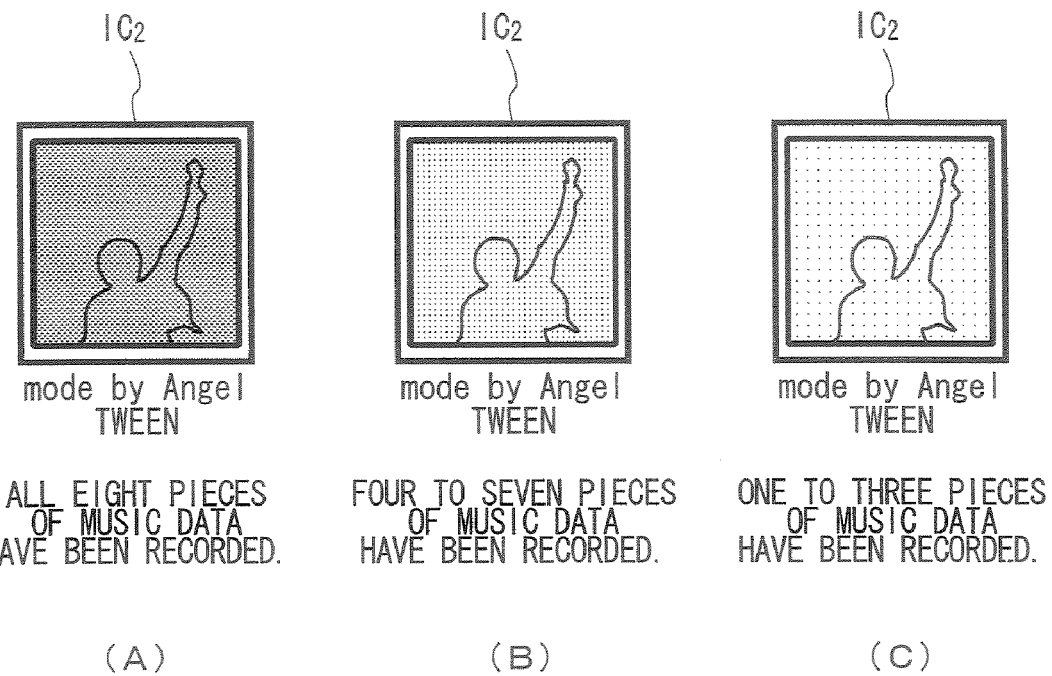
FIG. 28 is a schematic diagram showing colors of displayed icons in accordance with a second embodiment of the present invention.

For examples as shown in FIGS. 28(A), (B) and (C), the album indicated by the music data identification information includes eight pieces of music data in all. If all eight pieces of music data have been recorded on the hard disk drive 211, the icon $IC_2$ corresponding to the music data identification information is displayed in the darkest color. If four to seven pieces of music data have been recorded on the hard disk drive 211, the icon $IC_2$ is displayed in the secondly-darkest color. If one to three pieces of music data have been recorded on the hard disk drive 211, the icon $IC_2$ is displayed in the lightest color (which is almost close to that of the rest of icons IC). In this manner, the page information is updated.

In this manner, the client terminal 2 shows the user whether a bunch of pieces of album's music data, which can be downloaded by the icon IC2, has been already recorded on the hard disk drive 211, and how many pieces of music data, out of all pieces of music data in the album, the hard disk drive 211 has already recorded.

After updating the page information in that manner, the client terminal 2 proceeds to step SP118 to display the music data delivery page on the display 206 based on the page information.

(2-2) Operation and Effect in the Second Embodiment

The client terminal 2 with the above configuration extracts the music data identification information from the received page information, and determines whether the music data identification information is one set for each album or each track. The client terminal 2 also retrieves the music data corresponding to the music data identification information from the hard disk drive 211.

If the retrieval result shows that the music data identification information is the one set for each album, the client terminal 2 updates the page information to show the user how may pieces of music data in the album the hard disk drive 211 has already recorded by changing the color of the icons IC ($IC_1$ to $IC_6$).

If the retrieval result shows that the music data identification information is the one set for each track, the client terminal 2 updates the page information to show the user whether the piece of music data corresponding to the track has been already recorded on the hard disk drive 211 by changing the color of the icons IC ($IC_1$ to $IC_6$).

In this manner, through the music data delivery page, the client terminal 2 according to the second embodiment can show the user whether the music data, which can be downloaded through the music data delivery page based on the page information, has been already recorded on the hard disk drive 211. In a case in which a bunch of pieces of album's music data can be purchased, the client terminal 2 shows the user how many pieces of the album's music data the hard disk drive 211 has already recorded.

The above configuration makes this possible: the client terminal 2 retrieves, based on the music data identification information included in the received page information, the music data corresponding to the music data identification information from the hard disk drive 211, and shows the user whether the music data, which correspond to the music data identification information included in the received page information, have been already recorded on the hard disk drive 211. Thus, the client terminal 2 can easily notify the user of which pieces of music data have been already recorded.

In addition, the client terminal 2 according to the second embodiment retrieves the music data and then updates the received page information based on the retrieval result. The client terminal 2 then displays the updated page information on the display 206, and clearly shows the user whether the music data corresponding to the music data identification information included in the received page information have been recorded on the hard disk drive 211.

In addition, if the music data identification information included in the page information is one set for each album, the client terminal 2 according to the second embodiment updates the page information to show the user how many pieces of album's music data the hard disk drive 211 has already recorded by using the color of the icons IC ($IC_1$ to $IC_6$). That shows the user not only whether the bunch of pieces of album's music data has been already recorded, but how many pieces of album's music data have been already recorded.

In the first and second embodiments, the client terminal 2 receives the page information including the music data identification information (content identification information), and retrieves, based on the music data identification information included in the page information, the relevant music data from the hard disk drive 211. However the present invention is not limited to this. If the music data identification information can be obtained, the relevant music data may be retrieved based on other kinds of information.

In addition, in the first and second embodiments, the music data (content data recorded on the hard disk drive 211) is a retrieval target. However the present invention is not limited to this. If the page information includes information about video data that can be downloaded, the retrieval target can be the video data recorded on the hard disk drive 211. Other kinds of content data can be the retrieval target in accordance with the received page information.

Furthermore, in the first and second embodiments, changing the color of the icons IC ($IC_1$ to $IC_6$) notifies the user of whether the music data corresponding to the icons IC ($IC_1$ to $IC_6$) have been already recorded on the hard disk drive 211. However the present invention is not limited to this. That may be notified by highlighting the music data's titles and artist names adjacent to the icons IC ($IC_1$ to $IC_6$). Alternatively, that may be notified by changing the shape of the icons IC ($IC_1$ to $IC_6$). Other methods also can be applied.

Figure 29:
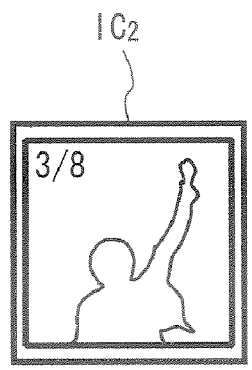
FIG. 29 is a schematic diagram showing an example of displaying icons.

Furthermore, in the second embodiment, based on how many pieces of album's music data have been recorded on the hard disk drive 211, the client terminal 2 changes the darkness of the color of the icons IC ($IC_1$ to $IC_6$). However the present invention is not limited to this. For example, as shown in FIG. 29, numerical characters indicating how many pieces of music data an album contains and how many pieces of the album's music data the hard disk drive 211 has already recorded may be displayed above the icons IC ($IC_1$ to $IC_6$). This correctly notifies the user of how many pieces of album's music data the hard disk drive 211 has already recorded.

Furthermore, in the first and second embodiments, by updating the received page information, the client terminal 2 shows which pieces of music data have been already recorded on the client terminal 2 through the music data delivery page based on the page information. However the present invention is not limited to this. The client terminal 2 may receive list information, which is equivalent to a list of downloadable music data, from the music data delivery server SV1, and update the list information to show which pieces of music data, out of all pieces of music data listed in the list information, the hard disk drive 211 has already recorded.

In this case, the client terminal 2 may extract the album identification information or the track identification information from the list information, and then retrieves, from the hard disk drive 211, the music data corresponding to the album identification information or the track identification information And then, as shown in FIG. 30 for example, when displaying a list information screen SC on the display 206 based on the received list information, the client terminal 2 may update the list information such that recorded marks RM ($RM_1$ to $RM_5$) are displayed on the corresponding parts of music data that have been already recorded on the hard disk drive 211. This shows the user which pieces of music data have been already recorded on the hard disk drive 211, out of the pieces of downloadable music data listed in the list information.

Furthermore, in the first and second embodiments, the client terminal 2 notifies the user of whether the music data, which can be downloaded from the music data delivery server SV1 (external apparatus), have been already recorded on the hard disk drive 211. However the present invention is not limited to this. In a case in which the user purchases CD or DVD from the product sales server (external apparatus), the client terminal 2 may notify the user of whether the music data, those in the CD or DVD, have been already recorded on the hard disk drive 211.

In this case, the client terminal 2 receives, from the product sales server SV2, list information of the package media (CD, DVD and the like) that can be purchased, and extracts, from the list information, media identification information (such as album titles and album IDs) to be used to identify the package media, and then retrieves the music data corresponding to the package media identification from the hard disk drive 211. This prevents the user from making mistakes such as purchasing CDs containing the same music data as he/she already has.

Furthermore, in the first and second embodiments, the client terminal 2 highlights the icons IC ($IC_1$ to $IC_6$) that correspond to the pieces of music data already recorded on the hard disk drive 211. However the present invention is not limited to this. The icons IC ($IC_1$ to $IC_6$) not corresponding to the recorded music data may be highlighted.

Furthermore, in the first and second embodiments, in a case in which it rips music data from the music CD, the client terminal 2 recognizes the titles of the music data stored in the music CD, their artist names and the like based on the track identification information and/or album identification information in the CD identification information database installed on the hard disk drive 211. However the present invention is not limited to this. The client terminal 2 may transmit, to a predetermined server having the CD identification information database, TOC information of the music CD from which music data will be ripped. After receiving the track identification information and/or album identification information from the server, the client terminal 2 may recognize the titles of the music data stored in the music CD, their artist names and the like based on the track identification information and/or album identification information.

Furthermore, in the first and second embodiments, the hard disk drive 211 is applied to as a storage medium. However the present invention is not limited to this. CD-RW (Compact Disk ReWritable), DVD-RD (Digital Versatile Disk Random Access Memory), "MEMORY STICK (Registered Trademark of Sony Corporation)", and other storage media may be applied.

Furthermore, in the above-noted embodiments, radio broadcasting is applied to as a kind of broadcasting the client terminal 2 can receive. However the present invention is not limited to this. The client terminal 2 may receive Internet radio broadcasting or satellite radio broadcasting, and acquire the associated information (radio broadcast information). Alternatively, the client terminal 2 may receive television broadcasting from television stations, and acquire various kinds of information related to the television programs from a server on the network NT.

Furthermore, in the first and second embodiments, the hardware circuit blocks, the functional circuit blocks and the program modules are applied to the client terminal 2. However the present invention is not limited to this. They may be applied to other kinds of terminals such as mobile phones and personal computers, as well as the client terminal 2. Terminals equipped with the hardware circuit blocks, the functional circuit blocks and the program modules can operate in the same way as the above client terminal 2.

Furthermore, in the first and second embodiments, the communication control section 32 and network interface 33 shown in FIG. 2, or the communication processing section 214 and network interface 215 shown in FIG. 14 are applied to as communication means. The control section 23 shown in FIG. 2 or the CPU 203 shown in FIG. 14 is applied to as extraction means and retrieval means. The control section 23 and page information generation section 36 shown in FIG. 2, or the CPU 203 shown in FIG. 14 are applied to as update means. The display control section 24 and display section 25 shown in FIG. 2, or the display processing section 207 and display 206 shown in FIG. 14 are applied to as display means. In this manner the client terminal 2 is configured as information processing apparatus. However the present invention is not limited to this. If it works in the same way, the client terminal 2 may be equipped with other kinds of functional circuit blocks.

(3) Third Embodiment

A third embodiment will be described. The configuration of system, client terminal and servers according to the third embodiment are the same as those of the above first embodiment. Therefore, the description will be omitted.

In the third embodiment, the client terminal 2 includes an automatic content retrieval function: using the radio broadcast information (the now-on-air information, for example) acquired from the radio broadcast information delivery server SV3, the client terminal 2 retrieves, from the hard disk drive 211, the music data corresponding to the music aired in the current radio program received. The radio broadcast information acquired from the radio broadcast information delivery server SV3, and the automatic content retrieval function will be described.

(3-1) Configuration of Radio Broadcast Information Database

The radio broadcast information delivery server SV3 controls, by a radio broadcast information database installed on the hard disk drive 292 (FIG. 19), the now-on-air information and on-air list information about radio programs broadcast from radio stations. The now-on-air information and the on-air list information are managed by the corresponding radio stations.

FIG. 31 shows the configuration of the radio broadcast information database. The radio broadcast information database includes a currently aired program table TB10 that manages the now-on-air information; an already aired music table TB11 that manages the on-air list information; and an already aired program table TB12.

The currently aired program table TB10 includes the now-on-air information: a name of a radio station corresponding to the radio broadcast information delivery server SV3; broadcasting time (date, and start and end time) of the currently-aired radio program from the radio station; a title of the program; a name of a performer (DJ (Disk Jockey)); a broadcasting start time (including date) of the currently-aired music in the radio program; a title of the music; an artist name of the music; and its genre.

That is to says the currently aired program table TB10 contains the now-on-air information, or the information about the currently-aired radio program and the currently-aired music in the radio program.

The already aired music table TB11 includes the on-air list information: names of corresponding radio stations; broadcasting time (date and start time) of the music aired in the radio programs of the radio stations; music titles; artist names of the music; and their genres.

That is to say, the already aired music table TB11 contains the on-air list information, or the information about the music already broadcast in the radio programs.

The already aired program table TB12 includes the on-air list information: names of corresponding radio stations; broadcasting time (date, and start and end time) of the radio programs already broadcast from the radio stations; titles of the programs; and names of performers (DJ (Disk Jockey)).

That is to say, the already aired program table TB12 contains the on-air list information or the information about the programs already broadcast.

Figure 32:
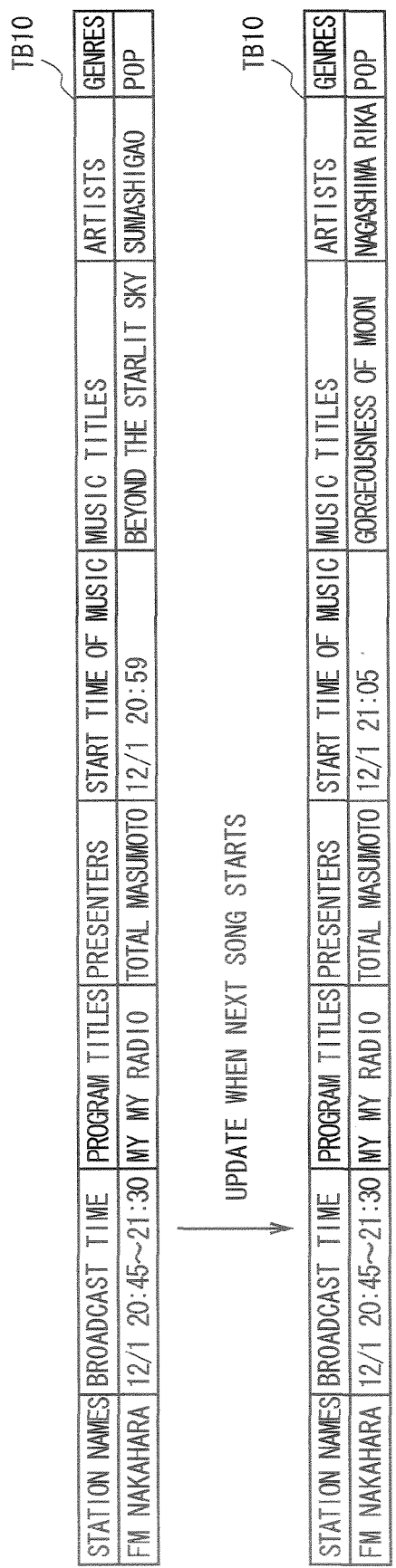
FIG. 32 is a schematic diagram showing update of now-on-air information on a currently aired program table in accordance with a third embodiment of the present invention.

When the corresponding radio station notifies the radio broadcast information delivery server SV3 of the current broadcast situation (such as start or end of radio programs, or start and end of music aired in radio programs), the CPU 290 of the radio broadcast information delivery server SV3 (FIG. 19) updates, as show in FIG. 32, the contents of the currently aired program table TB10 based on the broadcast situation.

That is to say, at a time when one radio program is completed and another one is started; or one piece of music is completed in a radio program and another one is started; or the like, the now-on-air information on the currently aired program table TB10 is updated.

In this manner, the real-time now-on-air information is stored in the currently aired program table TB10 in line with the current broadcast situation. By the way, in a case where music is not aired, null data may be stored in the currently aired program table TB10 to indicate that any music is not aired. Alternatively, the now-on-air information of the previously aired music may be stored in the currently aired program table TB10 until next one starts.

When the CPU 290 receives an acquisition request of the now-on-air information from the client terminal 2, the CPU 290 transmits the now-on-air information, which has been stored in the currently aired program table TB10, to the client terminal 2 through the network interface 295.

The CPU 290 adds, as shown in FIG. 33, the on-air-list information of the music to the already aired music table TB11 a predetermined period of time (a few minutes, for example) after the music ends in the radio program.

The CPU 290 also adds, as shown in FIG. 34, the on-air-list information of the radio program to the already aired program table TB12 a predetermined period of time (a few minutes, for example) after the radio program ends.

When the CPU 290 receives, from the client terminal 2, an acquisition request signal that requests a predetermined period of the on-air-list information (the previous day's on-air-list information, for example), as shown in FIG. 35, the CPU 290 associates the broadcast time of the already aired music table TB11 with the broadcast time of the already aired program table TB12 such that two types of the on-air list information stored in these two tables are associated with one another, and then extracts the previous day's on-air list from that. The CPU 290 then supplies the extracted on-air list information to the client terminal 2 through the network interface 295.

In this manner, the on-air list information the client terminal 2 receives is a list related to both the previous day's radio programs and a plurality of pieces of music aired in the previous day's radio programs.

In this manner, the radio broadcast information delivery server SV3 stores and manages not only information such as the program titles of radio programs broadcast from the corresponding radio station, the broadcast time of radio programs and the names of performer (DJ), but the now-on-air information and on-air list information including detailed information such as the titles of music aired in the radio programs, the broadcast start time of music and the artist names. In response to a request from the client terminal 2, the radio broadcast information delivery server V3 delivers them to the client terminal 2.

Figure 36:
FIG. 36 is a schematic diagram showing a now-on-air information screen (1) in accordance with a third embodiment of the present invention.

Actually, in a case in which the client terminal 2 receives, while receiving broadcast from a radio station for example, the now-on-air information from the radio broadcast information delivery server SV3 corresponding to the radio station, as shown in FIG. 36, the client terminal 2 displays a now-on-air information screen 300 on the display 206 based on the now-on-air information.

The now-on-air information screen 300 displays the received now-on-air information: a radio station name, a music title, an artist name of this music, and a program title. In this manner, the client terminal 2 shows a user the information related to the program currently aired from the selected radio station and the music aired in this program through the now-on-air information screen 300.

(3-2) Automatic Content Retrieval Function

Figure 37:
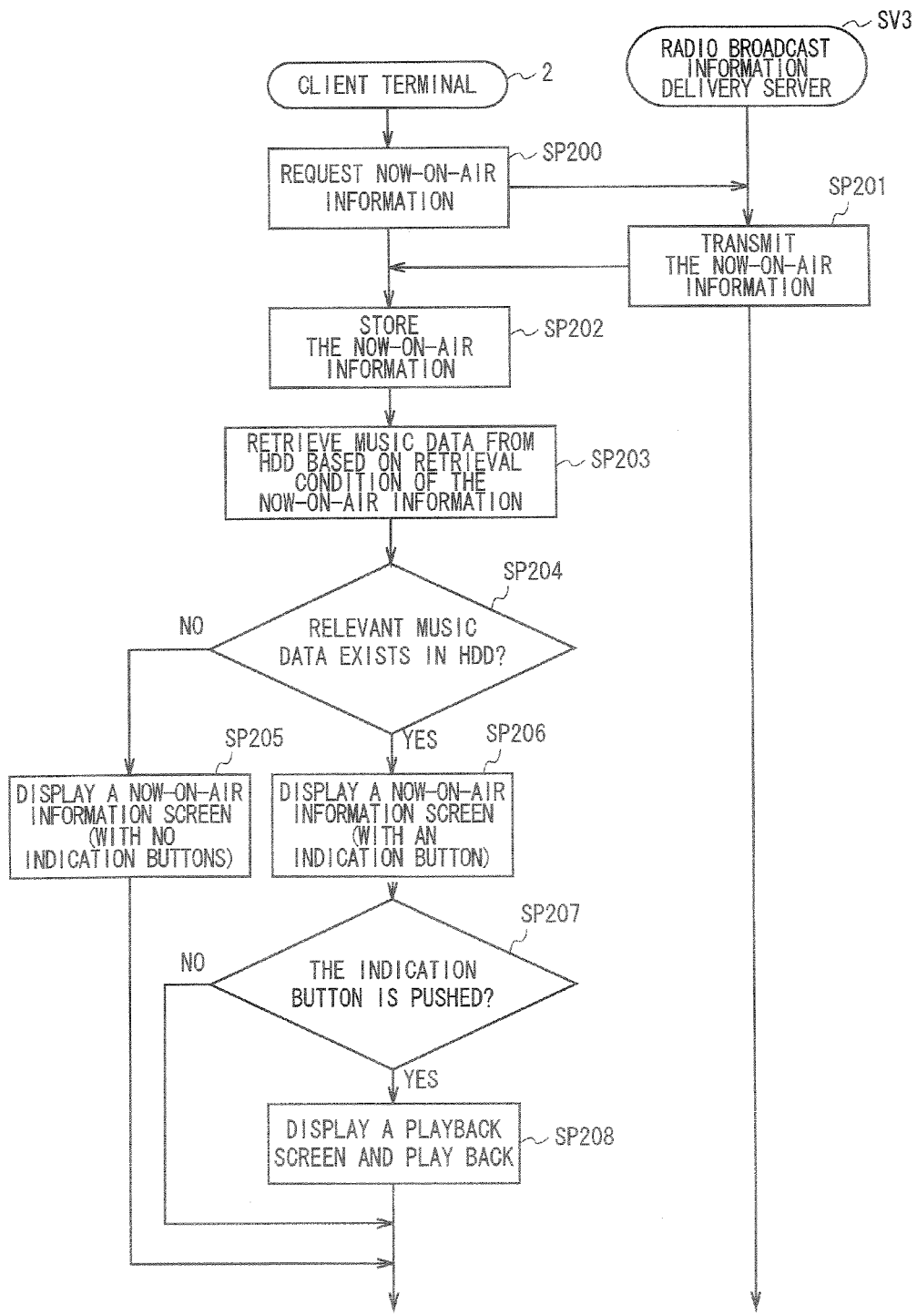
FIG. 37 is a sequence chart showing a procedure of automatic content retrieval process in accordance with a third embodiment of the present invention.

An automatic content retrieval function of the client terminal 2 according to the present embodiment will be described. The automatic content retrieval function is to automatically detects using the above now-on-air information, whether the music data corresponding to the piece of music aired in the program has been already stored in the hard disk drive 211 (which is equivalent to the storage medium 29 in FIG. 2). With reference to a sequence chart in FIG. 37 a process (automatic content retrieval process) of the automatic content retrieval function will be described in detail.

By the way, the automatic content retrieval process is a processing sequence between the client terminal 2 and the radio broadcast information delivery server SV3, and executed by the CPU 203 of the client terminal 2 and the CPU 290 of the radio broadcast information delivery server SV3.

In this automatic content retrieval process, the client terminal 2 acquires the now-on-air information from the radio broadcast information delivery server SV3. However, this point has been already described above and therefore the description about the acquisition method and authentication method to do that will be omitted.

When a user selects a radio station, the client terminal 2 outputs audio of a program broadcast from the selected radio station through the speaker 210, and also starts the automatic content retrieval process, and then proceeds to step SP200.

At step SP200, the client terminal 2 transmits, to the radio broadcast information delivery server SV3 corresponding to the selected radio station, a request signal to request the now-on-air information.

When the radio broadcast information delivery server SV3 receives the request signal from the client terminal 2, the radio broadcast information delivery server SV3 at step SP201 reads out the now-on-air information from the currently aired program table TB10 of the radio broadcast information database, and then transmits it to the client terminal 2.

When the client terminal 2 receives the now-on-air information from the radio broadcast information delivery server SV3, the client terminal 2 at step SP202 temporarily stores it in the RAM 205 and then proceeds to step SP203.

The client terminal 2 at step SP203 sets a part of the now-on-air information, a music title ("Beyond the starlit sky", for example) and its artist name ("SUMASHIGAO", for example), as a retrieval condition, and retrieves music data corresponding to the retrieval condition from the internal hard disk drive 211, and then proceeds to step SP204.

Based on the result of retrieval, the client terminal 2 at step SP204 determines whether there is the corresponding music data on the hard disk drive 211.

If the negative result is obtained at step SP204, this means that the music data corresponding to the received now-on-air information, the music title of "Beyond the starlit sky" and the artist name of "SUMASHIGAO," does not exist in the hard disk drive 211. In this case, the client terminal 2 proceeds to step SP205 and displays the now-on-air information screen 300 (FIG. 36) on the display 206 based on the received now-on-air information. And then, thirty seconds after it requested the now-on-air information at step SP200, the client terminal 2 again requests the now-on-air information from the radio broadcast information delivery server SV3, and then repeats the subsequent process.

If the affirmative result is obtained at step SP204, this means that the music data corresponding to the received now-on-air information, the music title of "Beyond the starlit sky" and the artist name of "SUMASHIGAO," exists in the hard disk drive 211. At this time, the client terminal 2 proceeds to step SP206.

Figure 38:
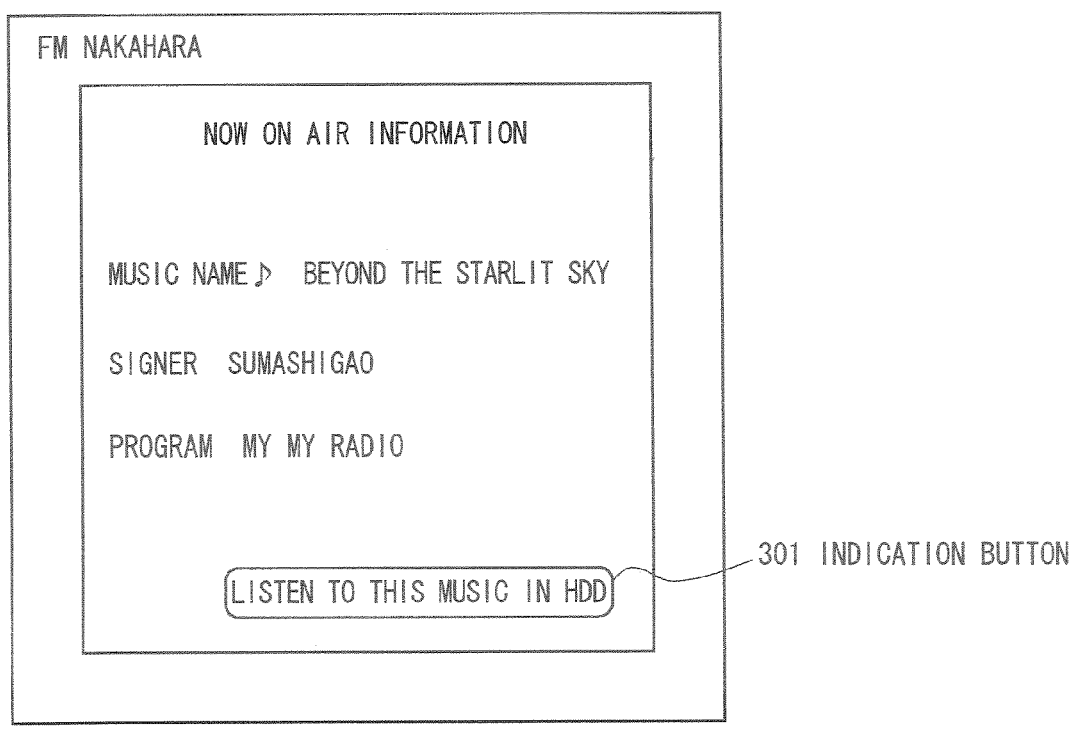
FIG. 38 is a schematic diagram showing a now-on-air information screen (2) in accordance with a third embodiment of the present invention.

As shown in FIG. 38, the client terminal 2 at step SP206 displays the now-on-air information screen 300 on the display 206 based on the received now-on-air information. This now-on-air information screen 300, which is different from one displayed when the negative result is obtained at step SP204 (FIG. 36), displays an indication button 301 indicating that the music data related to the now-on-air information (this music data will also be referred to as "relevant music data") has been in the hard disk drive 211.

In this manner, when the relevant music data exists in the hard disk drive 211, the client terminal 2 displays the indication button 301 on the now-on-air information screen 300. When the relevant music data does not exist, the client terminal 2 does not display the indication button 301. In this manners the client terminal 2 can notify the user of whether the music data corresponding to the piece of music currently aired from the selected radio station (i.e. corresponding to the piece of music the user currently listens to) has been already recorded on the hard disk drive 211.

After displaying the now-on-air information screen 300 with the indication button 301, the client terminal 2 proceeds to next step SP207.

At step SP207, the client terminal 2 determines whether the user pushes the indication button 301. The indication button 301 is not only for showing the user whether the relevant music data has been already recorded, but also is used to play back the relevant music data (the music data corresponding to the music title of "Beyond the starlit sky" and the artist name of "SUMASHIGAO," in this case). When the indication button 301 is pushed, the relevant music data is played back.

If the negative result is obtained at step SP207, the client terminal 2 requests, thirty seconds after it requested the now-on-air information at step SP200, the now-on-air information again from the radio broadcast information delivery server SV3, and then repeats the subsequent process.

If the affirmative result is obtained at step SP207, this means that the user intends to play back music based on the relevant music data. At this times the client terminal 2 proceeds to step SP208.

Figure 39:
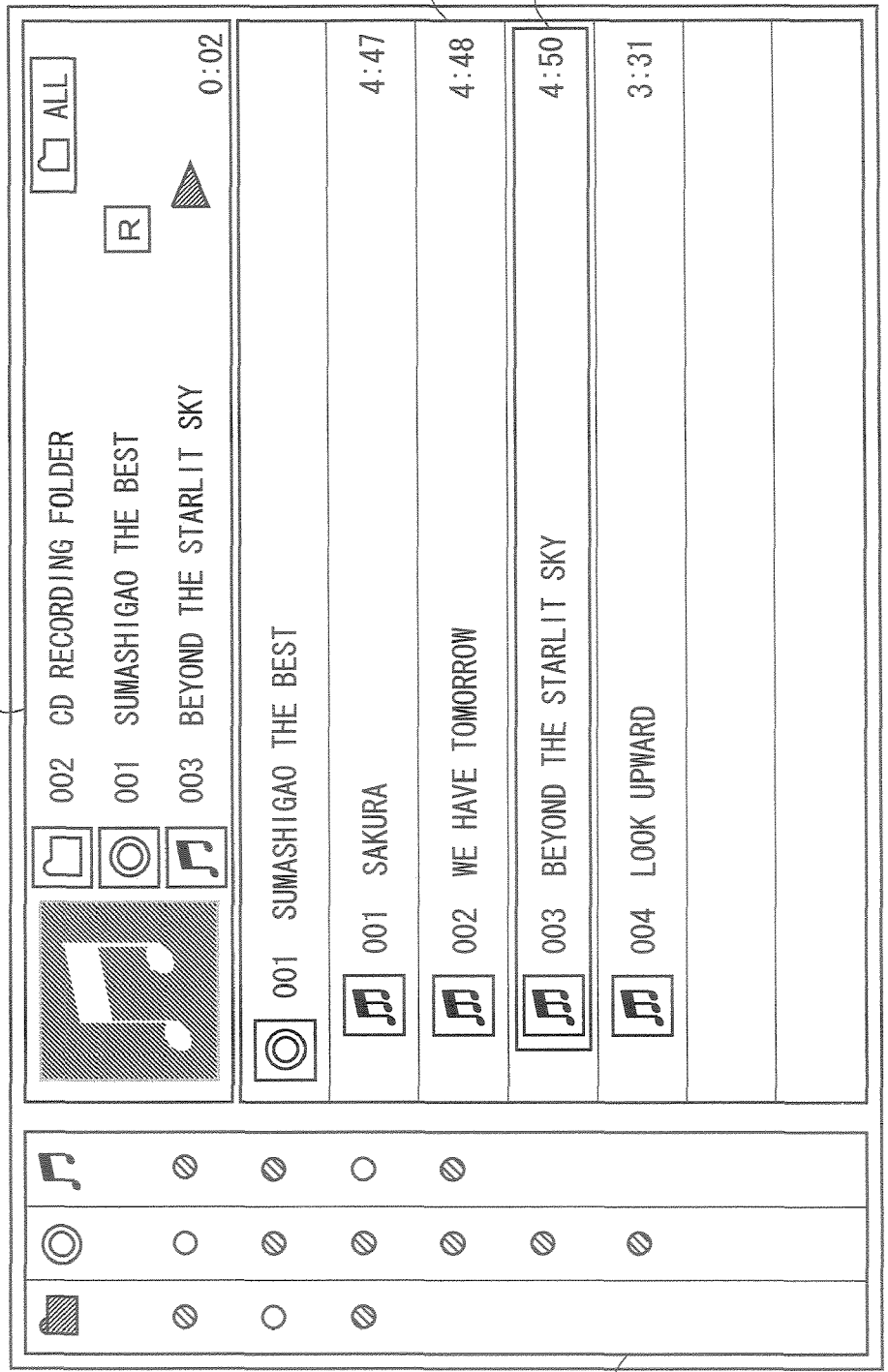
FIG. 39 is a schematic diagram showing a playback screen in accordance with a third embodiment of the present invention.

At step SP208, the client terminal 2 displays a relevant music data playback screen 310, as shown in FIG. 39, on the display 206, and also starts playing back the relevant music data.

This playback screen 310 is generated based on the property information of the relevant music data, including a storage address display area 311 that schematically displays a storage address of the relevant music data, a property information display area 312 that displays the property information such as a title of the relevant music and a name of a directory where the relevant music data is stored, and a title list display area 313 that lists titles of the music data stored in the directory of "album" where the relevant music is also stored.

The storage address display area 311 schematically displays a tree of directories and which part of it the relevant music data has been stored. This helps the user understand the storage address of the relevant music data easily.

The property information display area 312 displays the title of the relevant music data, a directory name of "album" ("SUMASHIGAO: The BEST", for example) where the relevant music data is stored, and a name of the above-layer directory of "folder" ("CD recording folder," for example) In this manner, the name of the directory where the relevant music data is stored is shown to the user. By the way, the name of the directory of "album" is equivalent to the name of an album where the relevant music data is stored.

The title information display area 313 lists the titles of the music data stored in the directory of "album" ("SUMASHIGAO: The BEST", in this case) where the relevant music data is also stored. This shows the user the other pieces of music data that have been stored in both the album of "SUMASHIGAO: The BEST" and the hard disk drive 211 (i.e. it shows the user the pieces of music data highly related to the relevant music data).

In addition, the title list display area 313 displays a selection cursor SU to be used to select one of the titles. Therefore, as well as the relevant music data, other pieces of music data on the title list display area 313 can be played back by the selection cursor SU.

After displaying the playback screen 311 and starting playing back the relevant music data, the client terminal 2 determines, based on an instruction from the user, whether it keeps playing back the relevant music data, or stops playing back it to repeat the above process (the process of step SP200 and subsequent).

(3-3) Operation and Effect in the Third Embodiment

The client terminal 2 with the above configuration receives the now-on-air information related to the currently-aired music from the radio broadcast information delivery server SV3 corresponding to the radio station that the user selected, and then sets the part of the now-on-air information, the music title and the artist name, as the retrieval condition to retrieve the relevant music data corresponding to the retrieval condition from the hard disk drive 211.

When the relevant music data exists, the client terminal 2 displays the indication button 301 on the now-on-air information screen 300; when the relevant music data does not exists, the client terminal 2 does not display the indication button 301 on the now-on-air information screen 300.

When the indication button 301 is pushed on the now-on-air information screen 300, the client terminal 2 outputs, to the display 206, the playback screen 310 including the storage address of the relevant music, its title, the name of the album where it is stored, the list of music data related to the relevant music data, and the like. The client terminal 2 also starts playing back the relevant music data.

Accordingly, the client terminal 2 can show the user whether the music data corresponding to the music aired in the radio program currently received has been recorded on the hard disk drive 211. In addition, the client terminal 2 can show the user the property information such as the storage address of the relevant music data, its title, the name of the album where it is stored and the like; and the title of the related music data.

Therefore, for example, when the user is listening to a radio program and a piece of music of his/her interest starts in the program, he/she can easily recognize whether this piece of music data has been already recorded on the client terminal 2 even if he/she does not remember whether the piece of music data has been recorded on the client terminal 2.

The above configuration makes this possible: the client terminal 2 retrieves, from the hard disk drive 211, the music data corresponding to the music title and artist name of the received now-on-air information, and shows the user whether the music data corresponding to the piece of music aired in the currently-received radio program has been recorded on the hard disk drive 211. Thus, the client terminal 2 can easily notify the user of which pieces of music data have been recorded.

In the third embodiment, in a case in which the music data corresponding to the piece of music aired in the currently-received radio program has been recorded on the hard disk drive 211, the client terminal 2 displays its property information such as the storage address and title of the music data. This allows the user to more clearly understand whether the music data corresponding to the piece of music aired in the currently-received radio program has been recorded on the hard disk drive 211.

In addition, in the third embodiment, the client terminal 2 automatically acquires the now-on-air information at predetermined intervals of time, and retrieves, using the now-on-air information, the relevant music data. Therefore, without forcing the user to do troublesome retrieval operation and the like, the client terminal 2 can retrieve the music data corresponding to the piece of music aired in the currently-received radio program, and then notify the user of the retrieval result.

Figure 40:
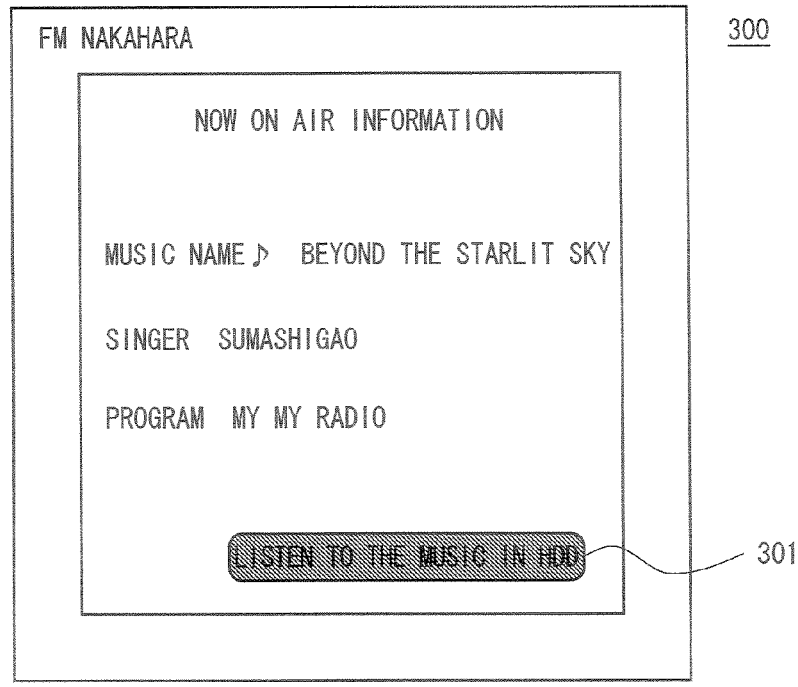
FIG. 40 is a schematic diagram showing a now-on-air information screen (3).

Furthermore, in the third embodiment, the client terminal 2 notifies the user of whether the relevant music data has been recorded on the hard disk drive 211 by displaying or not displaying the indication button 301 (which is equivalent to an indicator on the now-on-air information screen 300). However the present invention is not limited to this. For example, as shown in FIG. 40, when the relevant music data does not exist in the hard disk drive 211, the client terminal 2 may change the color of the identification button 301 and disenable the indication button 301 such that the button 301 can not be pushed to notify the user of the fact that the relevant music data does not exist. In this manner, the method of displaying the identification button 301 may vary.

Figure 41:
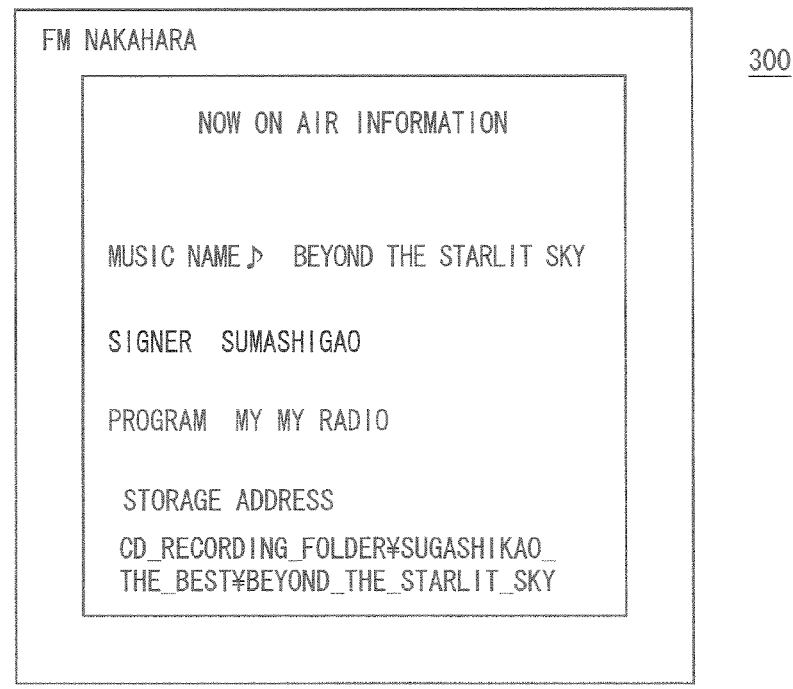
FIG. 41 is a schematic diagram showing a now-on-air information screen (4).

Furthermore, in the third embodiment, when the indication button 301 on the now-on-air information screen 300 is pushed, the client terminal 2 outputs, through the display 206, the playback screen 310 including the property information (which is equivalent to attribute information of the relevant music data). However, the present invention is not limited to this. For example, as shown in FIG. 41, when the relevant music data has been in the hard disk drive 211, characters indicating the storage address ("CD recording folder\SUMASHIGAO\SUMASHIGAO_THE_BEST\ Beyond_The_Starlit_Sky", for example) may be displayed on the now-on-air information screen 300.

In this case, the relevant music data is not played back. However, the now-on-air information screen 310 can show the fact that the relevant music data has been in the hard disk drive 211 and indicate the storage address.

Furthermore, in the third embodiment, when the indication button 301 is pushed to start playing back the relevant music data, the way of outputting audio of the radio program has not been disclosed clearly. However, it is desirable that the client terminal 2 stop the output of the radio program's audio when the relevant music data starts. In this case, the CPU 203 of the client terminal 2 controls the audio processing section 209 to stop the output of the radio program's audio.

Furthermore, in the third embodiment, when the relevant music data does not exist in the hard disk drive 211, the client terminal 2 just stops displaying the indication button 301. However the present invention is not limited to this. For example, the client terminal 2 may display a network address of a purchase page where the relevant music data can be purchased (an address of the music data delivery server SV1, for example) on the now-on-air information screen 300 to promote the sale of the relevant music data. In this case, the now-on-air information screen 300 may display a link button directly linked to the purchase page. This makes the way of purchasing the relevant music data more simple.

Furthermore, in the third embodiment, the client terminal 2 utilizes the now-on-air information, which includes content related information (such as a music title, an artist name and genre) related to the piece of music (broadcast content) aired in a radio program, to retrieve the music data corresponding to the piece of music from the hard disk drive 211. However the present invention is not limited to this. The client terminal 2 may receive, from a predetermined server, information including the content related information related to the broadcast content such as music or video data broadcast on television or the Internet, and then retrieve content data corresponding to the broadcast content from the hard disk drive 211. In this manner, the broadcast content is not limited to the radio broadcasting.

Furthermore, in the third embodiment, the title list display area 313 of the playback screen 310 lists the titles of music data that has been stored in both an album where the relevant music data is also recorded and the hard disk drive 211.

However the present invention is not limited to this. For example, the client terminal 2 may retrieve, from the hard disk drive 211, the music data of the same artist as that of the relevant music data, and then lists those titles. In this manner, the title list display area 313 may display not only the music data that belongs to the same album as the relevant music data but also the music data of the same artist and the like under various conditions.

Furthermore, in the third embodiments the hard disk drive 211 is applied to as a storage medium. However the present invention is not limited to this. Other kinds of storage media, such as CD-RW (Compact Disk ReWritable), DVD-RW (Digital Versatile Disk Random Access Memory) and "MEMORY STICK (Registered Trademark of Sonly Corporation)", may be applied.

Furthermore, in the third embodiment, radio broadcasting is applied to as the broadcast the client terminal 2 can receive. However the present invention is not limited to this. The client terminal 2 may receive the Internet broadcasting or the satellite broadcasting, and acquire the associated information (the radio broadcast information). Alternatively, the client terminal 2 may receive the television broadcasting from television broadcasting stations, and acquire various kinds of broadcast information related to the television programs from servers on the network NT.

Furthermore, in the third embodiment, the client terminal 2 is equipped with the hardware circuit blocks, the functional circuit blocks and the program modules. However the present invention is not limited to this. They may be incorporated in not only the client terminal 2, but other kinds of terminals such mobile phones and personal computers. The terminals equipped with the hardware circuit blocks, the functional circuit blocks and the program modules can operate in the same way as the above client terminal 2.

Furthermore, in the third embodiment, the broadcast signal reception section 30 and tuner section 31 shown in FIG. 2, or the antenna 212 or tuner 213 shown in FIG. 14 are applied to as broadcast reception means. The audio processing section 26 and speaker 27 shown in FIG. 2, or the audio processing section 209 and speaker 210 shown in FIG. 14 are applied to as broadcast content playback output means and content data playback output means. The communication control section 32 and network interface 33 shown in FIG. 2, or the communication processing section 214 and network interface 215 shown in FIG. 14 are applied to as communication means. The control section 23 in FIG. 2 or the CPU 203 in FIG. 14 is applied to as retrieval means and control means. The display control section 24 and display section 25 shown in FIG. 2 and the display processing section 207 and display 206 shown in FIG. 14 are applied to as display means. In this manner, the client terminal 2 is configured as the information processing apparatus. However the present invention is not limited to this. The client terminal 2 can be equipped with other kinds of functional circuit blocks if it operates in the same way.

(4) Fourth Embodiment

The fourth embodiment will be described. The configuration of system, client terminal and servers in the fourth embodiment is the same as that of the above first embodiment. Therefore, the description will be omitted.

In the fourth embodiment, the client terminal 2 is equipped with an music data automatic playback function that retrieves, using a desired keyword detected from the attribute information of the music data stored in the hard disk drive 211, the music data related to the received page information from the hard disk drive 211 and plays back the music data. The music data automatic playback function will be described.

(4-1) Music Data Automatic Playback Function

The music data automatic playback function is to retrieve, while displaying a page on the display 206 based on the page information received from each server SV1 to SV3, the music data related to the page from the hard disk drive 211 and play back the music data.

In the present embodiment, the following situation will be described: while the client terminal 2 displays a page to be used to deliver music data (also referred to as a "music data delivery page") based on the page information received from the music data delivery server SV1, the client terminal 2 automatically plays back the music data.

Figure 42:
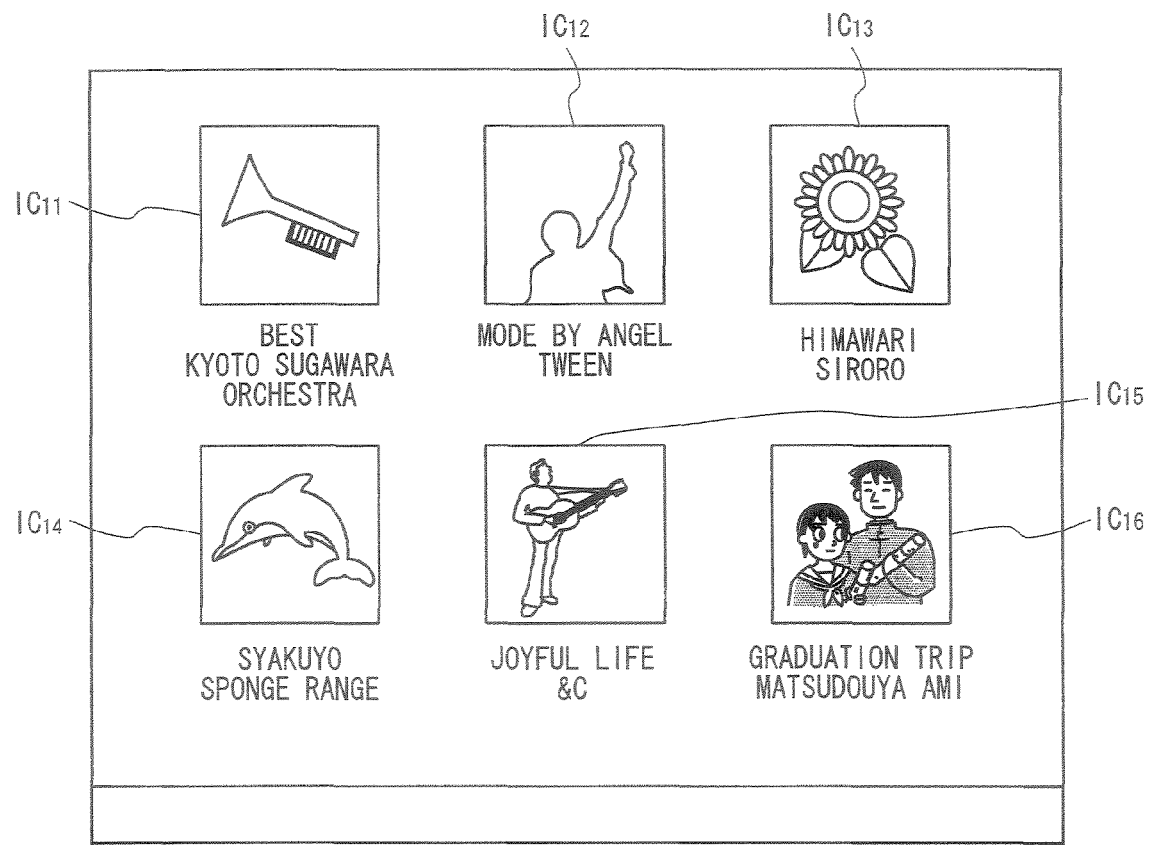
FIG. 42 is a schematic diagram showing the configuration of a music data delivery page (1) in accordance with a fourth embodiment of the present invention.

In addition, the music data delivery server SV1 has published as shown in FIG. 42, a music data delivery page where a plurality of icons IC ($IC_{11}$ to $IC_{16}$) are placed in order for a user to select his/her desired music data to be downloaded. The music data delivery server SV1 transmits the page information of the music data delivery page to the client terminal 2.

A process of the music data automatic playback function (also referred to as a "music data automatic playback process") will be described in detail.

Figure 43:
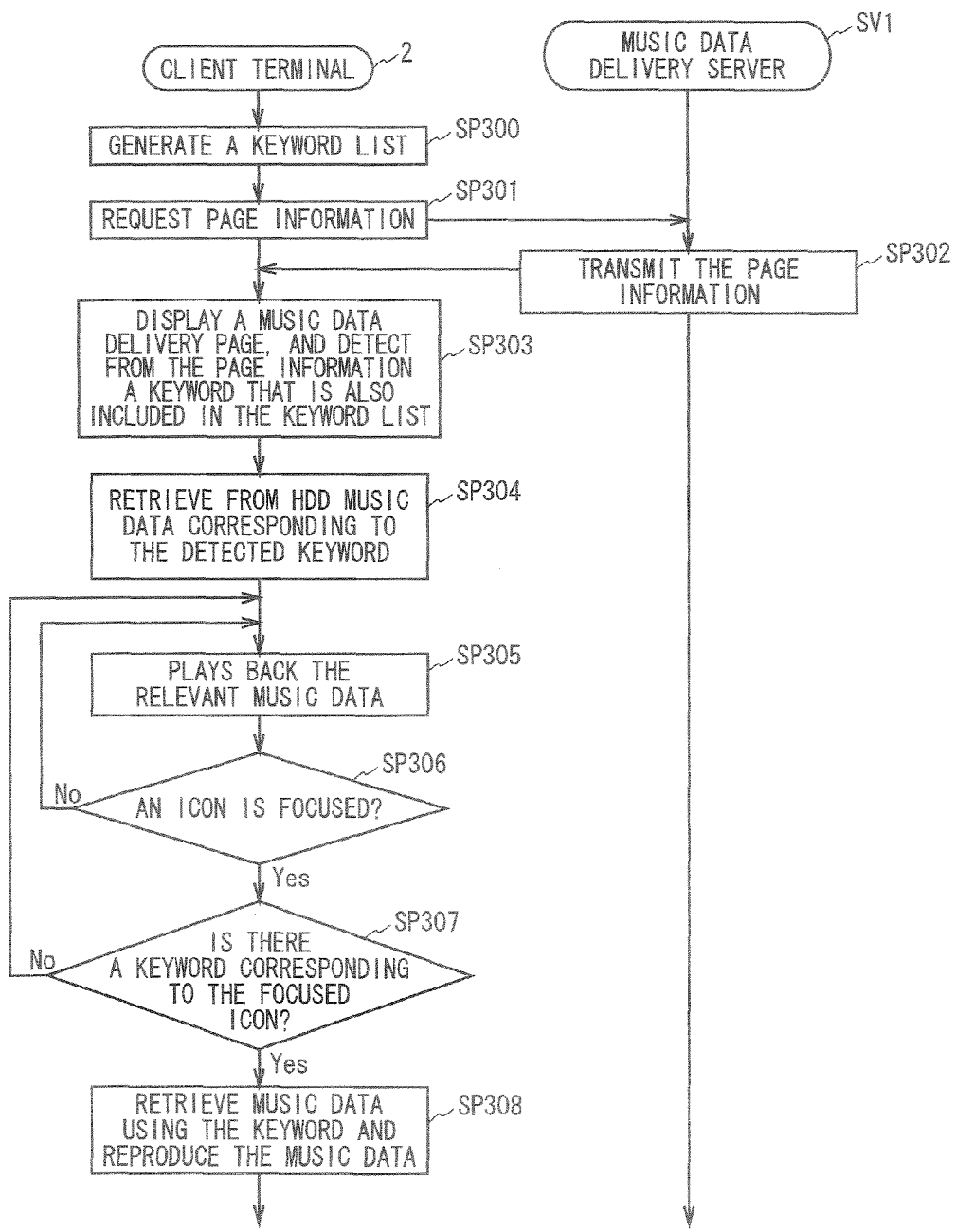
FIG. 43 is a sequence chart showing a procedure of music data automatic playback process in accordance with a fourth embodiment of the present invention.

The music data automatic playback process is, as shown in FIG. 43, a processing sequence between the cline terminal 2 and the music data delivery server SV2, and executed by the CPU 203 of the client terminal 2 and the CPU 270 of the music data delivery server SV1.

In this music data automatic playback process, the client terminal 2 acquires the page information from the music data delivery server SV1. However, this point has been already described above. Therefore, the description about the acquisition and authentication methods to do that will be omitted.

When the client terminal 2 is switched on, the client terminal 2 starts the music data automatic playback process and then proceeds to step SP300.

At step SP300, the client terminal 2 generates a list of keywords to be used, as retrieval keys, to retrieve the music data from the hard disk drive 211 to automatically play back (this list will be also referred to as a "keyword list").

In this case, the client terminal 2 generates the keyword list in which the attribute information of the above attribute information management table TB1 is included.

By the way, if all pieces of the attribute information stored in the attribute information management table TB1 are applied to as keyword, the number of it may be more than thousands.

Figure 44:
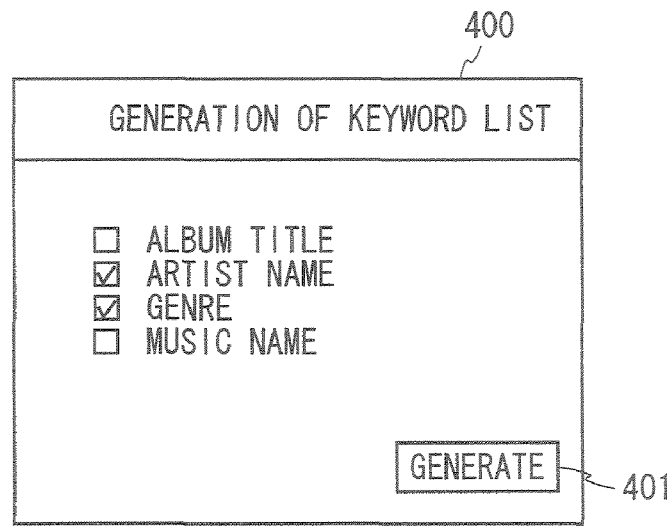
FIG. 44 is a schematic diagram showing the configuration of a keyword list generation screen in accordance with a fourth embodiment of the present invention.

Accordingly, the client terminal 2 displays a keyword list generation screen 400 on the display 206 as shown in FIG. 44. The keyword list generation section 400 allows a user to select, from the attribute information, his/her desired items (such as a title of album, an artist name, genre, a title of music and the like) to be registered as keyword. As a result, the attribute information of the selected item is to be registered as keyword.

For example, when a generation button 401 on the keyword list generation screen 400 is pushed after the items of "artist name" and "genre" are selected the client terminal 2 extracts the artist names and genres from the attribute information stored in the attribute information management table TB1 and generates a keyword list KL (FIG. 45) including them as keywords, and stores the keyword list KL in the hard disk drive 211.

Figure 45:
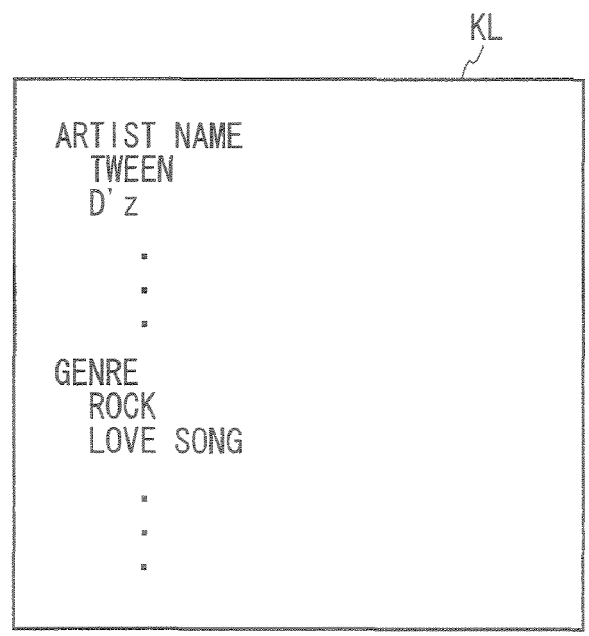
FIG. 45 is a schematic diagram showing a keyword list in accordance with a fourth embodiment of the present invention.

Accordingly in this case, as shown in FIG. 45 for example, the keyword list KL includes keywords such as artist names of "TWEEN", "D'Z" and the like, and genres of "Rock" "Love songs" and the like.

After generating the keyword list KL, the client terminal 2 proceeds to next step SP301.

At step SP301, the client terminal 2 transmits, to the music data delivery server SV1, a request signal to request the page information.

When the music data delivery server SV1 receives the request signal from the client terminal 2, the music data delivery server SV1 at step SP302 reads out the page information of the music data delivery page from the hard disk drive 272 and transmits it to the client terminal 2.

When the client terminal 2 receives the page information from the music data delivery server SV1, the client terminal 2 at step SP303 displays the music data delivery page on the display 206 based on the page information, and also detects, from the page information, the keywords listed in the keyword list KL.

Actually, as shown in FIG. 46, the page information contains description parts WP (WP$_{11}$ to WP$_{16}$) corresponding to the plurality of icons IC (IC$_{11}$ to IC$_{16}$) displayed on the music data delivery page.

The description parts WP (WP$_{11}$ to WP$_{16}$) include information set for each album or each track. When it is set for each album, the information includes a title of album, an artist name and its genre. When it is set for each track, the information includes a title of track, an artist name and its genre. By the way, the description part WP is also referred to as a "tag".

That is to say, the description parts WP (WP$_{11}$ to WP$_{16}$) include identification information of the music data that can be downloaded when the corresponding icons IC (IC$_{11}$ to IC$_{16}$) are selected. The client terminal 2 detects the keywords listed in the keyword list KL from the identification information written down on the description parts WP (WP$_{11}$ to WP$_{16}$).

For example, when the client terminal 2 detects the keywords of "TWEEN" and "ROCK" from the identification information on the description part WP$_{12}$ and the keyword of "Love song" from the identification information on the description part WP$_{16}$, the client terminal 2 associates the detected keywords with the icons IC (IC$_{12}$ and IC$_{16}$) corresponding to the description parts WP (WP$_{12}$ and WP$_{16}$), and temporarily stores them in the RAM 205, and then proceeds to next step SP304.

At step SP304, the client terminal 2 sets the following keywords as retrieval key: the keywords of "TWEEN", "ROCK" and "Love song" detected at step SP303. The client terminal 2 retrieves, from the hard disk drive 211, the music data whose attribute information includes the keywords of "TWEEN", "ROCK" or "Love song", and then proceeds to next step SP305.

Figure 47:
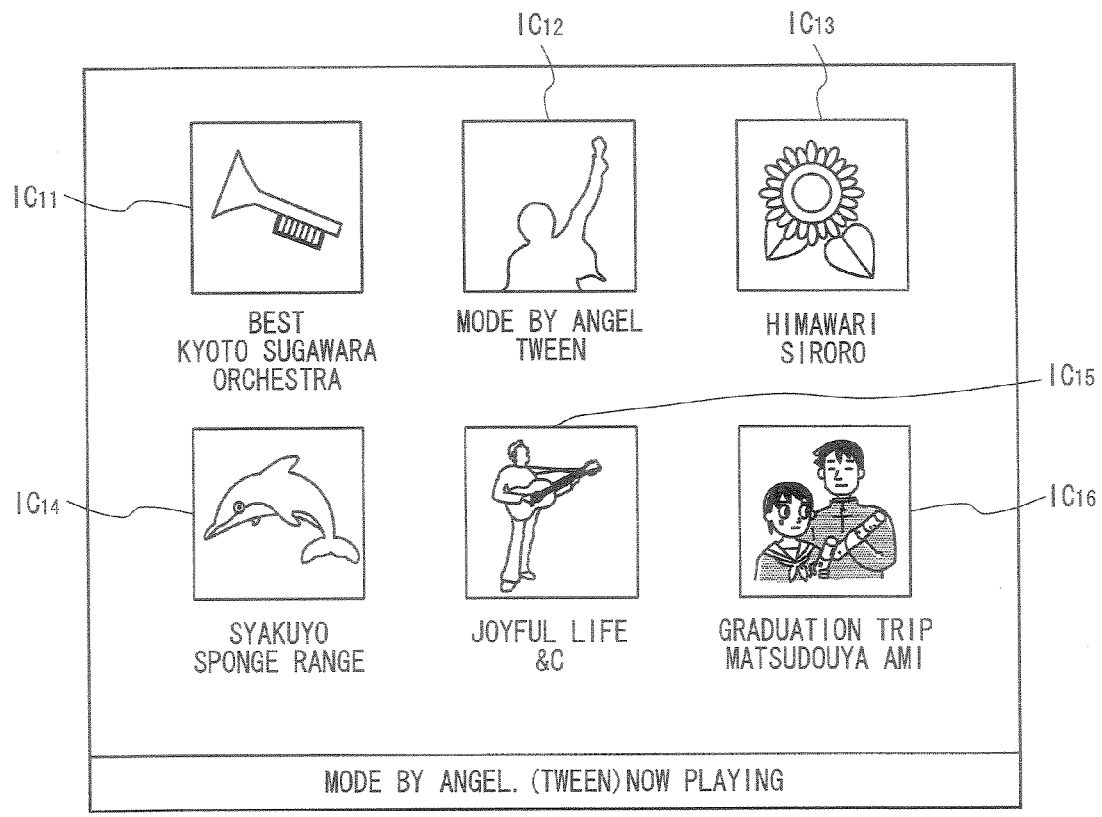
FIG. 47 is a schematic diagram showing the configuration of the music data delivery page (2).

At step SP305, the client terminal 2 plays back the music data retrieved at step SP304, and displays, as shown in FIG. 47, a title and artist name of the track corresponding to the currently played music on the edge of the music data delivery page, and then proceeds to step SP306.

If the client terminal 2 retrieves a plurality of pieces of music data, the client terminal 2 plays back them at random or in order of retrieval. If the client terminal 2 retrieves a plurality of pieces of music data all of which are stored in one albums the client terminal 2 plays back them in order of the track numbers.

At step SP306, the client terminal 2 determines whether one of the icons IC (IC$_{11}$ to IC$_{16}$) on the music data delivery page has been selected by a cursor (not shown) or the like through the operation input section 200.

If the negative result is obtained at step SP306, the client terminal 2 returns to step SP305 and at step SP305 continues to play back the music data.

If the affirmative result is obtained at step SP306, this means that the user has selected for example the icon IC$_{12}$ by the cursor or something like that, or that the user shows his/her interest about the downloadable music data by pushing the icon IC$_{12}$. In this case, the client terminal 2 proceeds to step SP307.

At step SP307, the client terminal 2 checks whether the keyword associated with the focused icon IC (the icon IC$_{12}$, in this case) has been stored in the RAM 205.

If the negative result is obtained, the client terminal 2 returns to step SP305 to continue to play back the music data at step SP305.

If the affirmative result is obtained at step SP307, this means that the keywords ("TWEEN" and "Rock") associated with the focused icon IC$_{12}$ has been stored in the RAM 205. In this case, the client terminal 2 proceeds to step SP308, and sets the keywords of "TWEEN" and "Rock" as retrieval key to retrieve, from the hard disk drive 211, the music data whose attribute information contains both the keywords of "TWEEN" and "Rock", and then plays back them at random for example.

In this manner, while displaying the music data delivery page, the client terminal 2 retrieves, from the hard disk drive 211, the music data related to the music data that can be downloaded through the music data delivery page, and then automatically plays back them. This allows a user to listen to the music data that is related to the music data delivery page and has been recorded on the client terminal 2 without forcing the user to do troublesome operations. In this manner, the user can easily understand which music data have been already recorded (4-2) Operation and Effect in the Fourth Embodiment The client terminal 2 with the above configuration generates a keyword list KL based on the attribute information of the music data stored in the hard disk drive 211. When the client terminal 2 receives the page information, the client terminal 2 displays the music data delivery page on the display 206 based on the page information, and detects, from the page information, the keywords that matches those of the keyword list KL.

The client terminal 2 then retrieves, from the hard disk drive 211, the music data corresponding to the detected keywords, and then plays back the music data obtained as a result of retrieval.

In this manner, while displaying the music data delivery page based on the received page information the client terminal 2 allows a user to listen to the music associated with the music data delivery page based on the stored music data.

In addition, the client terminal 2 displays a music title of the currently-played music data, its artist name and the like on a predetermined area of the music data delivery page. This allows the user to understand what kind of music data is currently played back.

Furthermore, if the client terminal has detected a plurality of keywords the client terminal 2 memorizes on the RAM 205, the positions (the icons IC for example) of the music data delivery page from which the keywords have been detected.

And then, when a part of the music data delivery page (the icon IC$_{12}$, for example) is focused by user's operation, the client terminal 2 plays back the music data corresponding to the keyword detected from the icon IC$_{12}$.

In this manner, when the user is interested in a part of the music data delivery page, the client terminal 2 allows him/her to listen to the music associated with the part based on the stored music data.

The above configuration makes this possible: the client terminal 2 retrieves, from the hard disk drive 211, the music data corresponding to the keyword detected from the received page information, and shows the user whether the music data corresponding to the keyword included in the received page information have been already stored in the hard disk drive 211. Thus the user can easily understand which music data the client terminal 2 has already recorded.

In addition, in the fourth embodiment, the client terminal 2 retrieves, from the hard disk drive 211, the music data whose attribute information includes the keywords. When the relevant music data exists, the client terminal 2 plays back the music data. Therefore, the user can listen to the music associated with the page information based on the stored music data. In this manner, the client terminal 2 allows a user to understand which music data have been already recorded on the client terminal 2 by playing back the music data.

Furthermore, the client terminal 2 retrieves, based on the keyword detected from the received page information, the music data from the hard disk drive 211 and then plays back the music data. Therefore, even if the received page information is only made up of characters or images, the client terminal 2 can play back the music data associated with the page out of the recorded music data to let a user listen to the music. Accordingly, when displaying the pages, the client terminal 2 does not download the music data. The client terminal 2 also provides engaging pages including not only characters and images but audio. This entertains the user.

Furthermore, on the client terminal 2, a user can select the attribute information to be registered as a keyword. For example, if a music title in the attribute information is registered as a keyword, the client terminal 2 retrieve, out of the pieces of music data that can be also downloaded through the music data delivery page, the music data whose title matches the keyword while displaying the music data delivery page. In this manner the client terminal 2 prevents the user from mistakenly purchasing the music data he/she already owns.

Figure 48:
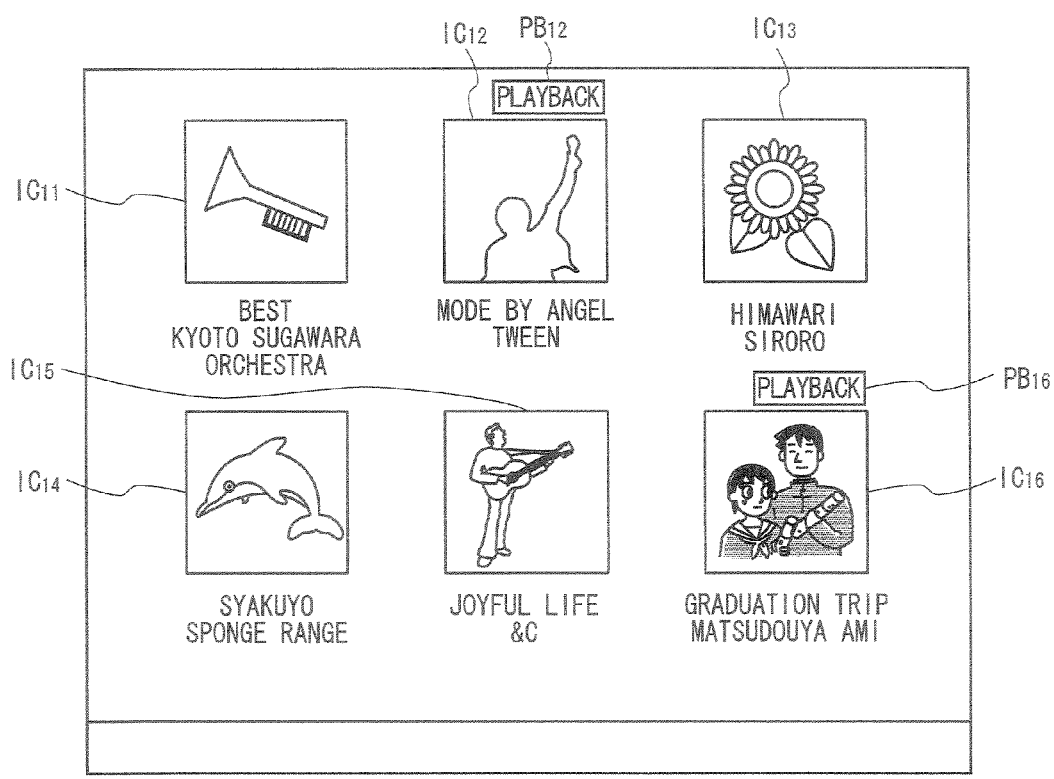
FIG. 48 is a schematic diagram showing the configuration of the music data delivery page (3).

By the way, in the fourth embodiment, the client terminal 2 receives the page information as information including a keyword which is equivalent to content related information, and detects from the page information a keyword that is also included in the keyword list KL which is equivalent to a related information list, and then reads out from the hard disk drive 211 the music data corresponding to the detected keyword to automatically play back it. However the present invention is not limited to this. For example, as shown in FIG. 48, the client terminal 2 may display playback buttons $PB_{12}$ and $PB_{16}$ near the icons $IC_{12}$ and $IC_{16}$ whose keywords have been detected. When the playback buttons $PB_{12}$ and $PB_{16}$ are pushed, the client terminal 2 may play back the corresponding music data.

Accordingly, the client terminal 2 allows a user to easily check which parts (the icons IC for example) of the music data delivery page are associated with the recorded music data. Instead of displaying the playback buttons $PB_{12}$ and $PB_{16}$ near the icons $IC_{12}$ and $IC_{16}$, the icons $IC_{12}$ and $IC_{16}$ may be highlighted to let the user know which parts are associated with the recorded music data.

Furthermore, in the fourth embodiment, the item selected from the attribute information stored in the attribute information management table TB1 is registered as keywords. However the present invention is not limited to this. All the items in the attribute information stored in the attribute information management table TB1 may be registered as keywords. Alternatively, the information acquired from outside may be registered as keywords. A character input by a user may be registered as keywords.

Furthermore, in the fourth embodiment, the client terminal 2 detects a keyword from the music data delivery page published by the music data delivery server SV1 which is equivalent to an external device, and finds out the music data that matches the keyword from the hard disk drive 211 to play back it. However the present invention is not limited to this. The client terminal 2 may detect a keyword from a page of selling package media (also referred to as a "package media sales page") published by the product sales server which is equivalent to an external device, and find out the music data that matches the keyword from the hard disk drive 211 to play back it. Alternatively, from a page other than the music data delivery page and the package media sales page, the client terminal 2 may detect a keyword from the page information of the page, and play back the music data that matches the keyword. Accordingly, when the client terminal 2 for example displays a page about a love song, the client terminal 2 automatically retrieves the music data whose genre is Love Song from the hard disk drive 211 to play back it. In this manner the client terminal 2 provides the user with BGM (Back Ground music) associated with the page.

In this case, the client terminal 2 just plays back the music data from its hard disk drive 211. This prevents infringement of copyright and the like.

Furthermore, in the fourth embodiment, the client terminal 2 receives the page information that makes up the music data delivery page, and detects a keyword from the page information. However the present invention is not limited to this. The client terminal 2 may receive list information, which is a list of downloadable music data, from the music data delivery server SV1, and detect a keyword from the list information. The client terminal 2 may receive list information, which is a list of package media that a user can purchase, from the product sales server SV2, and detect a keyword from the list information. In this manner, the client terminal 2 may detect a keyword from various kinds of information.

Furthermore, in the fourth embodiment, the client terminal 2 retrieves, from the hard disk drive 211, the music data whose attribute information matches the keyword in the keyword list KL. However the present invention is not limited to this. If the attribute information of the music data does not perfectly match the keyword and only a part of the attribute information matches the keyword, this music data can be retrieved (so-called fuzzy retrieval).

Furthermore, in the fourth embodiment, the client terminal 2 plays back the music data that matches the keyword. However the present invention is not limited to this. For example, the client terminal 2 may retrieve, using the keyword, image data from the hard disk drive 211, and then plays back the retrieved image data. In this manner, the client terminal 2 may play back various kinds of content data.

Furthermore, the pieces of music data retrieved from the hard disk drive 211 are played back in order of retrieval, at random or in order of the track numbers. However the present invention is not limited to this. The music data may be played back in various orders such as in order of date of recording of the music data, in order of the number of times of playback, and the like. In addition, when playing back the music data in that manner, the client terminal 2 may play back a first several tens of seconds of the music data, instead of playing back the whole music data.

Furthermore, in the fourth embodiment, the hard disk drive 211 is applied to as a storage medium. However the present invention is not limited to this. Various storage media, such as CD-RW (Compact Disk ReWritable), DVD-RW (Digital Versatile Disk Random Access Memory), and "MEMORY STICK (Registered Trademark of Sony Corporation), may be applied.

Furthermore, in the fourth embodiment, radio broadcasting is applied to as a kind of broadcasting the client terminal 2 can receive. However the present invention is not limited to this. The client terminal 2 may receive Internet radio broadcasting or satellite radio broadcasting, and acquire the associated information (radio broadcast information). Alternatively, the client terminal 2 may receive television broadcasting from television stations, and acquire various kinds of information related to the television programs from a server on the network NT.

Furthermore, in the fourth embodiments, the hardware circuit blocks, the functional circuit blocks and the program modules are applied to the client terminal 2. However the present invention is not limited to this. They may be applied to other kinds of terminals such as mobile phones and personal computers, as well as the client terminal 2. Terminals equipped with the hardware circuit blocks, the functional circuit blocks and the program modules can operate in the same way as the above client terminal 2.

Furthermore, in the fourth embodiment, the communication control section 32 and network interface 33 shown in FIG. 2, or the communication processing section 214 and network interface 215 shown in FIG. 14 are applied to as communication means. The storage medium 29 shown in FIG. 2 or the hard disk drive 211 shown in FIG. 14 is applied to as a storage medium. The control section 23 shown in FIG. 2 or the CPU 203 shown in FIG. 14 is applied to as detection means, retrieval means and list generation means. The audio control section 26 and speaker 27 shown in FIG. 2 or the audio processing section 209 and speaker 210 shown in FIG. 14 are applied to as playback means. In this manner the client terminal 2 is configured as the information processing apparatus. However the present invention is not limited to this. If it works in the same way as the above client terminal 2, the client terminal 2 may be equipped with other kinds of functional circuit blocks.

(5) Fifth Embodiment

Figure 49:
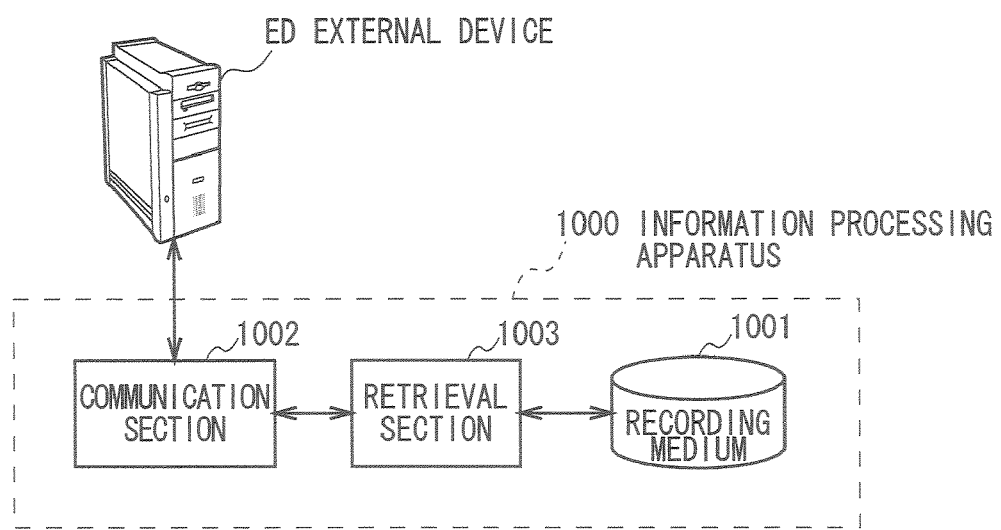
FIG. 49 is a block diagram showing the configuration of an information processing apparatus (1) by using functional circuit blocks in accordance with a fifth embodiment of the present invention.

A fifth embodiment will be described below. FIG. 49 shows the hardware configuration of an information processing apparatus 1000 by using functional circuit blocks in accordance with the fifth embodiment. The recording apparatus 1000 records content data and content related information related to the content on a recording medium 1001 such that the content data and the content related information are associated with one another. The content data recorded on the recording medium 1001 includes the music data ripped from the music CD and the music data downloaded. The content related information includes a title of music, an artist name, genre, a title of an album where the music is stored, and an album ID.

In addition, the recording apparatus 1000 receives, from an external device ED, information including the content related information through a communication section 1002, and then supplies the received information to a retrieval section 1003. The retrieval section 1003 retrieves, based on the content related information included in the information received by the communication section 1002, the content data corresponding to the content related information from the recording medium 1001. The information acquired from the external device ED includes, for example, page information such as XML or HTME files, and now-on-air information.

In this manner, the recording apparatus 1000 retrieves, based on the content related information included in the information received from the external device ED, the content data corresponding to the content related information from the recording medium 1001. Therefore, the recording apparatus 1000 can show a user whether the content data that matches the content related information included in the received information the recording medium 1001 has already recorded or not. Thus, the client terminal 2 can notify the user of which content data have been already recorded.

Figure 50:
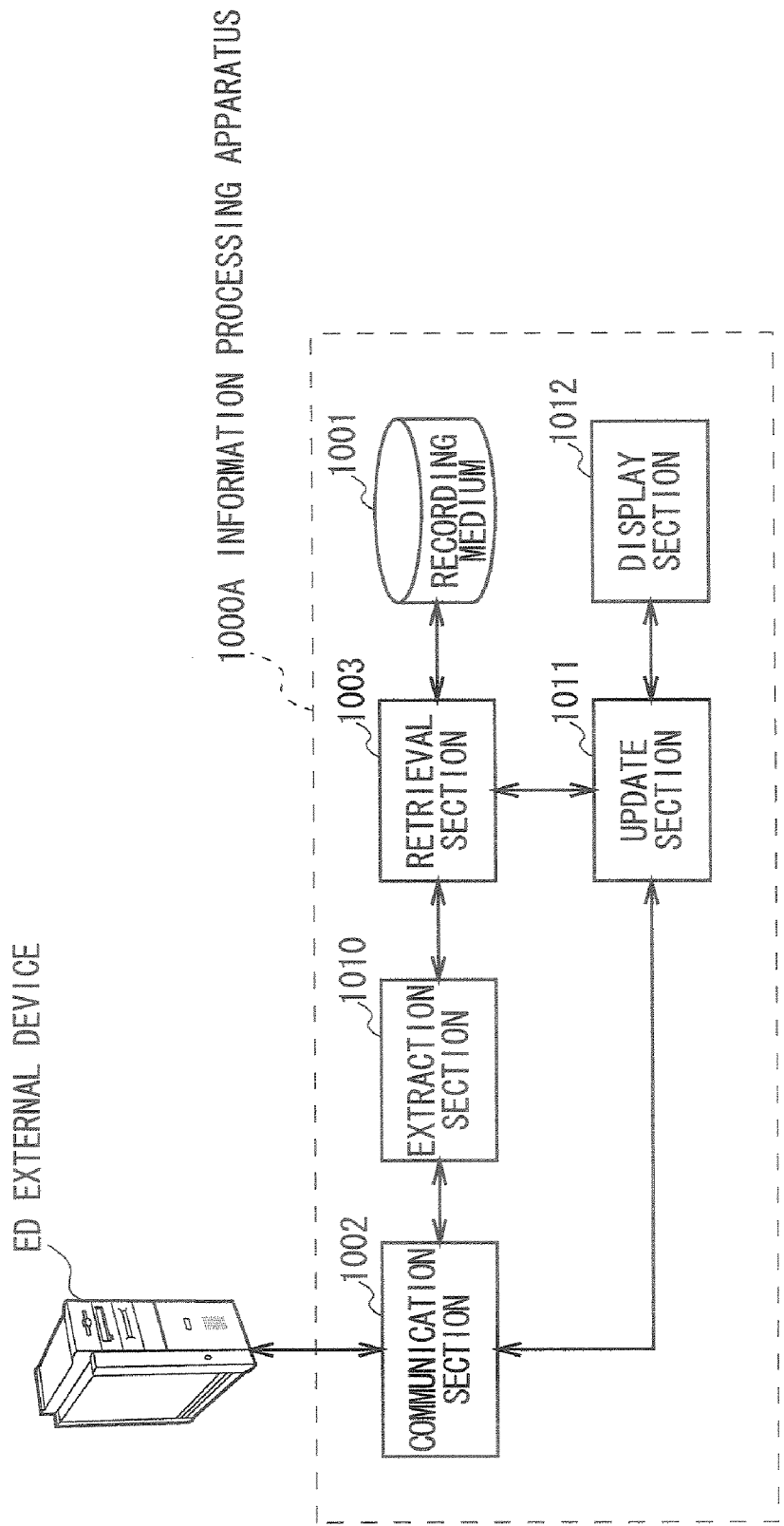
FIG. 50 is a block diagram showing the configuration of an information processing apparatus (2) by using functional circuit blocks in accordance with a fifth embodiment of the present invention.

In addition, after retrieving the content data from the recording medium 1001, the information processing apparatus 1000 may update, based on the retrieval result, the received information. In this case, as shown in FIG. 50 (the parts of FIG. 50 have been designated by the same reference numerals and marks as the corresponding parts of FIG. 49), an information processing apparatus 1000A receives, from the external device ED, information including content identification information through the communication section 1002, and then supplies the received information to an extraction section 1010. The content identification information, for example, is a part of the content related information, and to be used to identify the content. The content identification information includes a title of music corresponding to the music data, and an artist name.

The extraction section 1010 extracts the content identification information from the information received by the communication section 1002, and then supplies the extracted content identification information to the retrieval section 1003. The retrieval section 1003 retrieves, based on the content identification information extracted by the extraction section 1010, the content data corresponding to the content related information having the content identification information from the recording medium 1001, and supplies the retrieval result to an update section 1011. The update section 1011 updates, based on the retrieval result by the retrieval section 1003, the information received by the communication section 1002, and then supplies the updated information to the display section 1012 to display the updated information.

In this manner, after retrieving the content data, the information processing apparatus 1000A updates, based on the retrieval result, the received information. By displaying the updated information on the display section 1012 for example, the client terminal 2 can clearly show a user whether the content data that matches the content identification information included in the received information the recording medium 1001 has already recorded or not.

Figure 51:
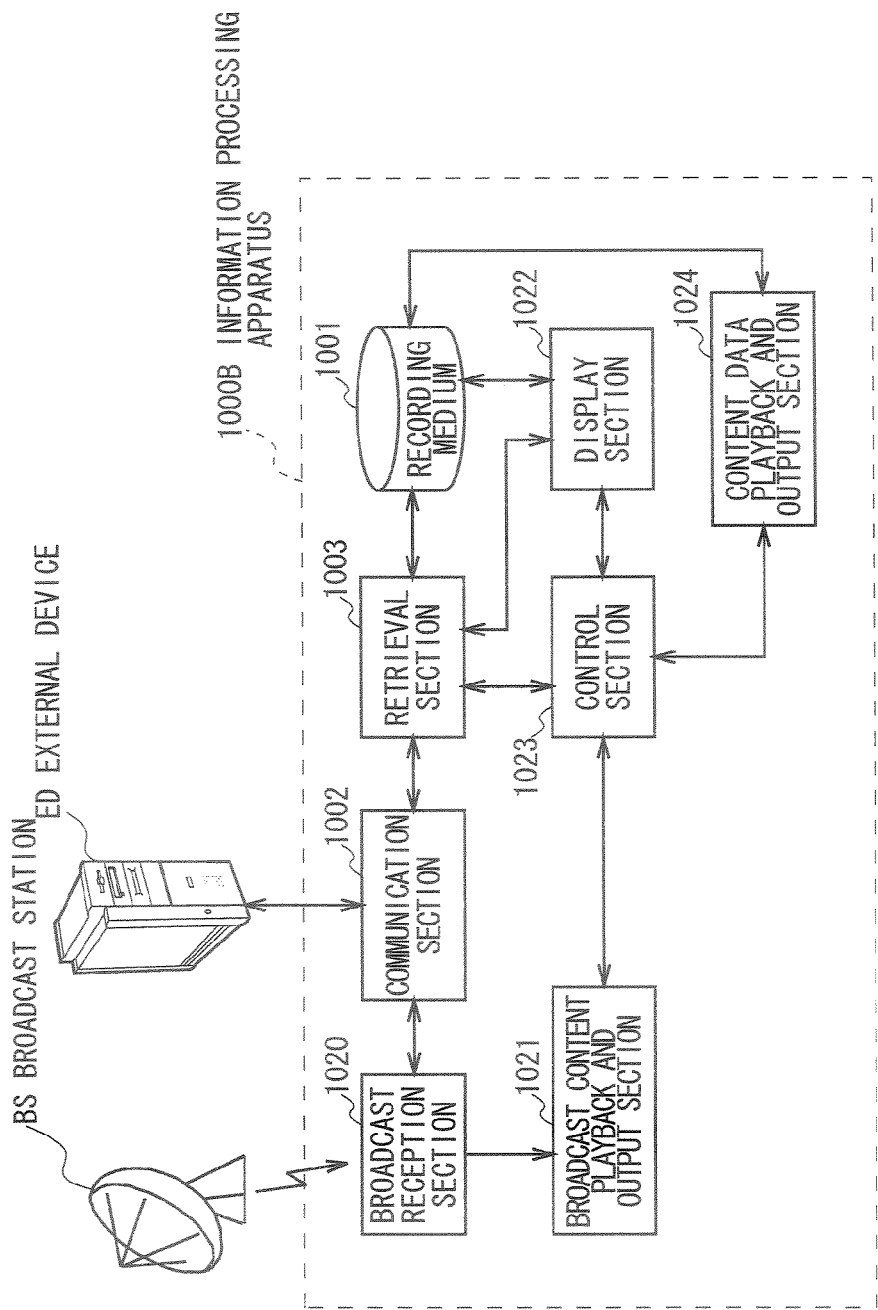
FIG. 51 is a block diagram showing the configuration of an information processing apparatus (3) by using functional circuit blocks in accordance with a fifth embodiment of the present invention.

Furthermore, the information processing apparatus 1000 may receive, from the external device ED, the information including the content related information related to a currently-received broadcast content, and then retrieves, based on the content related information included in the received information, the content data corresponding to the content related information from the recording medium 1001. In this case, as shown in FIG. 51 (the parts of FIG. 51 have been designated by the same reference numerals and marks as the corresponding parts of FIG. 49), an information processing apparatus 1000B receives broadcast content from a broadcast station BS through a broadcast reception section 1020, and plays back the received broadcast content by a broadcast content playback and output section 1021.

In addition, the information processing apparatus 1000B transmits, to the external device ED, request information through the communication section 1002 to request from the external device ED information including the content related information related to a broadcast content currently received by the broadcast reception section 1020, and receives, by the communication section 1002, the information that is transmitted, in response to the request information, from the external device ED. The information acquired from the external device ED for example is the now-on-air information or the like. The information received by the communication section 1002 is supplied to the retrieval section 1003.

The retrieval section 1003 retrieves, based on the content related information included in the information received by the communication section 1002, the content data corresponding to the content related information from the recording medium 1001, and then supplies the retrieval result to a display section 1022. The display section 1002 displays, based on the retrieval result by the retrieval section 1003, at least a part of the content related information recorded on the recording medium 1001.

In this manner, the information processing apparatus 1000B retrieves, based on the information including the content related information related to a currently-received broadcast content, the content data corresponding to the content related information included in the information from the storage medium 1001. Therefore, the information processing apparatus 1000B can show a user whether the content data corresponding to the currently-received broadcast content the recording medium 1001 has already recorded or not.

In addition, the information processing apparatus 1000B may be equipped with a control section 1023 that controls, based on the retrieval result by the retrieval section 1003, the display section 1022 to display information to inform whether the content data corresponding to the content related information included in the received information the recording medium 1001 has already recorded or not. In this manner, the information processing apparatus 1000B can clearly notify a user of whether the content data corresponding to the currently-received broadcast content has been already recorded on the recording medium 1001 or not through the display section 1022.

Furthermore, the control section 1023 may control, in accordance with the retrieval result by the retrieval section 1003 and based on whether the content data corresponding to the content related information included in the received information the recording medium 1001 has already recorded or not, the display section 1022 such that an indicator to be used to play back the content data is displayed in a different manner.

Furthermore, the information processing apparatus 1000B may be equipped with a content data playback and output section 1024 to play back and output the content data recorded on the recording medium 1001. In this case, in response to operation of the indicator displayed on the display section 1022, the control section 1023 displays, on the display section 1022, an recording address of the recording medium 1001 where the content data corresponding to the indicator has been recorded, and starts playing back the content data by the content data playback and output section 1024, and then orders the broadcast content playback and output section 1021 to stop at least output of the currently-received broadcast content.

Figure 52:
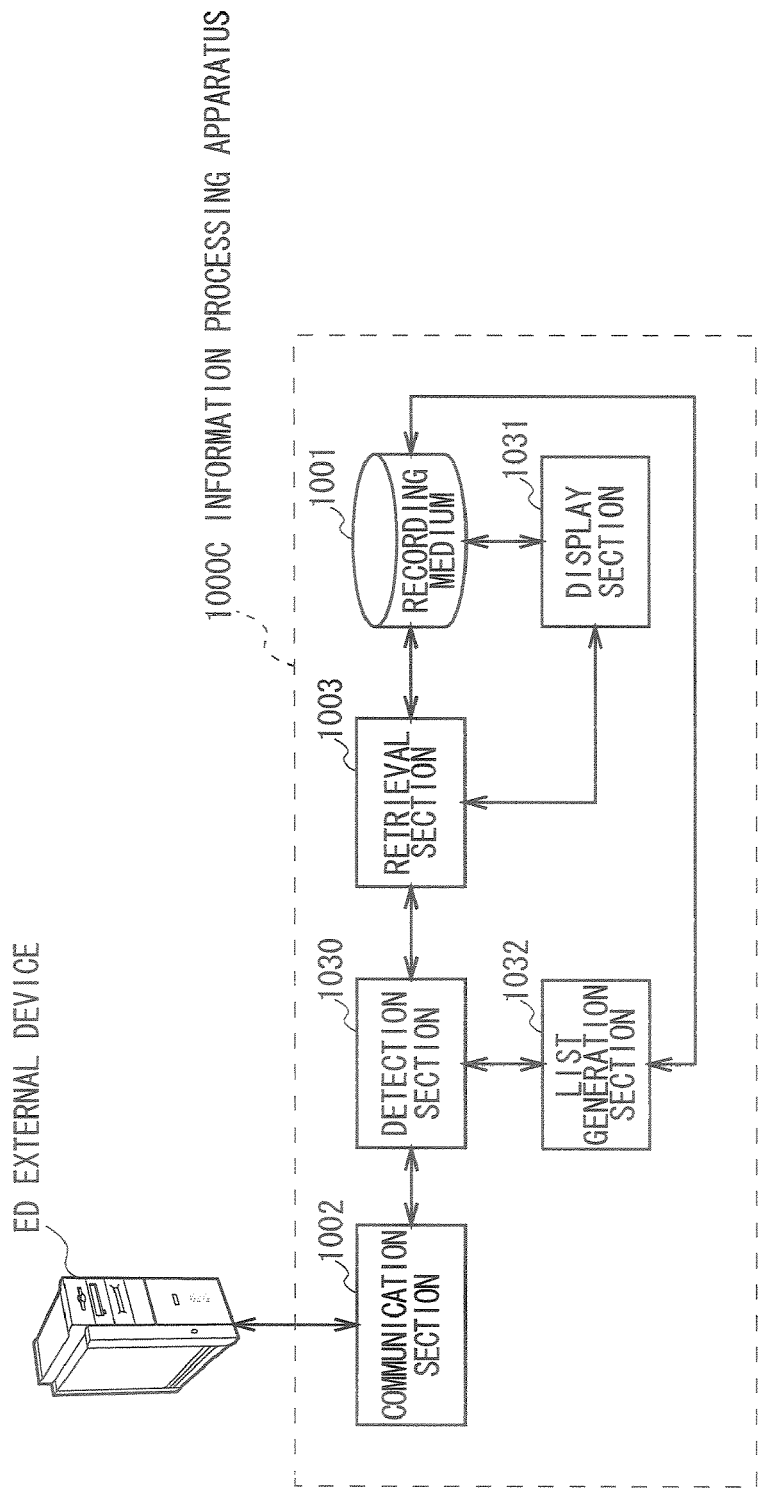
FIG. 52 is a block diagram showing the configuration of an information processing apparatus (4) by using functional circuit blocks in accordance with a fifth embodiment of the present invention.

Furthermore, the information processing apparatus 1000 may detect the content related information from the received information, and play back, when the content data corresponding to the detected content related information has been retrieved from the recording medium 1001, the retrieved content data. In this case, as shown in FIG. 52 (the parts of FIG. 52 have been designated by the same reference numerals and marks as the corresponding parts of FIG. 49), an information processing apparatus 1000C receives, from the external device ED, the information including the content related information through the communication section 1002, and then supplies the received information to a detection section 1030.

The detection section 1030 detects the content related information from the information received by the communication section 1002, and then supplies the detected content related information to the retrieval section 1003. The retrieval section 1003 retrieves, based on the content related information detected by the detection section 1030, the content data corresponding to the content related information from the recording medium 1001, and then supplies the retrieval result to a playback section 1031.

When the content data is retrieved by the retrieval section 1003, the display section 1031 reads out, based on the retrieval result by the retrieval section 1003, the retrieved content data from the storage medium 1001 to play back the content data.

In this manner, the information processing apparatus 1000C detects the content related information from the received information, and plays back, if the content data corresponding to the content related information has been recorded in the recording medium 1001, the content data. In this manner, the information processing apparatus 1000C can provide a user with the content based on the recorded content data associated with the received information.

In addition, the information processing apparatus 1000C may be equipped with a list generation section 1032 to detect the content related information from the recording medium 1001 and then generate a related information list listing the pieces of the content related information. The detection section 1030 may compare the information received by the communication section 1002 with the related information list generated by the list generation section 1032 to detect the content related information from the information.

The information processing apparatus 1000, 1000A, 1000B and 1000C according to the fifth embodiment is for example equivalent to the client terminal 2 shown in FIGS. 1 and 2. The external device ED is for example equivalent to the portal server 3 and the radio broadcast information delivery server SV3 shown in FIG. 1.

The recording medium 1001 of the information processing apparatus 1000 is for example equivalent to the storage medium 29 of the client terminal 2 shown in FIG. 2. The communication section 1002 of the information processing apparatus 1000 is for example equivalent to the communication control section 32 and network interface 33 of the client terminal 2. The retrieval section 1003 of the information processing apparatus 1000 is for example equivalent to the control section 23 of the client terminal 2.

In addition, the extraction section 1010 of the information processing apparatus 1000A is for example equivalent to the control section 23 of the client terminal 2. The update section 1011 of the information processing apparatus 1000A is for example equivalent to the control section 23 and page information generation section 36 of the client terminal 2. The display section 1012 of the information processing apparatus 1000A is for example equivalent to the display control section 24 and display section 25 of the client terminal 2.

The broadcast reception section 1020 of the information processing apparatus 1000B is for example equivalent to the broadcast signal reception section 30 and tuner section 31 of the client terminal 2. The broadcast content playback and output section 1021 and content data playback and output section 1024 of the information processing apparatus 1000B are for example equivalent to the audio control section 26 and speaker 27 of the client terminal 2. The display section 1022 of the information processing apparatus 1000B is for example equivalent to the display control section 24 and display section 25 of the client terminal 2. The control section 1023 of the information processing apparatus 1000B is for example equivalent to the control section 23 of the client terminal 2.

The detection section 1030 and list generation section 1032 of the information processing apparatus 1000C is for example equivalent to the control section 23 of the client terminal 2. The display section 1031 of the information processing apparatus 1000C is for example equivalent to the audio control section 26 and speaker 27 of the client terminal 2.

By the way, in the fifth embodiment, the communication section 1002 is applied to as communication means; the retrieval section 1003 is applied to as retrieval means; the extraction section 1010 is applied to as extraction means; the update section 1011 is applied to as update means; the display sections 1012 and 1022 are applied to as display means; the broadcast reception section 1020 is applied to as broadcast reception means; the broadcast content playback and output section 1021 is applied to as broadcast content playback and output means; the control section 1023 is applied to as control means; the content data playback and output section 1024 is applied to as content data playback and output means; the detection section 1030 is applied to as detection means; the display section 1031 is applied to as playback means; and the list generation section 1032 is applied to as list generation means. However the present invention is not limited to this. If it works in the same way, the information processing apparatus may be equipped with other kinds of functional circuit blocks.

INDUSTRIAL APPLICABILITY

The present invention can be applied to a recording device that downloads content data and records the content data.

DESCRIPTION OF SYMBOLS

1 . . . MUSIC RELATED SERVICE PROVISION SYSTEM, 2 . . . , CLIENT TERMINAL, 3 . . . PORTAL SERVER, 200 . . . OPERATION INPUT SECTION, 201 . . . INPUT OPERATION SECTION, 203, . . . CPU, 204 . . . ROM, 205 . . . RAM 211 . . . HARD DISK DRIVE, 212 . . . ANTENNA, 213 . . . TUNER, 214 . . . COMMUNICATION PROCESSING SECTION, 215 . . . NETWORK INTERFACE, 300 . . . NOW-ON-AIR INFORMATION SCREEN, 301 . . . INDICATION BUTTON, 310 . . . PLAYBACK SCREEN, 1000A-C . . . INFORMATION PROCESSING APPARATUS, 1001 . . . RECORDING MEDIUM, 1002 . . . COMMUNICATION SECTION, 1003 . . . RETRIEVAL SECTION, 1010 . . . EXTRACTION SECTION, 1011 . . . UPDATE SECTION, 1012, 1022 . . . DISPLAY SECTION, 1020 . . . BROADCAST RECEPTION SECTION, 1021 . . . BROADCAST CONTENT PLAYBACK AND OUTPUT SECTION, 1023 . . . CONTROL SECTION, 1024 . . . CONTENT DATA PLAYBACK AND OUTPUT SECTION, 1030 . . . DETECTION SECTION, 1031 . . . PLAYBACK SECTION, 1032 . . . LIST GENERATION SECTION, KL . . . KEYWORD LIST, NT . . . NETWORK, SV1 . . . MUSIC DATA DELIVERY SERVER

The invention claimed is:

1. An information processing apparatus, comprising:
a broadcast reception unit configured to receive broadcast content;
a broadcast content playback and output unit configured to play back and output the broadcast content received by said broadcast reception unit;
a communication unit configured to transmit request information to an external device and to receive, from an external device, in response to the request information, content related information related to the broadcast content received by said broadcast reception unit;
a storage medium configured to store a first plurality of contents and identification information related to said first plurality of contents;
a display unit configured to display a notification of whether the broadcast content has been recorded on said storage medium and to display a menu of a second plurality of contents;
a judging unit configured to judge whether the broadcast content has been stored in the storage medium by comparing the content related information and the identification information, wherein, when the communication unit receives, from an external device, album identification information related to an album consisting essentially of the second plurality of contents available for a download, the judging unit judges whether the second plurality of contents are stored in the storage medium by comparing the album identification information and the identification information; and
a control unit configured to control said display unit to display the notification of whether the broadcast content has been recorded on said storage medium, in response to a judgment, based on the content related information and the identification information, by the judging unit, and to indicate, by displaying an indicator, how many of the second plurality of contents are stored in the storage medium, in response to a judgment, based on the album identification information and the identification information, by the judging unit, the indicator indicating a number of the second plurality of contents of the album stored in the storage medium.

2. The information processing apparatus according to claim 1, wherein said communication unit is configured to receive, from the external device, list information that includes said album identification information and forms a list of content data available for a download, and
the information processing apparatus further comprises:
an extraction unit configured to extract said album identification information from said list information.

3. The information processing apparatus according to claim 1, wherein the external device is configured to provide a plurality of content data grouped by album, said communication unit is configured to receive, from the external device, list information that includes said album identification information and forms a list of content data available for a download, grouped by album, and
the information processing apparatus further comprises:
an extraction unit configured to extract said album identification information from said list information.

4. The information processing apparatus according to claim 1, wherein said communication unit is configured to receive, from an external device, list information that includes media identification information to be used to identify a package medium and forms a list of package media which can be purchased,
said information processing apparatus further comprises:
an extraction unit configured to extract said media identification information from said list information, and
the judging unit compares the media identification information and the identification information.

5. The information processing apparatus according to claim 1, wherein the control unit is configured to cause the display unit to display contents not stored in the storage medium in a highlighted manner.

6. The information processing apparatus according to claim 1, wherein the display unit displays at least a part of the content related information that is to be recorded on the storage medium.

7. The information processing apparatus according to claim 6, wherein said control unit is configured to control said display unit such that an indicator that indicates a playback of one of the first plurality of contents is displayed in a different manner.

8. The information processing apparatus according to claim 7, further comprising:
   a content data playback and output unit configured to play back and output the one of said first plurality of contents recorded on said storage medium, wherein, when said indicator indicating the playback is displayed on said display unit and is operated, said control unit is configured to cause said display unit to display a recording address of said storage medium where the one of said first plurality of contents is recorded, to cause a playback of the one of said first plurality of contents through said content data playback and output unit, and to cause said broadcast content playback and output unit to stop at least an output of a currently received broadcast content.

9. The information processing apparatus according to claim 1, further comprising:
   a playback unit for playing back, when the judging unit judges that the broadcast content is stored in the storage medium, the broadcast content.

10. The information processing apparatus according to claim 9, further comprising:
    a list generation unit configured to generate, by detecting the content related information that is to be recorded on said storage medium, a related information list that is a list of said content related information, wherein said judging unit is configured to compare said content related information with said related information list generated by said list generation unit.

11. The information processing apparatus according to claim 9, wherein said judging unit is configured to detect a plurality of content data based on said content related information, and the playback unit plays back the plurality of content data in a predetermined order.

12. The information processing apparatus according to claim 9, wherein said communication unit is configured to receive, from an external device, page information containing said content related information.

13. The information processing apparatus according to claim 12, wherein said communication unit is configured to receive, from a server providing a download service of content data, list information that makes up a list of downloadable content data, and said judging unit is configured to detect said content related information from said list information received by said communication unit.

14. The information processing apparatus according to claim 12, wherein said communication unit is configured to receive, from a server providing a purchase service of package media where content data is recorded, list information that makes up a list of package media that can be purchased, and said judging unit is configured to detect said content related information from said list information received by said communication unit.

15. The information processing apparatus according to claim 1, wherein said control unit is configured to indicate how many of the second plurality of contents are stored in the storage medium by using different colors.

16. An information processing method implemented by a content recording and reproducing apparatus, the information processing method comprising:
    receiving broadcast content;
    transmitting request information to an external device;
    receiving, with a network interface of the content recording and reproducing apparatus, in response to said transmitting, from an external device, content related information related to the broadcast content received by said receiving broadcast content;
    playing back and outputting the broadcast content received by said receiving broadcast content;
    storing, in a storage medium, a first plurality of contents and identification information related to said first plurality of contents;
    displaying a notification of whether the broadcast content has been recorded on said storage medium;
    judging, at the content recording and reproducing apparatus, whether the broadcast content has been stored in the storage medium by comparing the content related information and the identification information;
    in response to a judgment based on the content related information and the identification information, displaying a notification whether the broadcast content has been recorded on said storage medium;
    receiving, from an external device, album identification information related to an album consisting essentially of a second plurality of contents available for a download;
    displaying a menu of the second plurality of contents;
    judging whether the second plurality of contents are stored in the storage medium by comparing the album identification information and the identification information; and
    displaying an indicator indicating how many of the second plurality of contents are stored in the storage medium, in response to a judgment, based on the album identification information and the identification information, the indicator indicating a number of the second plurality of contents of the album stored in the storage medium.

17. The information processing method according to claim 16, wherein said receiving said album identification information includes receiving, from the external device, list information that includes said album identification information and forms a list of content data available for a download, and
    the information processing method further comprises:
        extracting said album identification information from said list information.

18. The information processing method according to claim 16, wherein the external device is configured to provide a plurality of content data grouped by album, said receiving said album identification information includes receiving, from the external device, list information that includes said album identification information and forms a list of content data available for a download, grouped by album, and
    the information processing method further comprises:
        extracting said album identification information from said list information.

19. The information processing method according to claim 16, further comprising:
    receiving, from an external device, list information that includes media identification information to be used to identify a package medium and forms a list of package media which can be purchased, and
    said information processing method further comprises:

extracting said media identification information from said list information; and comparing the media identification information and the identification information.

20. The information processing method according to claim 16, further comprising:

causing a display unit to display contents not stored in the storage medium in a highlighted manner.

21. The information processing method according to claim 16, further comprising:

displaying at least a part of the content related information that is to be recorded on the storage medium.

22. The information processing method according to claim 21, further comprising:

controlling a display unit such that an indicator that indicates a playback of one of the first plurality of contents is displayed in a different manner.

23. The information processing method according to claim 22, wherein, when said indicator indicating the playback is displayed on said display unit and is operated, said controlling includes displaying, on said display unit, a recording address of said storage medium where the one of said first plurality of contents is recorded, starting a playing back and an outputting of the one of said first plurality of contents, and stopping at least an output of a currently received broadcast content.

24. The information processing method according to claim 16, further comprising:

playing back, upon a judgment that the broadcast content is stored in the storage medium, the broadcast content.

25. The information processing method according to claim 24, further comprising:

generating, by detecting the content related information that is to be recorded on said storage medium, a related information list that is a list of said content related information; and comparing said content related information with said related information list generated by said generating.

26. The information processing method according to claim 24, further comprising:

detecting a plurality of content data based on said content related information; and playing back the plurality of content data in a predetermined order.

27. The information processing method according to claim 24, further comprising:

receiving, from an external device, page information containing said content related information.

28. The information processing method according to claim 27, further comprising:

receiving, from a server providing a download service of content data, list information that makes up a list of downloadable content data; and detecting said content related information from said list information.

29. The information processing method according to claim 27, further comprising:

receiving, from a server providing a purchase service of package media where content data is recorded, list information that makes up a list of package media that can be purchased; and detecting said content related information from said list information.

30. The information processing method according to claim 16, wherein said indicator indicates how many of the second plurality of contents are stored in the storage medium by using different colors.

31. A computer readable storage medium encoded with instructions, which when executed by a content recording and reproducing apparatus, causes the content recording and reproducing apparatus to implement a method comprising:

receiving broadcast content;

transmitting request information to an external device;

receiving, with a network interface of the content recording and reproducing apparatus, in response to said transmitting, from an external device, content related information related to the broadcast content received by said receiving broadcast content;

playing back and outputting the broadcast content received by said receiving broadcast content;

storing, in a storage medium, a first plurality of contents and identification information related to said first plurality of contents;

displaying a notification of whether the broadcast content has been recorded on said storage medium;

judging, at the content recording and reproducing apparatus, whether the broadcast content has been stored in the storage medium by comparing the content related information and the identification information;

in response to a judgment based on the content related information and the identification information, displaying a notification whether the broadcast content has been recorded on said storage medium;

receiving, from an external device, album identification information related to an album consisting essentially of a second plurality of contents available for a download;

displaying a menu of the second plurality of contents;

judging whether the second plurality of contents are stored in the storage medium by comparing the album identification information and the identification information; and displaying an indicator indicating how many of the second plurality of contents are stored in the storage medium, in response to a judgment, based on the album identification information and the identification information, the indicator indicating a number of the second plurality of contents of the album stored in the storage medium.

* * * * *